United States Patent
Suwa et al.

(10) Patent No.: US 10,120,242 B2
(45) Date of Patent: Nov. 6, 2018

(54) LIQUID CRYSTAL DISPLAY DEVICE

(71) Applicant: SONY CORPORATION, Tokyo (JP)

(72) Inventors: Shunichi Suwa, Kanagawa (JP);
Masashi Miyakawa, Tokyo (JP);
Chikashi Kobayashi, Kanagawa (JP);
Yoji Nagase, Kanagawa (JP); Kunihiko Nagamine, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/555,045

(22) PCT Filed: Feb. 17, 2016

(86) PCT No.: PCT/JP2016/054549
§ 371 (c)(1),
(2) Date: Aug. 31, 2017

(87) PCT Pub. No.: WO2016/152330
PCT Pub. Date: Sep. 29, 2016

(65) Prior Publication Data
US 2018/0052344 A1    Feb. 22, 2018

(30) Foreign Application Priority Data
Mar. 20, 2015   (JP) .................................. 2015-058588

(51) Int. Cl.
*G02F 1/1345*    (2006.01)
*G02F 1/1343*    (2006.01)
(Continued)

(52) U.S. Cl.
CPC ...... *G02F 1/1343* (2013.01); *G02F 1/133512* (2013.01); *G02F 1/133514* (2013.01);
(Continued)

(58) Field of Classification Search
CPC ................... G02F 1/13454; G02F 2001/13456
See application file for complete search history.

(56) References Cited

U.S. PATENT DOCUMENTS

2008/0278651 A1    11/2008  Lee et al.
2013/0329147 A1    12/2013  Murata et al.
(Continued)

FOREIGN PATENT DOCUMENTS

| CN | 104136980 A | 11/2014 |
|---|---|---|
| CN | 104246587 A | 12/2014 |

(Continued)

OTHER PUBLICATIONS

International Search Report and Written Opinion of PCT Application No. PCT/JP2016/054549, dated Apr. 26, 2016, 04 pages of English Translation and 12 pages of ISRWO.

*Primary Examiner* — Phu Vu
(74) *Attorney, Agent, or Firm* — Chip Law Group

(57) ABSTRACT

A liquid crystal display device includes a plurality of arranged pixels. Each of the pixels includes: a first substrate and a second substrate; a first electrode provided on a counter face of the first substrate, the counter face facing the second substrate; a second electrode provided on a counter face of the second substrate, the counter face facing the first substrate; and a liquid crystal layer that contains liquid crystal molecules, and is sandwiched between the first substrate and the second substrate. The liquid crystal molecules are given a pre-tilt. The first electrode includes a base layer 150 that contains a plurality of recesses and protrusions, and transparent conductive material layers 135 and 145. The first transparent conductive material layer 135 connected to a first power supply portion is formed on protrusion top faces 151 of the base layer 150. The second transparent conductive material layer 145 connected to a second power supply portion is formed on recess bottom (Continued)

faces 152 of the base layer 150. The first transparent conductive material layer 135 and the second transparent conductive material layer 145 are separated from each other.

14 Claims, 47 Drawing Sheets

(51) Int. Cl.
  *G02F 1/1335* (2006.01)
  *G09G 3/18* (2006.01)
(52) U.S. Cl.
  CPC .. *G02F 1/133528* (2013.01); *G02F 1/133602* (2013.01); *G09G 3/18* (2013.01); *G09G 2310/0264* (2013.01)

(56) References Cited

U.S. PATENT DOCUMENTS

| | | |
|---|---|---|
| 2015/0002798 A1 | 1/2015 | Miyakawa et al. |
| 2015/0035873 A1 | 2/2015 | Shima et al. |
| 2015/0042912 A1* | 2/2015 | Hagano et al. ....... G02F 1/1337 349/41 |
| 2015/0131040 A1 | 5/2015 | Suwa et al. |

FOREIGN PATENT DOCUMENTS

| | | |
|---|---|---|
| CN | 104252072 A | 12/2014 |
| EP | 2840432 A1 | 2/2015 |
| JP | 05-232473 A | 9/1993 |
| JP | 2002-357830 A | 12/2002 |
| JP | 2013-231794 A | 11/2013 |
| JP | 2015-011157 A | 1/2015 |
| JP | 2015-036713 A | 2/2015 |
| KR | 10-2008-0099038 A | 11/2008 |
| KR | 10-2014-0140587 A | 12/2014 |
| KR | 10-2015-0002509 A | 1/2015 |
| KR | 10-2015-0004346 A | 1/2015 |
| WO | 2012/090839 A1 | 7/2012 |
| WO | 2013/157341 A1 | 10/2013 |

* cited by examiner

LIQUID CRYSTAL DISPLAY DEVICE

CROSS REFERENCE TO RELATED APPLICATIONS

This application is a U.S. National Phase of International Patent Application No. PCT/JP2016/054549 filed on Feb. 17, 2016, which claims priority benefit of Japanese Patent Application No. JP 2015-058588 filed in the Japan Patent Office on Mar. 20, 2015. Each of the above-referenced applications is hereby incorporated herein by reference in its entirety.

TECHNICAL FIELD

The present disclosure relates to a liquid crystal display device provided with a liquid crystal display element which includes a liquid crystal layer sealed between a pair of substrates.

BACKGROUND ART

In recent years, a liquid crystal display device (liquid crystal display (LCD)) has been widely used to provide a display monitor for a liquid crystal television receiver, a laptop, a car navigation device and the like. This type of liquid crystal display device is classified into various types of display modes (systems) on the basis of molecular arrangement (orientation) of respective liquid crystal molecules contained in a liquid crystal layer sandwiched between a pair of substrates. A well-known display mode is a twisted nematic (TN) mode, for example, where liquid crystal molecules are twistedly oriented in a voltage non-application state. In the TN mode, a liquid crystal molecule has a feature of positive dielectric anisotropy, i.e., a feature that a dielectric constant of liquid crystal molecules in the major axis direction is larger than in the minor axis direction. Accordingly, there is produced such a structure that the liquid crystal molecules are aligned in directions perpendicular to a substrate plane with sequential rotation of orientation directions of the liquid crystal molecules in a plane parallel with the substrate plane.

On the other hand, currently attracting attention is a vertical alignment (VA) mode where liquid crystal molecules are oriented perpendicularly to the substrate plane in a voltage non-application state. In the VA mode, a liquid crystal molecule has a feature of negative dielectric anisotropy, i.e., a feature that a dielectric constant of liquid crystal molecules in the major axis direction is smaller than in the minor axis direction. In this case, a larger viewing angle than that of the TN mode is realizable.

According to the liquid crystal display device in the foregoing VA mode, liquid crystal molecules oriented in the direction perpendicular to the substrate are responded in a manner falling in directions parallel with the substrate on the basis of negative dielectric anisotropy when voltage is applied to the liquid crystal display device. As a result, light is allowed to pass through the liquid crystal display device. However, the liquid crystal molecules oriented in the directions perpendicular to the substrate fall in random directions. This randomness of the falling directions may cause disorder of the orientation of the liquid crystal molecules, and deteriorate response characteristics to voltage.

Accordingly, there have been proposed various methods for regulating the orientation of the liquid crystal molecules during voltage application. For example, currently proposed are a multi-domain vertical alignment (MVA) system, a patterned vertical alignment (PVA) system, and a method using light orientation film (e.g. see Japanese Patent Application Laid-Open No. 5-232473). The MVA system realizes a large viewing angle under orientation control by using slits and ribs (projections). In addition to the foregoing examples, recently proposed is a structure (called fine slit structure) which includes a first electrode (more specifically, pixel electrode) formed on one substrate and provided with a plurality of fine slits, and a second electrode (more specifically, counter electrode) formed on the other substrate and provided as a so-called solid electrode without slits (e.g. see Japanese Patent Application Laid-Open No. 2002-357830).

Further known is a lateral electric field driving type liquid crystal display device, such as a transmission type in-plane-switching (IPS) system liquid crystal display device, for example. In addition, in case of a so-called normally black type, the direction of the polarization axis of one polarizing plate and a director become substantially the same in a state of non-application of an electric field to the liquid crystal layer, and form an angle of substantially 45 degrees in a state of application of an electric field to the liquid crystal layer. In the state of non-application of an electric field to the liquid crystal layer, light entering an entrance side polarizing plate reaches an exit side polarizing plate with substantially no retardation by the liquid crystal layer, and is absorbed by the exit side polarizing plate (black display state). Accordingly, a state substantially equivalent to an ideal crossed-Nichol state without interposition of a liquid crystal layer is realizable in a black display state. On the other hand, in a state of application of an electric field to the liquid crystal layer, the director and linearly polarized light having passed through the entrance side polarizing plate form an angle of substantially 45 degrees. In this case, the liquid crystal layer functions as a half-wave plate, and rotates an oscillation direction of the linearly polarized light through 90 degrees. As a result, the light having passed through the liquid crystal layer passes through the exit side polarizing plate (white display state). The first electrode and the second electrode are formed on the same substrate, and form a comb teeth structure facing each other and alternately combined.

CITATION LIST

Patent Document

Patent Document 1: Japanese Patent Application Laid-Open No. 5-232473
Patent Document 2: Japanese Patent Application Laid-Open No. 2002-357830

SUMMARY OF THE INVENTION

Problems to be Solved by the Invention

However, the fine slit structure which includes slits constituted by small lines and spaces produces a portion of the slits to which an electric field is not applied. Furthermore, a twist structure is produced in the orientation state of the liquid crystal molecules in the vicinity of edges of the lines under application of voltage. In this case, light transmittance may decrease. In addition, according to the lateral electric field driving type liquid crystal display device, the first electrode and the second electrode are provided on the same substrate. In this case, non-uniformity of light transmittance of the liquid crystal layer may be easily caused in accordance with non-uniformity of an electric field profile produced by the first electrode and the second electrode.

Accordingly, an object of the present disclosure is to provide a liquid crystal display device which has a configuration and a structure capable of realizing uniform light transmittance of a liquid crystal layer.

Solutions to Problems

A liquid crystal display device according to a first mode of the present disclosure for achieving the above object includes a plurality of arranged pixels, each of the pixels including:

a first substrate and a second substrate;

a first electrode provided on a counter face of the first substrate, the counter face facing the second substrate;

a second electrode provided on a counter face of the second substrate, the counter face facing the first substrate; and a liquid crystal layer that contains liquid crystal molecules, and is sandwiched between the first substrate and the second substrate, in which the liquid crystal molecules are given a pre-tilt, the first electrode includes a base layer that contains a plurality of recesses and protrusions, a first transparent conductive material layer, and a second transparent conductive material layer, the first transparent conductive material layer connected to a first power supply portion is formed on protrusion top faces of the base layer, the second transparent conductive material layer connected to a second power supply portion is formed on recess bottom faces of the base layer, and the first transparent conductive material layer and the second transparent conductive material layer are separated from each other.

A liquid crystal display device according to a second mode of the present disclosure for achieving the above object includes a plurality of arranged pixels, each of the pixels including:

a first substrate and a second substrate;

a first electrode that is provided on a counter face of the first substrate, the counter face facing the second substrate, and includes a plurality of slits;

a second electrode that is provided on a counter face of the second substrate, the counter face facing the first substrate; and a liquid crystal layer that contains liquid crystal molecules, and is sandwiched between the first substrate and the second substrate, in which the liquid crystal molecules are given a pre-tilt, a high dielectric material layer is formed on the counter face of the first substrate, and the first electrode is provided above or below the high dielectric material layer.

A liquid crystal display device according to a third mode of the present disclosure for achieving the above object includes a plurality of arranged pixels, each of the pixels including:

a first substrate and a second substrate;

a first electrode and a second electrode that are provided on a counter face of the first substrate, the counter face facing the second substrate, such that the first electrode and the second electrode are disposed away from each other; and a liquid crystal layer that contains liquid crystal molecules, and is sandwiched between the first substrate and the second substrate, in which a high dielectric material layer is formed on the counter face of the first substrate, and at least the first electrode is provided above or below the high dielectric material layer.

Effects of the Invention

According to the liquid crystal display device in the first mode of the present disclosure, the first transparent conductive material layer connected to the first power supply portion is formed on the protrusion top faces of the base layer, while the second transparent conductive material layer connected to the second power supply portion is formed on the recess bottom faces of the base layer. The first transparent conductive material layer and the second transparent conductive material layer are separated from each other. That is, in this case, a certain type of edge portion is formed at a portion of the first transparent conductive material layer separated from the second transparent conductive material layer. Therefore, the presence of the certain type of edge portion formed on the first transparent conductive material layer increases the intensity of the electric field generated at the protrusions of the base layer at a portion of the first electrode to orient the liquid crystal molecules, particularly the liquid crystal molecules in the vicinity of the side of the base layer in response to application of voltage to the first electrode. Moreover, an electric field profile thus produced becomes uniform. Furthermore, according to the liquid crystal display devices in the second and the third modes of the present disclosure, the high dielectric material layer is provided. In this case, an electric field profile produced by the first electrode and the second electrode becomes uniform. In addition, light transmittance of the liquid crystal layer becomes uniform in accordance with the uniformity of the electric field profile. Note that advantageous effects described in the present specification are presented only by way of example. Advantageous effects described in the present specification are not limited to the advantageous effects described herein, and may include additional effects.

BRIEF DESCRIPTION OF DRAWINGS

FIGS. 8A and 8B are schematic end face views of the liquid crystal display device according to the first embodiment taken along an arrow A-A in FIG. 3, and an arrow B-B in FIG. 3, respectively, while

FIG. 11A is a schematic end face view of the liquid crystal display device according to the second embodiment taken along an arrow A-A in FIG. 9, while

FIGS. 16A and 16B are schematic partial end face views of the first electrode and the like of the liquid crystal display device according to the fourth embodiment taken along an arrow A-A in FIG. 14, and an arrow B-B in FIG. 14, respectively, while

Figure 18A:
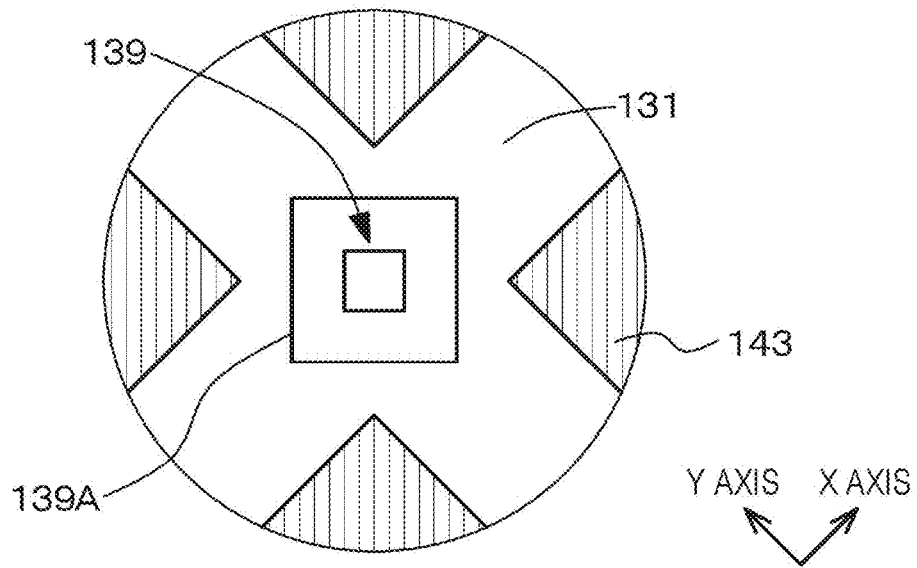
Figure 18B:
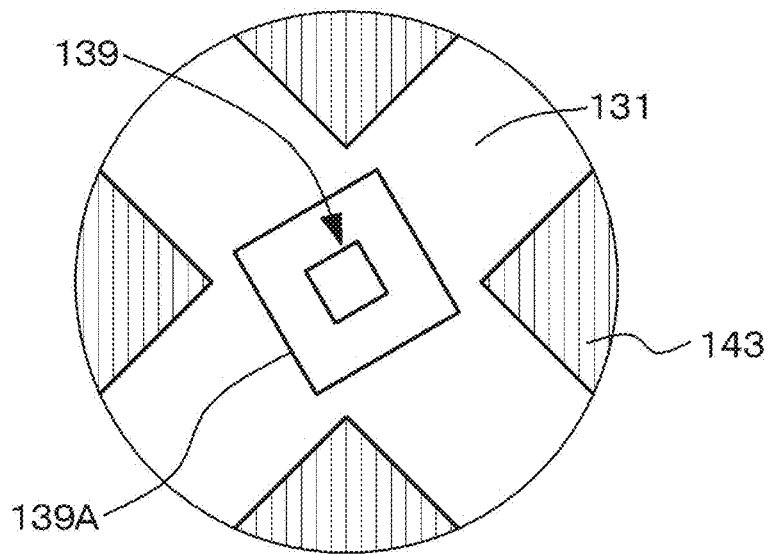

Each of FIGS. 18A and 18B is a schematic plan view illustrating a part of the first electrode in the center area of the one pixel constituting the liquid crystal display device according to the fifth embodiment.

Figure 19:
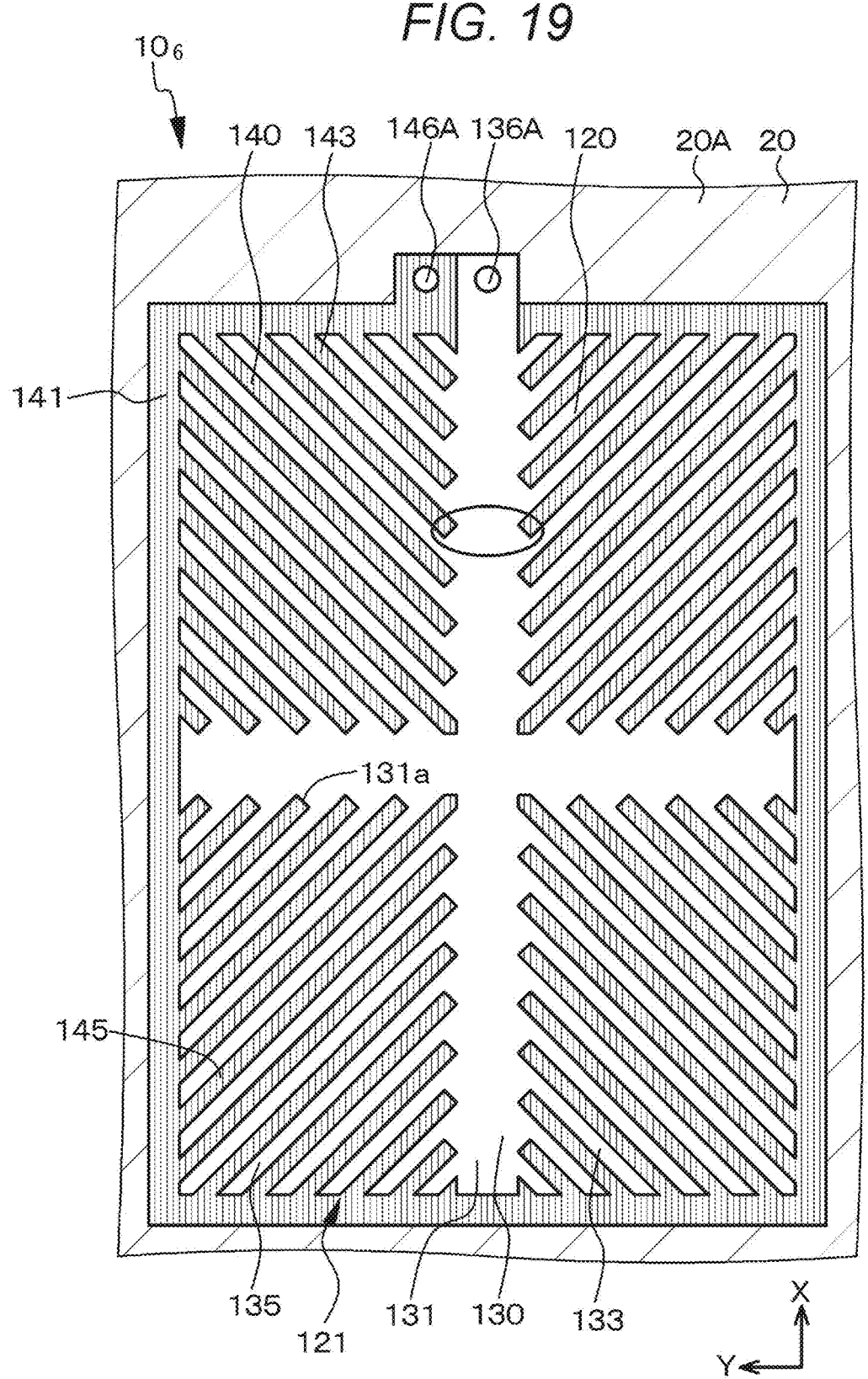

FIG. 19 is a schematic plan view of a first electrode of one pixel constituting a liquid crystal display device according to a sixth embodiment.

Figure 20A:
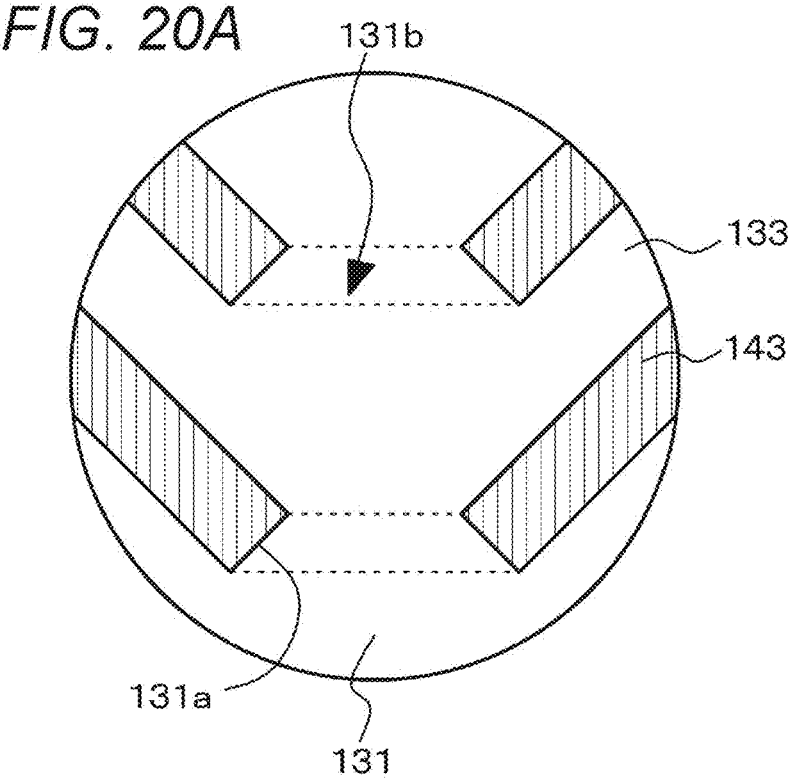
Figure 20B:
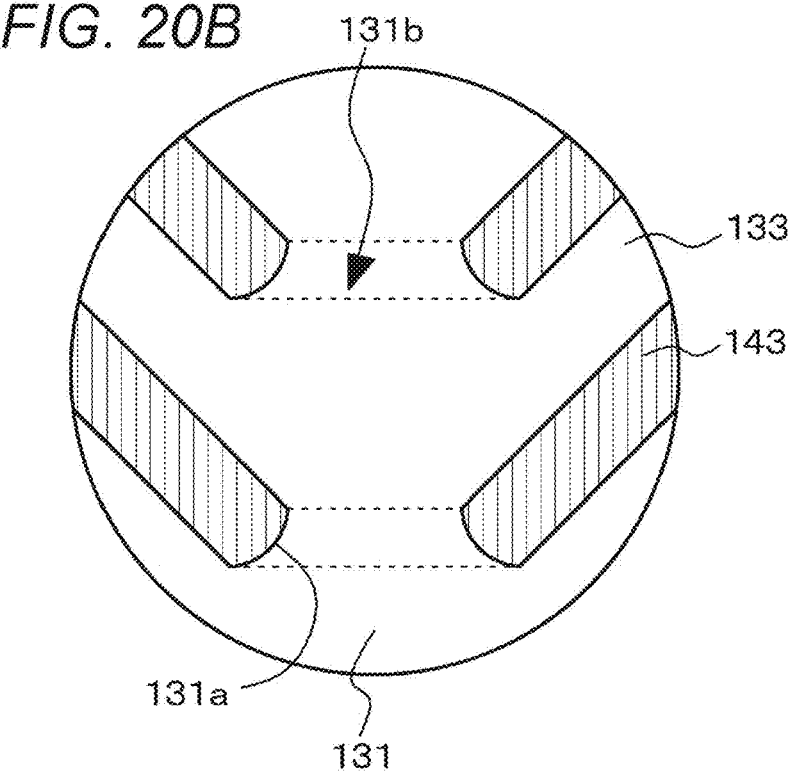

Each of FIGS. 20A and 20B is a schematic plan view of an enlarged part of the first electrode indicated by an elliptic area in the schematic plan view of the first electrode illustrated in FIG. 19.

Figure 21:
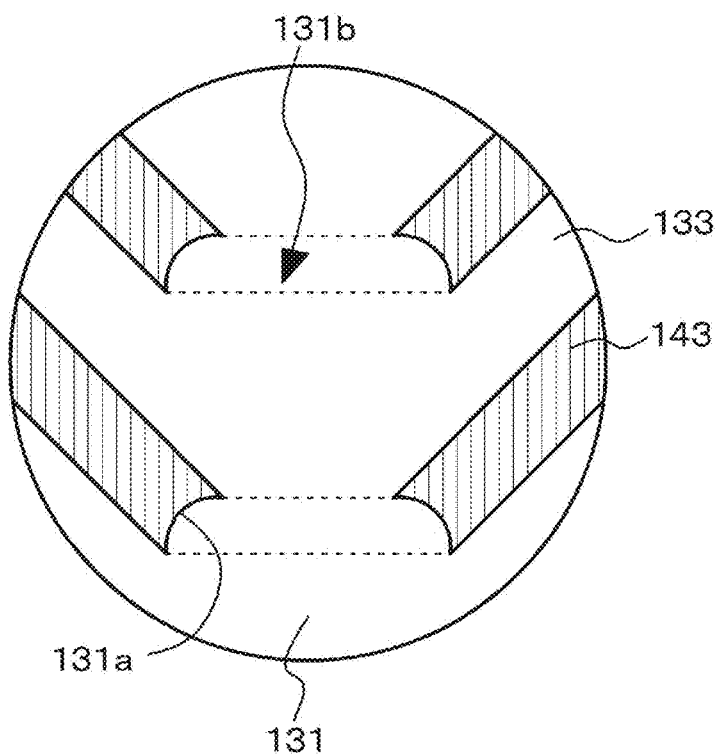

FIG. 21 is a schematic plan view of an enlarged part of the first electrode indicated by the elliptic area in the schematic plan view of the first electrode illustrated in FIG. 19.

Figure 3:
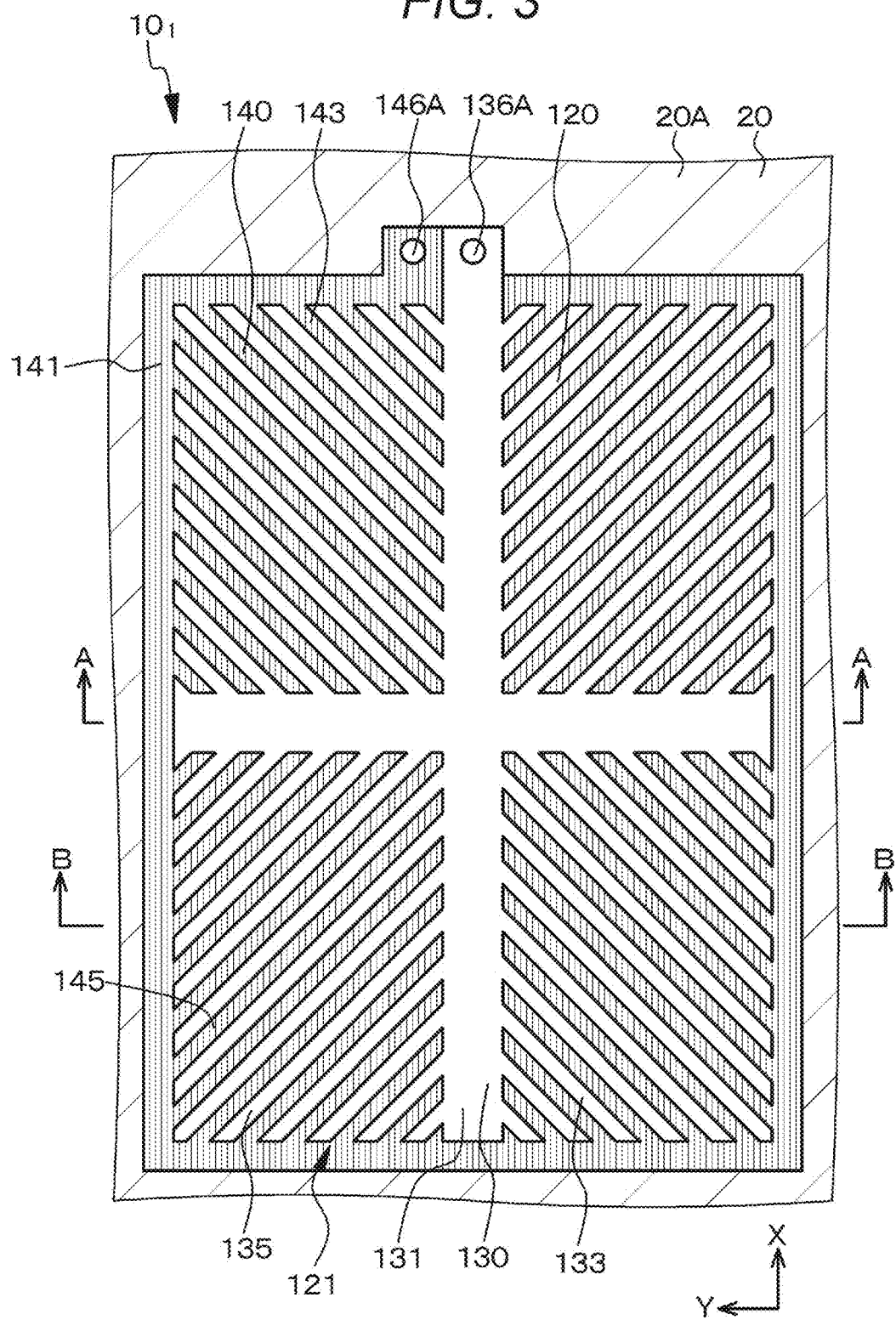
FIG. 3 is a schematic view of one pixel on a first substrate constituting the liquid crystal display device according to the first embodiment as viewed from above.
Figure 22:
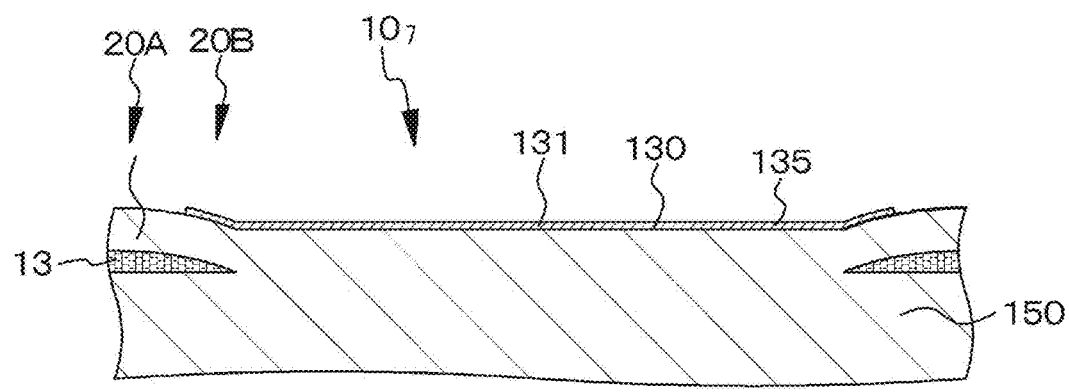

FIG. 22 is a schematic partial cross-sectional view of a first electrode and the like of a liquid crystal display device according to a seventh embodiment, corresponding to a schematic partial cross-sectional view of the first electrode and the like taken along the arrow A-A in FIG. 3.

Figure 23:
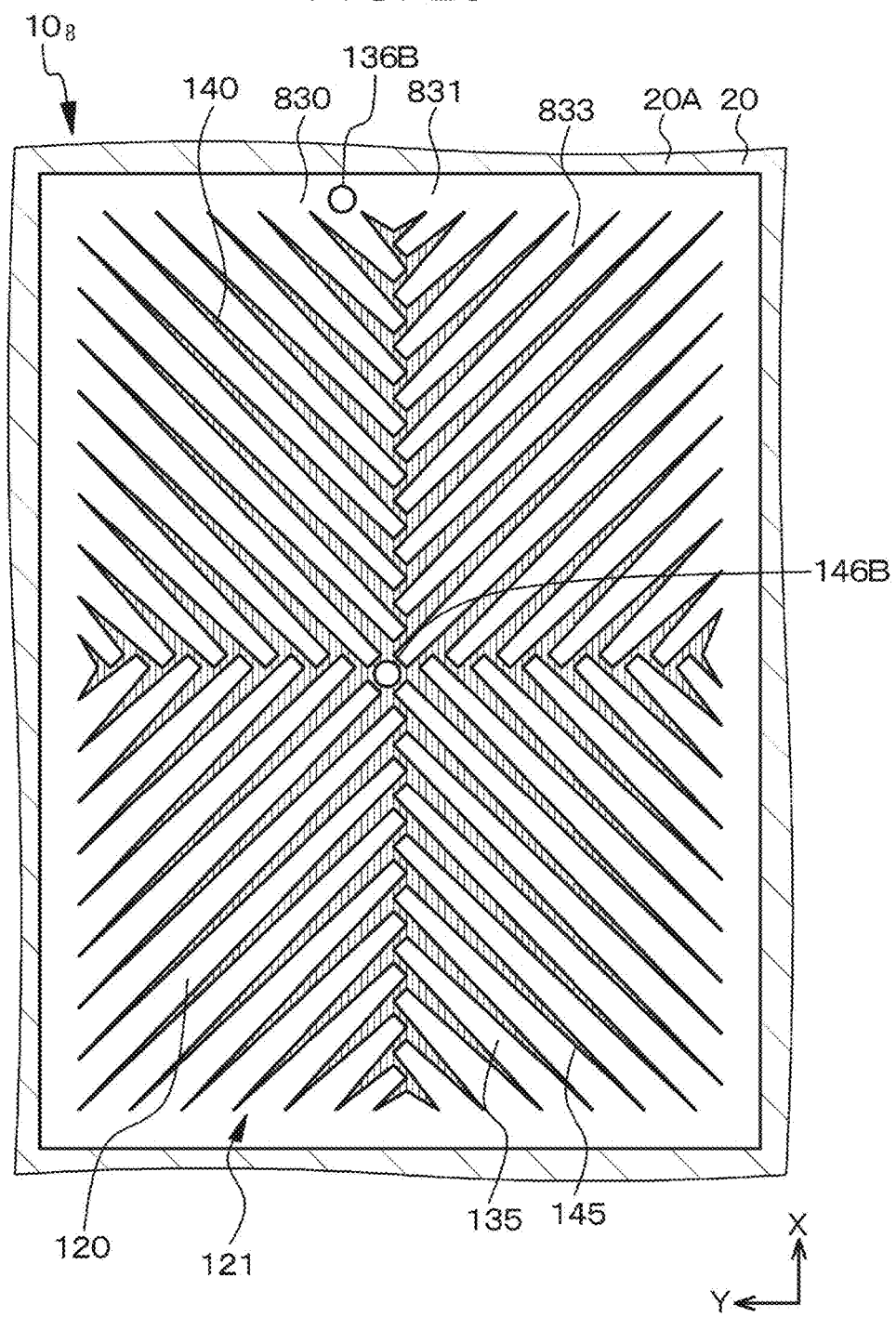

FIG. 23 is a schematic plan view of a first electrode of one pixel constituting a liquid crystal display device according to an eighth embodiment.

Figure 24A:
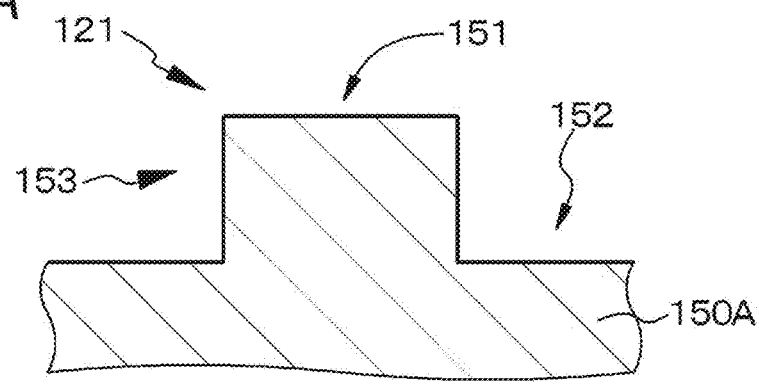
Figure 24B:
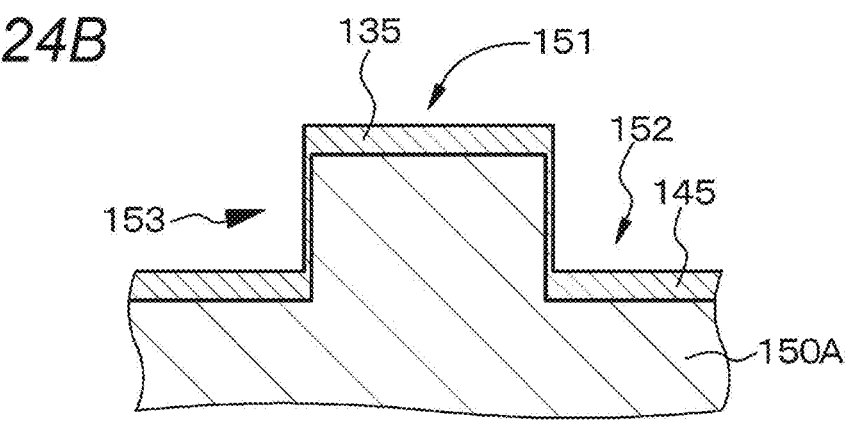
Figure 24C:
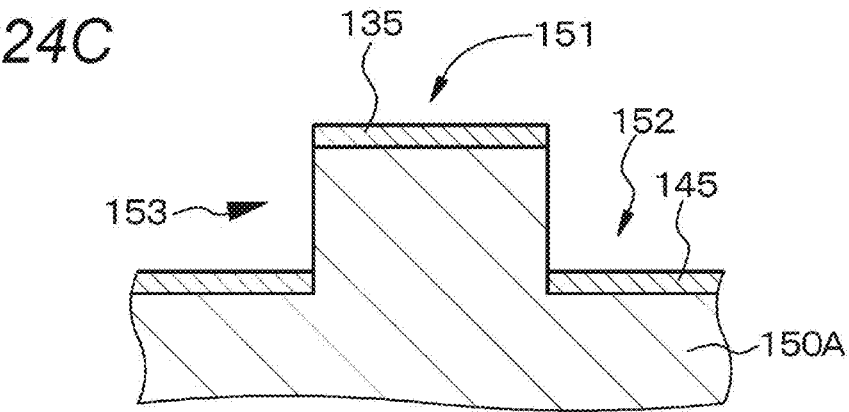

Each of FIGS. 24A, 24B, and 24C is a schematic partial end face view of a smoothing film and the like, explaining steps for forming the first electrode separation portion for separation between the first transparent conductive material layer and the second transparent conductive material layer according to the first embodiment.

Figure 25A:
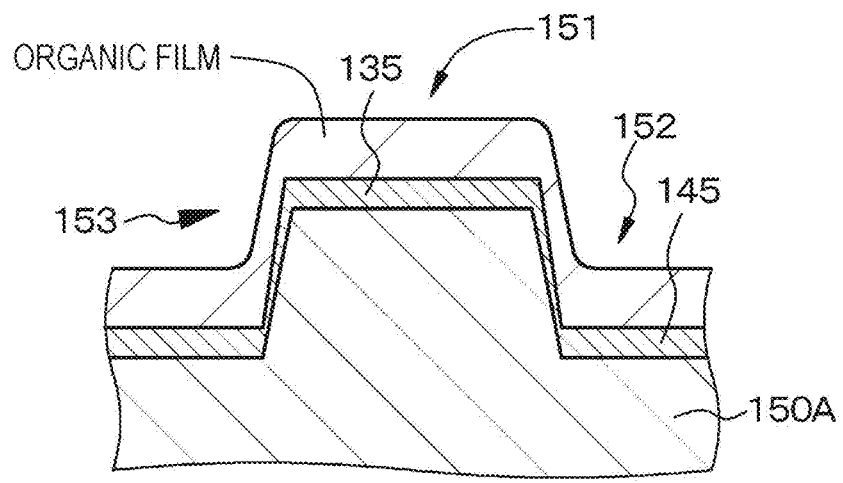
Figure 25B:
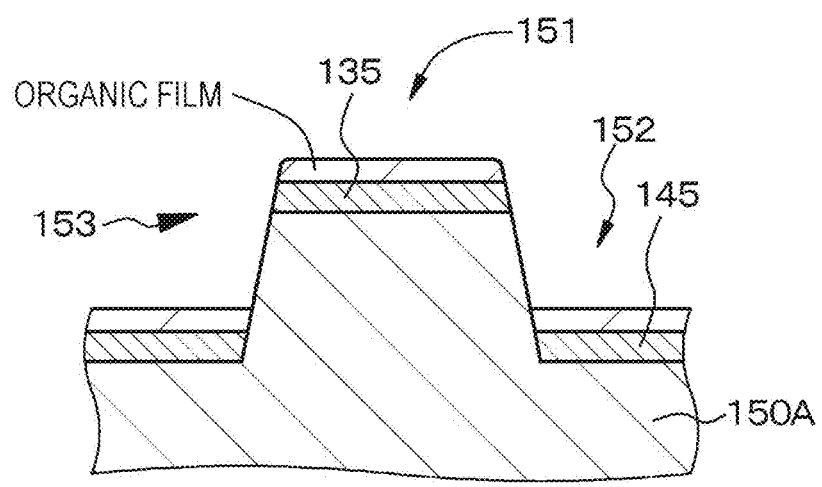

Each of FIGS. 25A and 25B is a schematic partial end face view of the smoothing film and the like, explaining steps for forming the first electrode separation portion for separation between the first transparent conductive material layer and the second transparent conductive material layer according to the first embodiment.

Figure 26A:
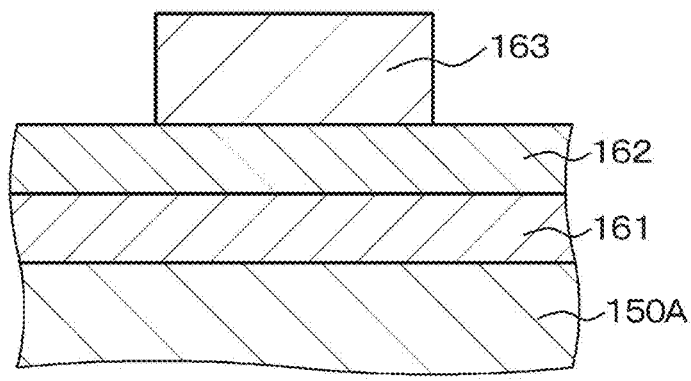
Figure 26B:
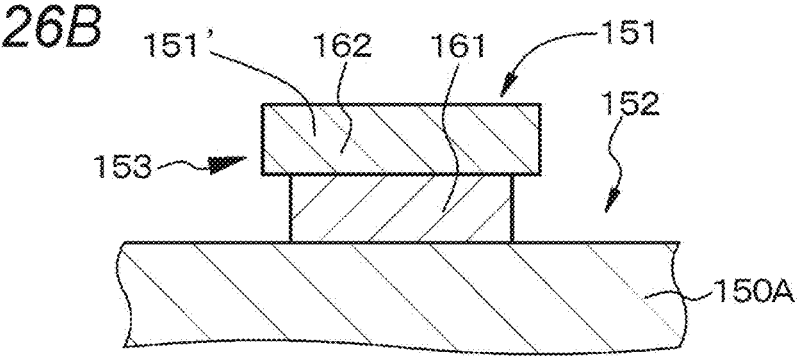
Figure 26C:
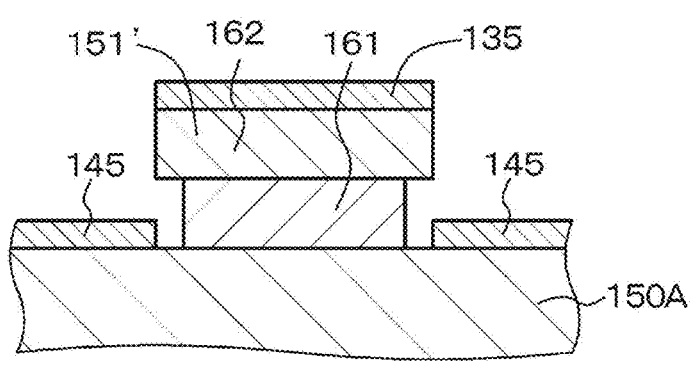

Each of FIGS. 26A, 26B, and 26C is a schematic partial end face view of a smoothing film and the like, explaining steps for forming a first electrode separation portion for separation between a first transparent conductive material layer and a second transparent conductive material layer according to a ninth embodiment.

Figure 27A:
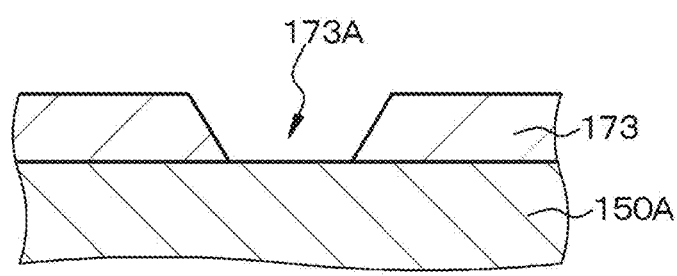
Figure 27B:
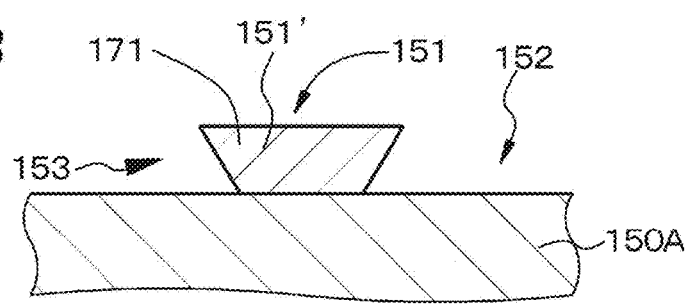
Figure 27C:
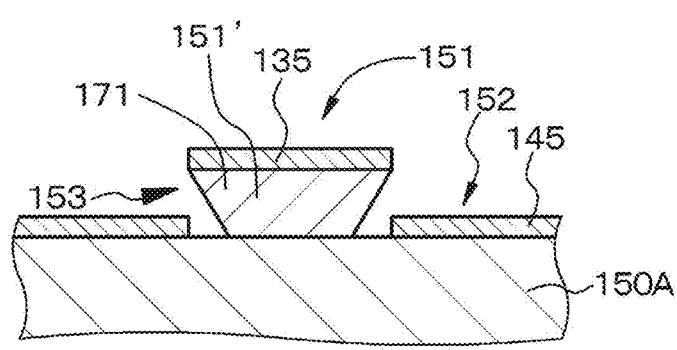

Each of FIGS. 27A, 27B, and 27C is a schematic partial end face view of the smoothing film and the like, explaining steps for forming the first electrode separation portion for separation between the first transparent conductive material layer and the second transparent conductive material layer according to the ninth embodiment.

Figure 28A:
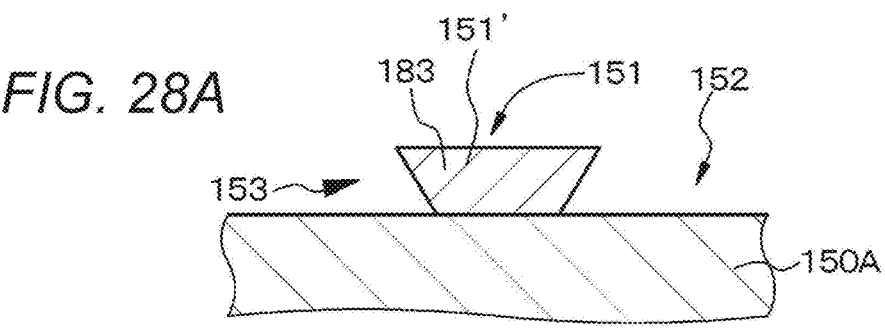
Figure 28B:
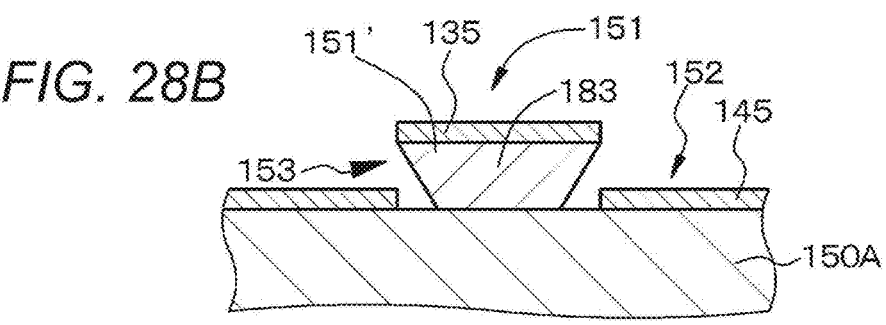

Each of FIGS. 28A and 28B is a schematic partial end face view of the smoothing film and the like, explaining steps for forming the first electrode separation portion for separation between the first transparent conductive material layer and the second transparent conductive material layer according to the ninth embodiment.

Figure 29:
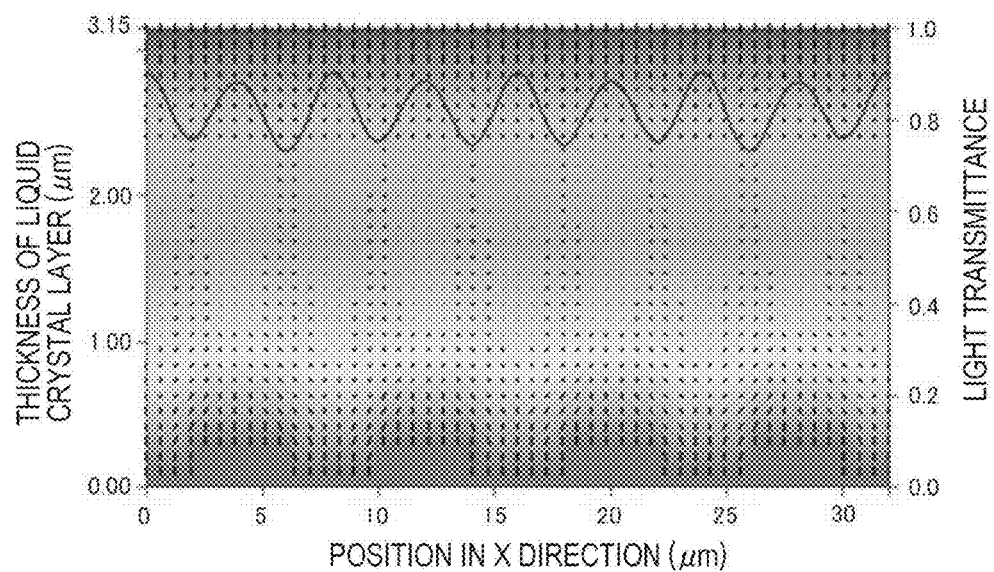

FIG. 29 is a graph showing a result of a simulation of an electric field profile of the liquid crystal display device according to the first embodiment.

Figure 30:
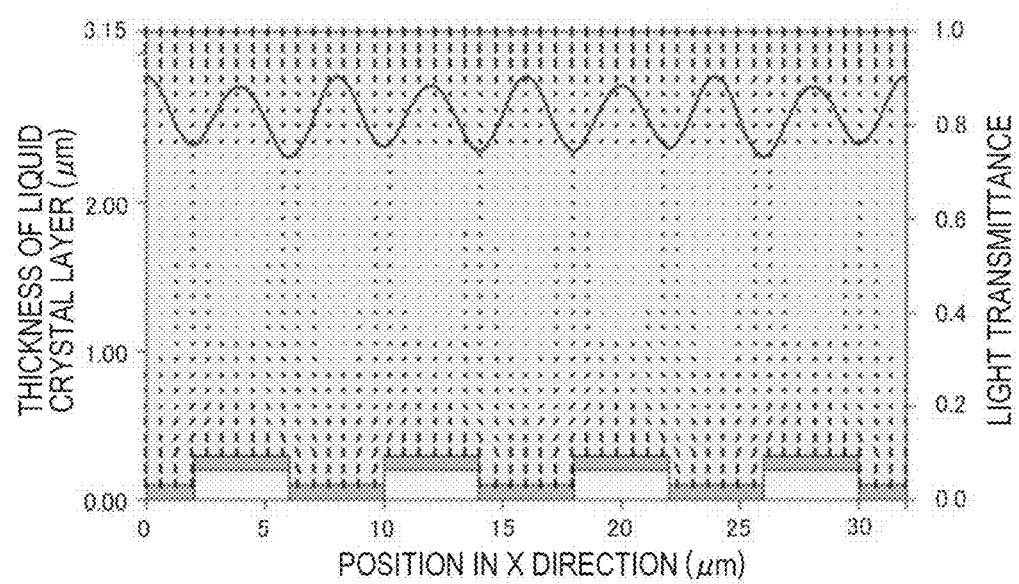

FIG. 30 is a graph showing a result of a simulation of a light transmittance profile of the liquid crystal display device according to the first embodiment.

Figure 31:
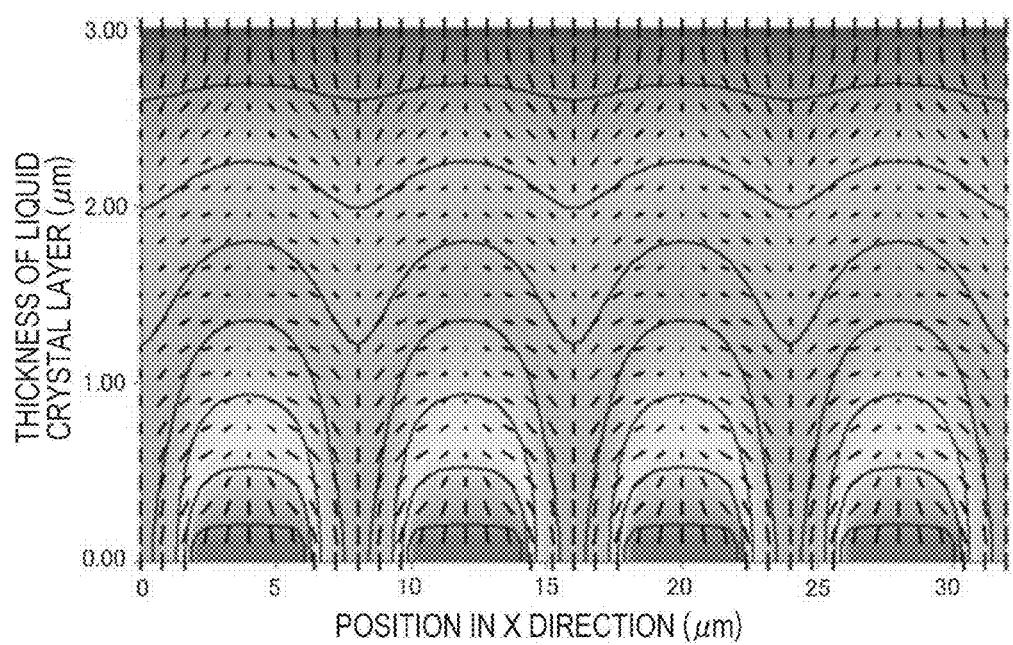

FIG. 31 is a graph showing a result of a simulation of an electric field profile of a liquid crystal display device according to a first comparative example including a conventional fine slit structure.

Figure 32:
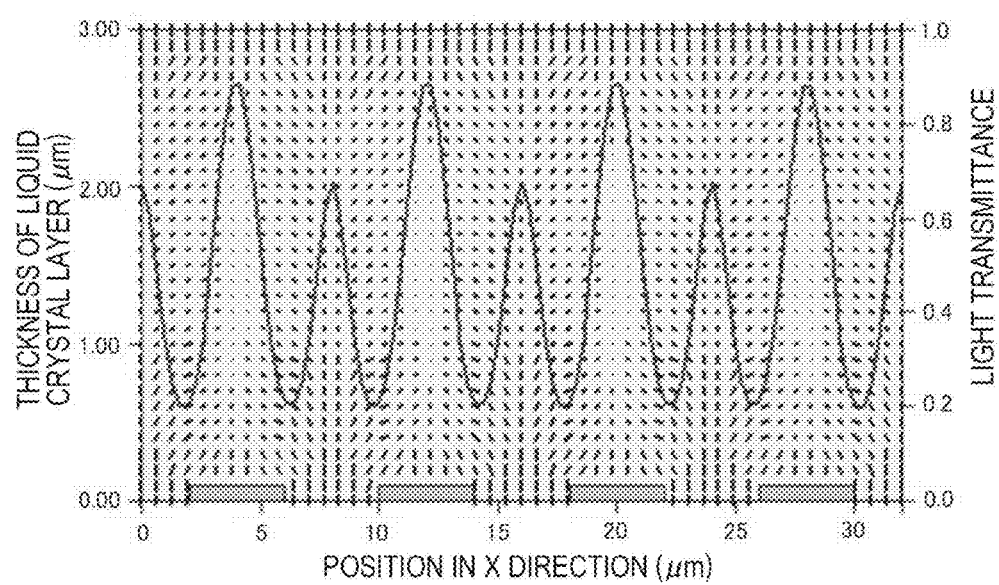

FIG. 32 is a graph showing a result of a simulation of a light transmittance profile of the liquid crystal display device according to the first comparative example including the conventional fine slit structure.

Figure 33:
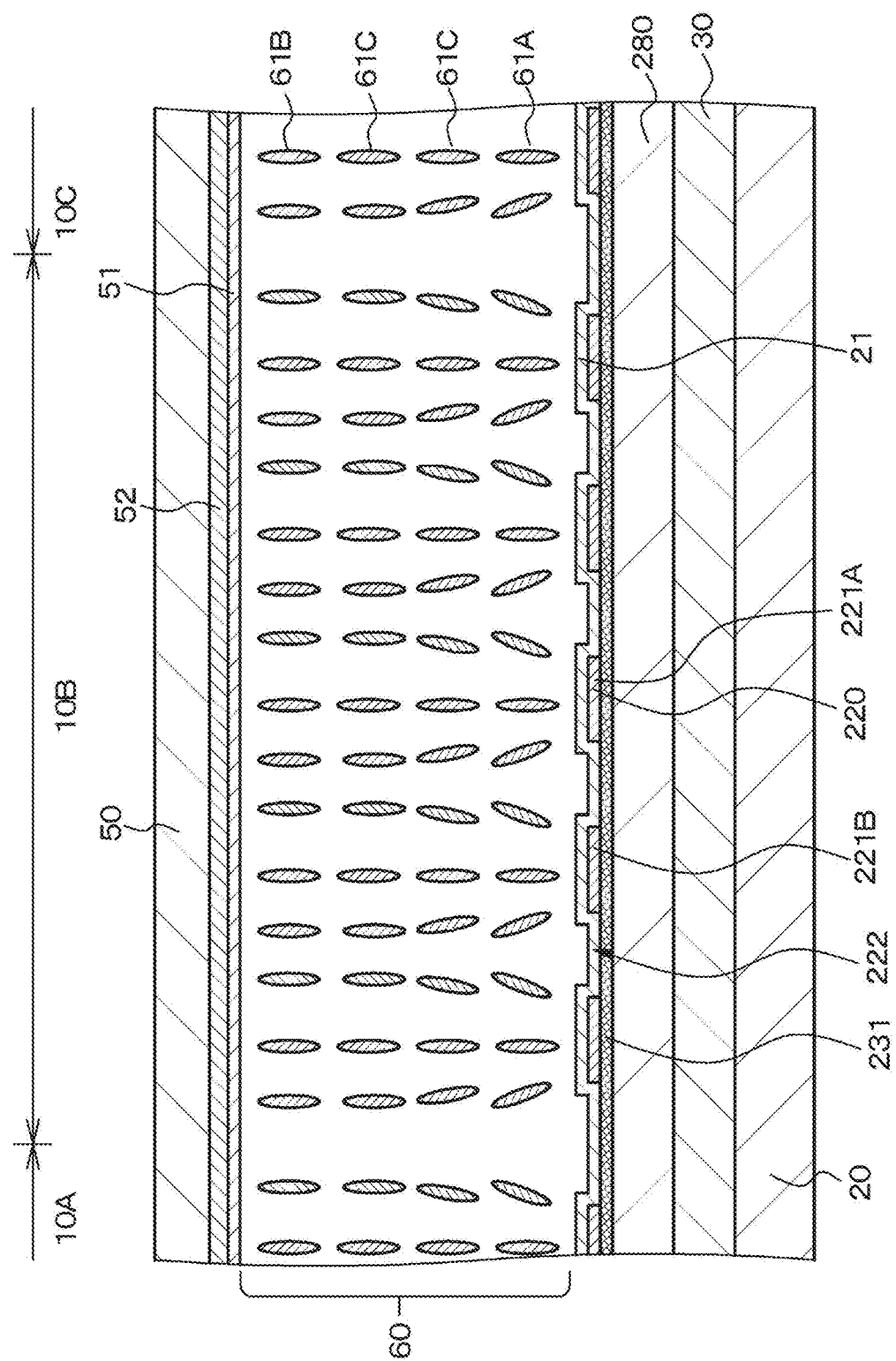

FIG. 33 is a schematic partial cross-sectional view of a liquid crystal display device according to a tenth embodiment.

Figure 34:
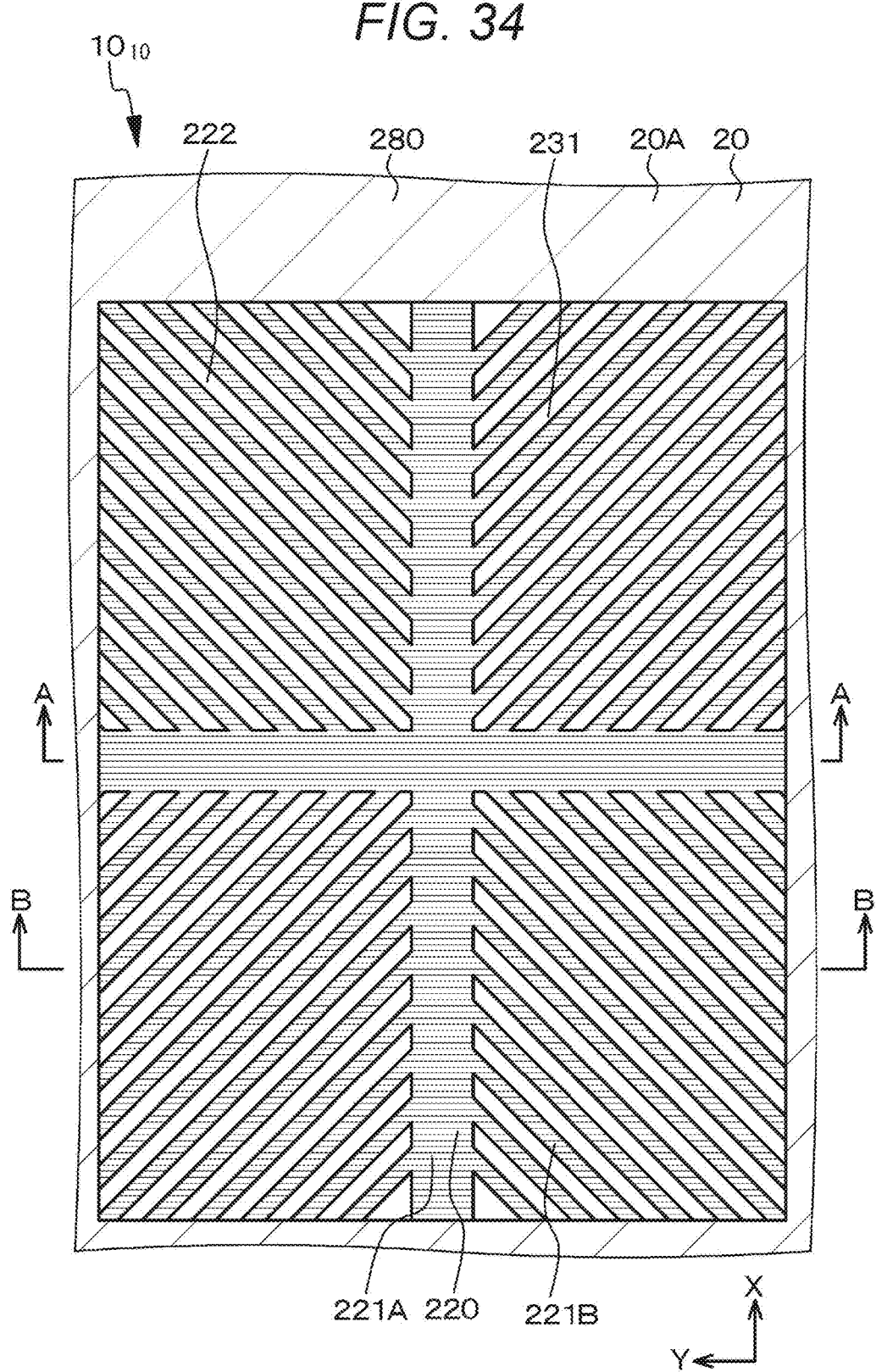

FIG. 34 is a schematic view of one pixel on a first substrate constituting the liquid crystal display device according to the tenth embodiment as viewed from above.

Figure 35A:
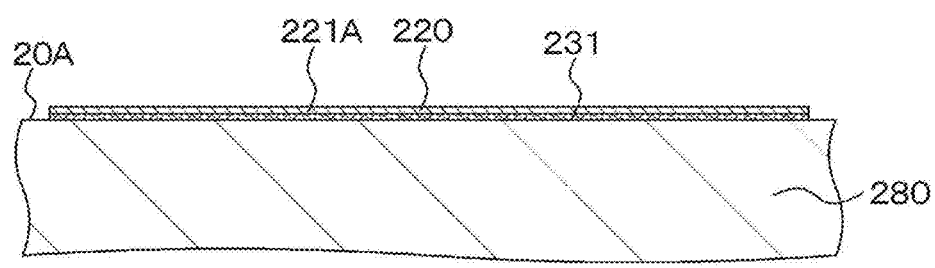
Figure 35B:
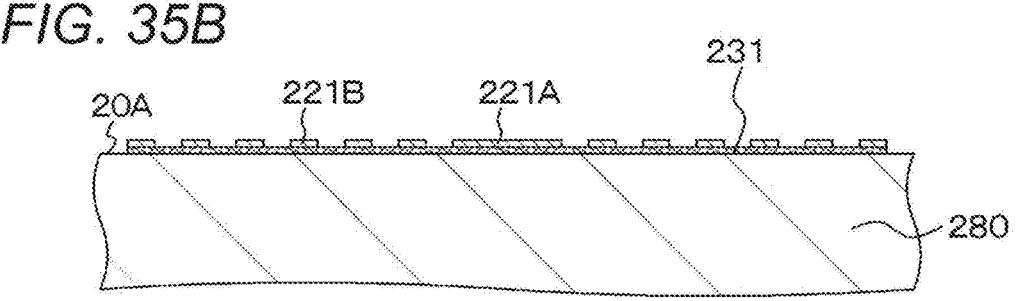

FIGS. 35A and 35B are schematic end face views of the liquid crystal display device according to the tenth embodiment taken along an arrow A-A in FIG. 34, and an arrow B-B in FIG. 34, respectively.

Figure 36:
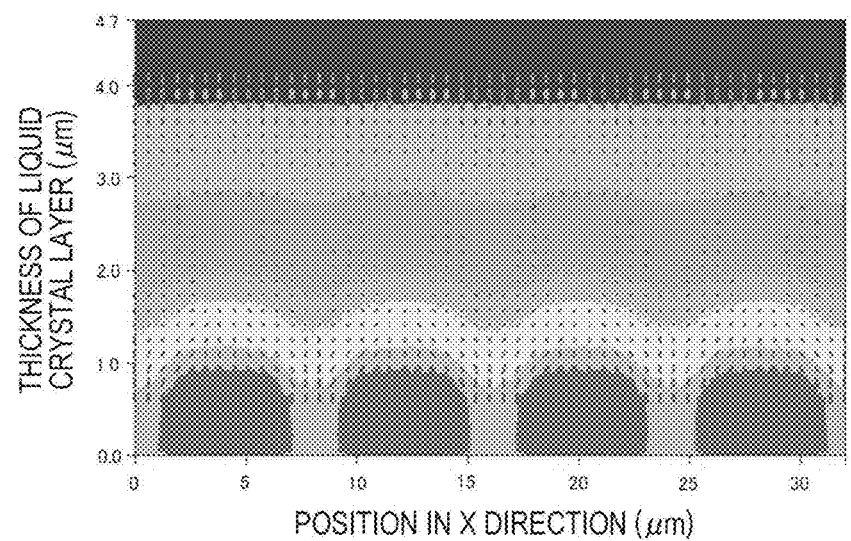

FIG. 36 is a graph showing a result of a simulation of an electric field profile of a high dielectric material layer having a dielectric constant of 100 in the liquid crystal display device according to the tenth embodiment.

Figure 37:
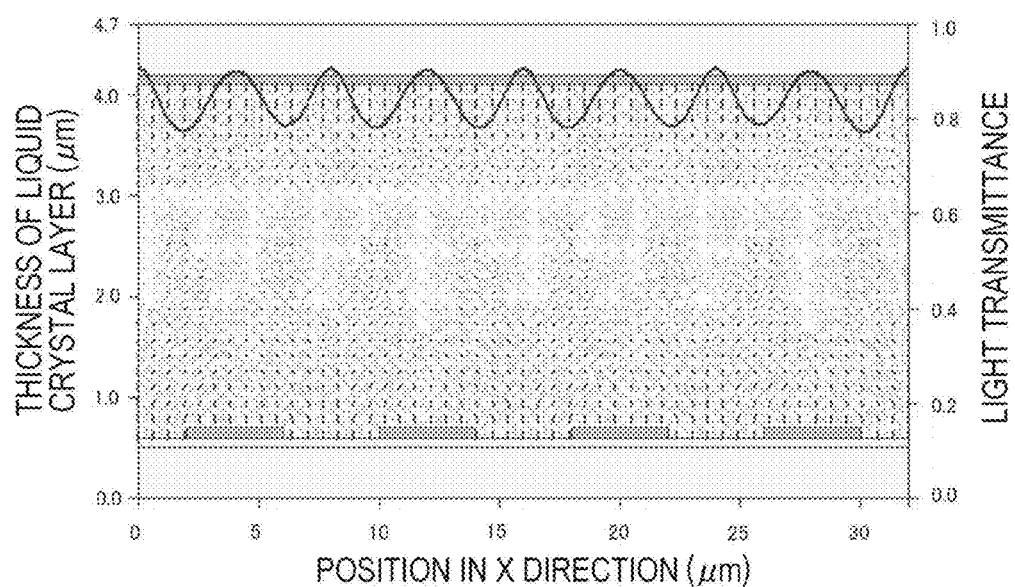

FIG. 37 is a graph showing a result of a simulation of a light transmittance profile of the high dielectric material layer having a dielectric constant of 100 in the liquid crystal display device according to the tenth embodiment.

Figure 38:
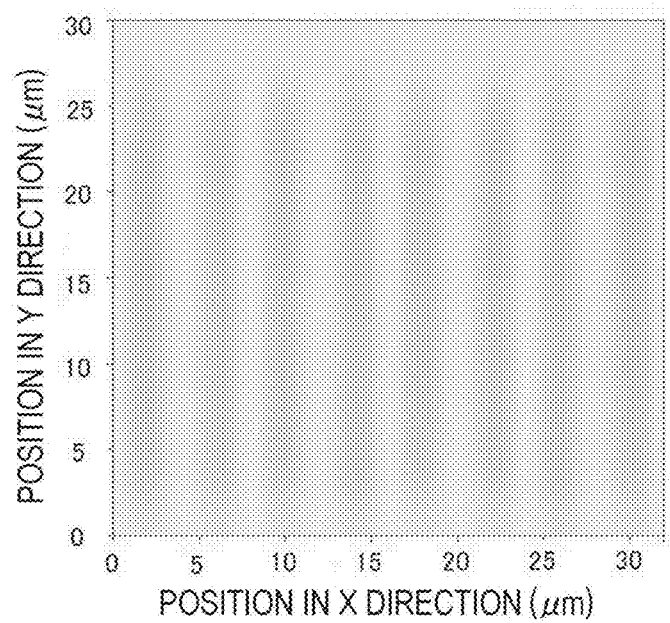

FIG. 38 is a graph showing a result of a simulation of light transmittance of the high dielectric material layer having a dielectric constant of 100 in the liquid crystal display device according to the tenth embodiment, on the assumption that one pixel is viewed from above.

Figure 39:
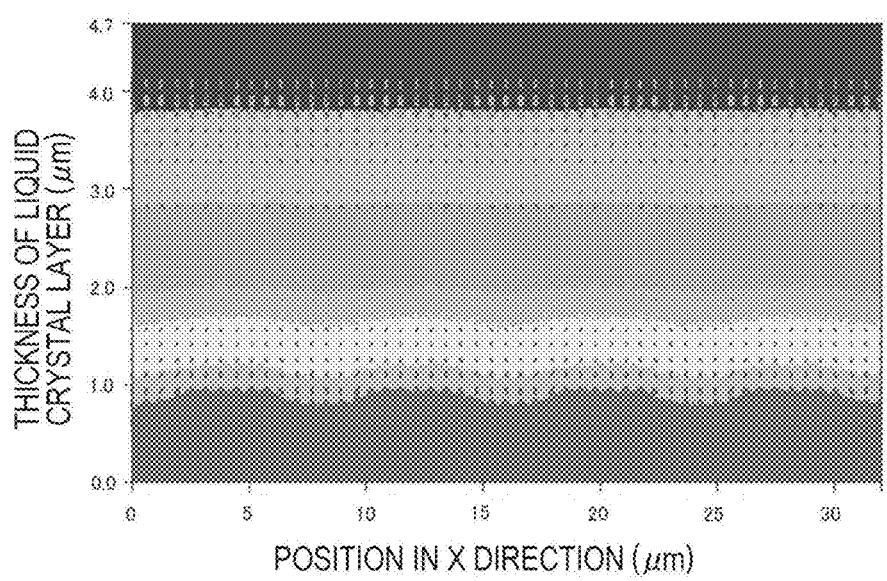

FIG. 39 is a graph showing a result of a simulation of an electric field profile of a high dielectric material layer having a dielectric constant of 1000 in the liquid crystal display device according to the tenth embodiment.

Figure 40:
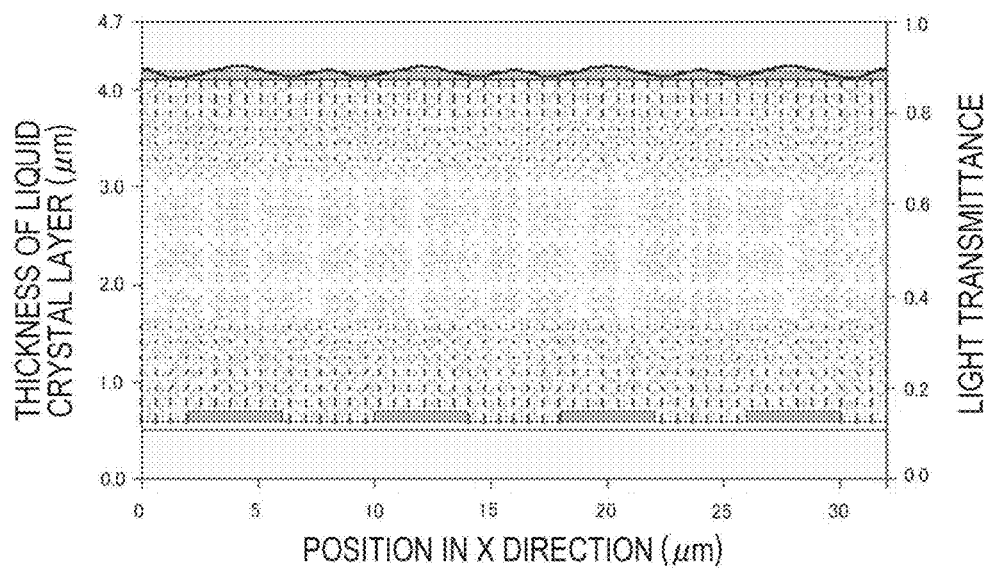

FIG. 40 is a graph showing a result of a simulation of a light transmittance profile of the high dielectric material layer having a dielectric constant of 1000 in the liquid crystal display device according to the tenth embodiment.

Figure 41:
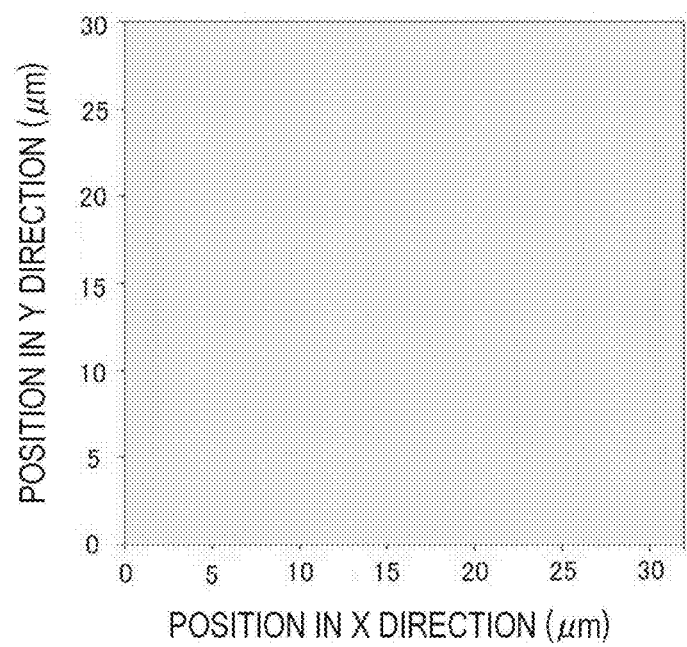

FIG. 41 is a graph showing a result of a simulation of light transmittance of the high dielectric material layer having a dielectric constant of 1000 in the liquid crystal display device according to the tenth embodiment, on the assumption that one pixel is viewed from above.

Figure 42:
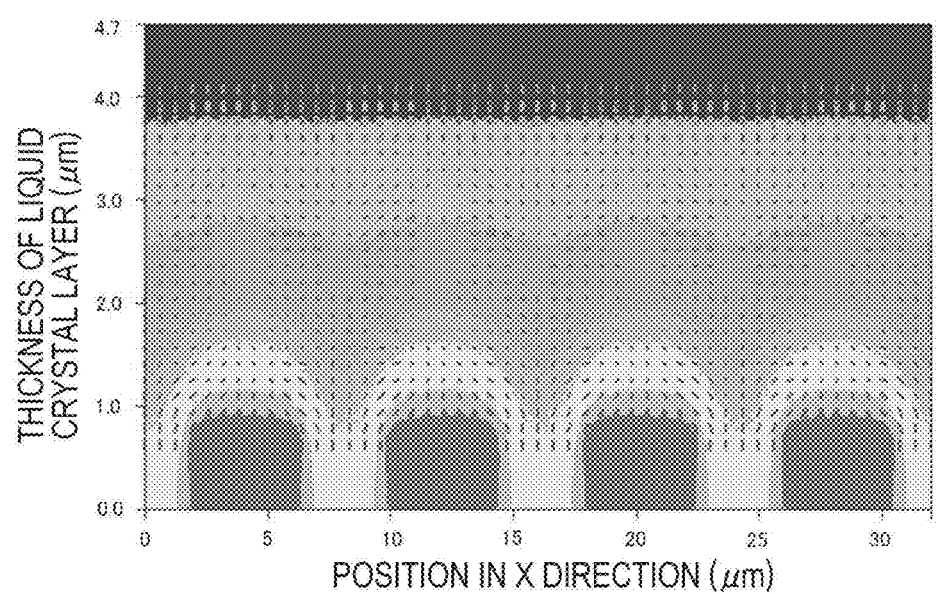

FIG. 42 is a graph showing a result of a simulation of an electric field profile of a low dielectric material layer having a dielectric constant of 5 in a liquid crystal display device according to a tenth comparative example.

Figure 43:
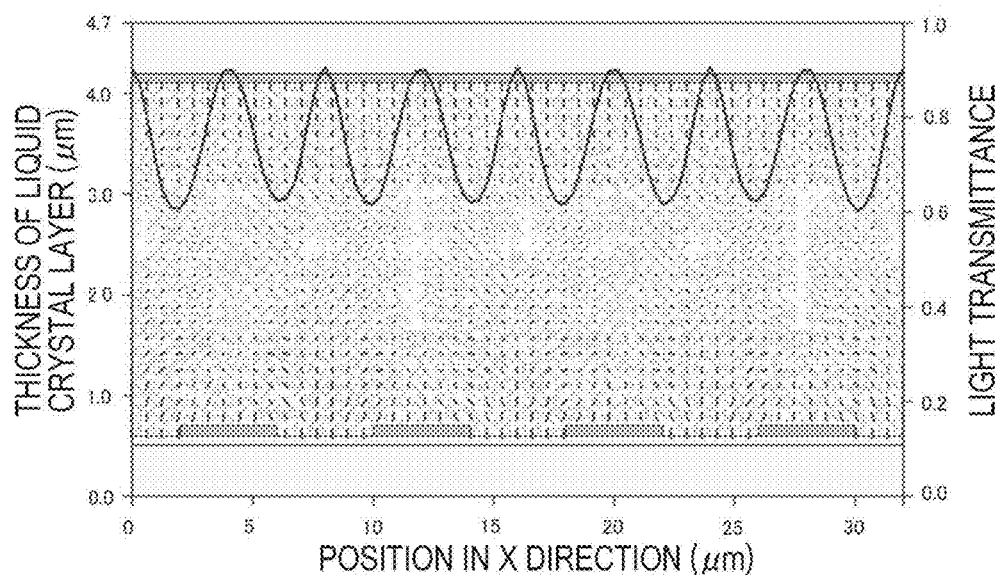

FIG. 43 is a graph showing a result of a simulation of a light transmittance profile of the low dielectric material layer having a dielectric constant of 5 in the liquid crystal display device according to the tenth comparative example.

Figure 44:
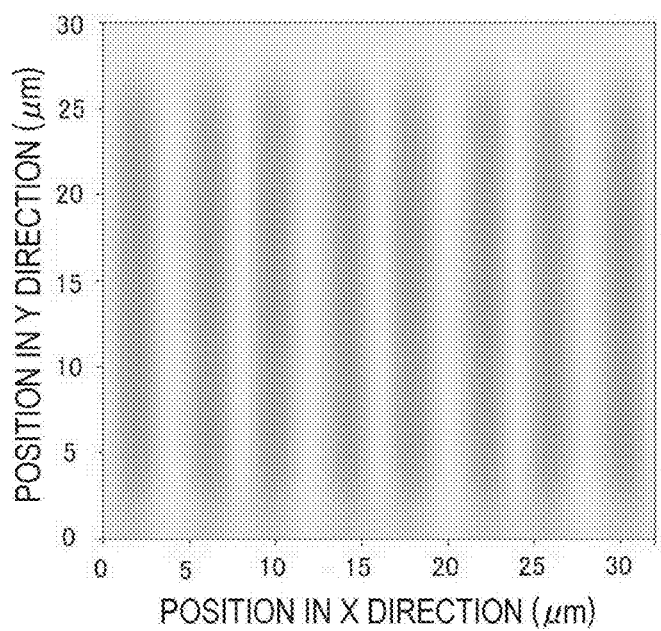

FIG. 44 is a graph showing a result of a simulation of light transmittance of the low dielectric material layer having a dielectric constant of 5 in the liquid crystal display device according to the tenth comparative example, on the assumption that one pixel is viewed from above.

Figure 45:
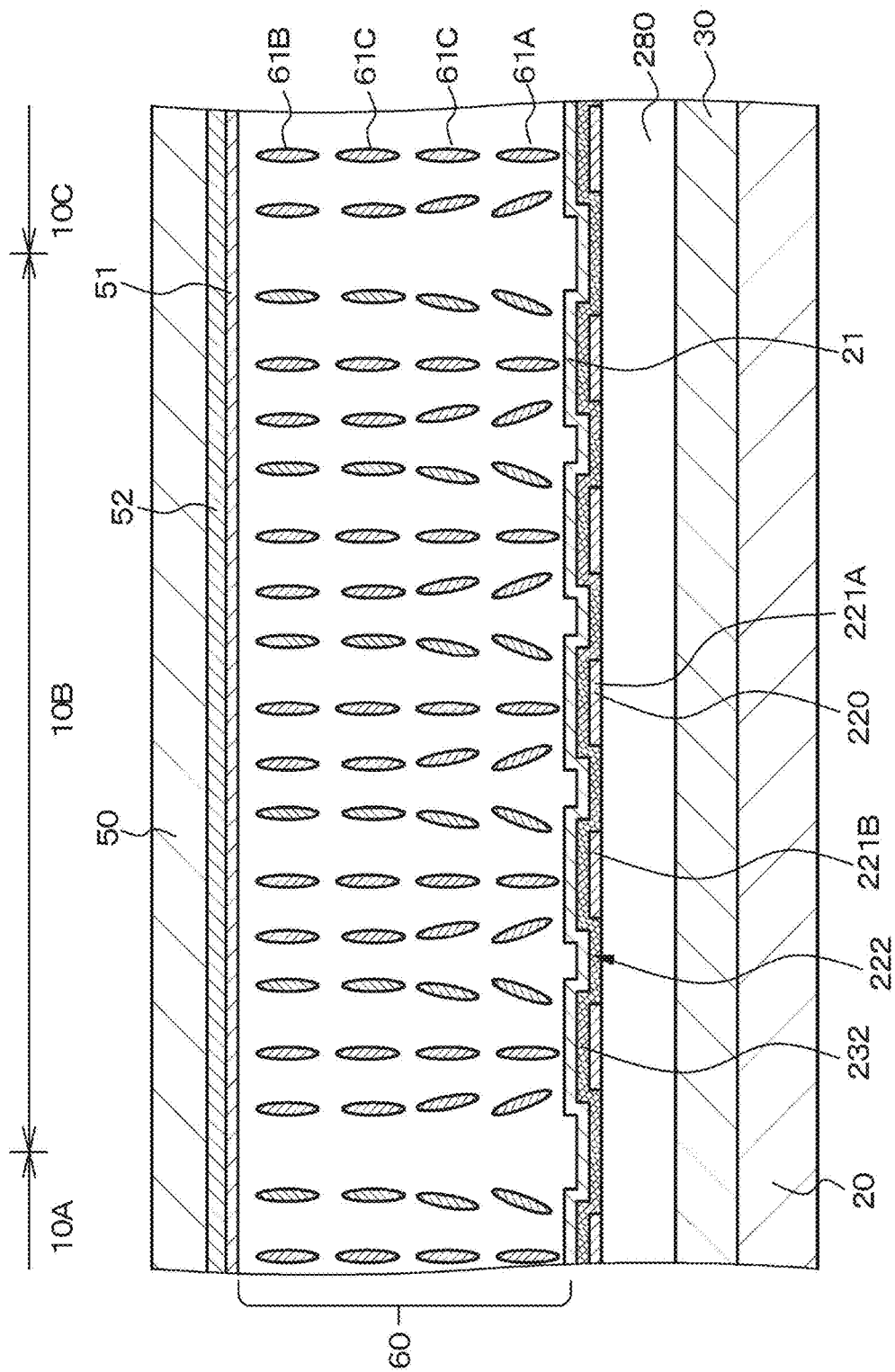

FIG. 45 is a schematic partial cross-sectional view of a liquid crystal display device according to an eleventh embodiment.

Figure 46:
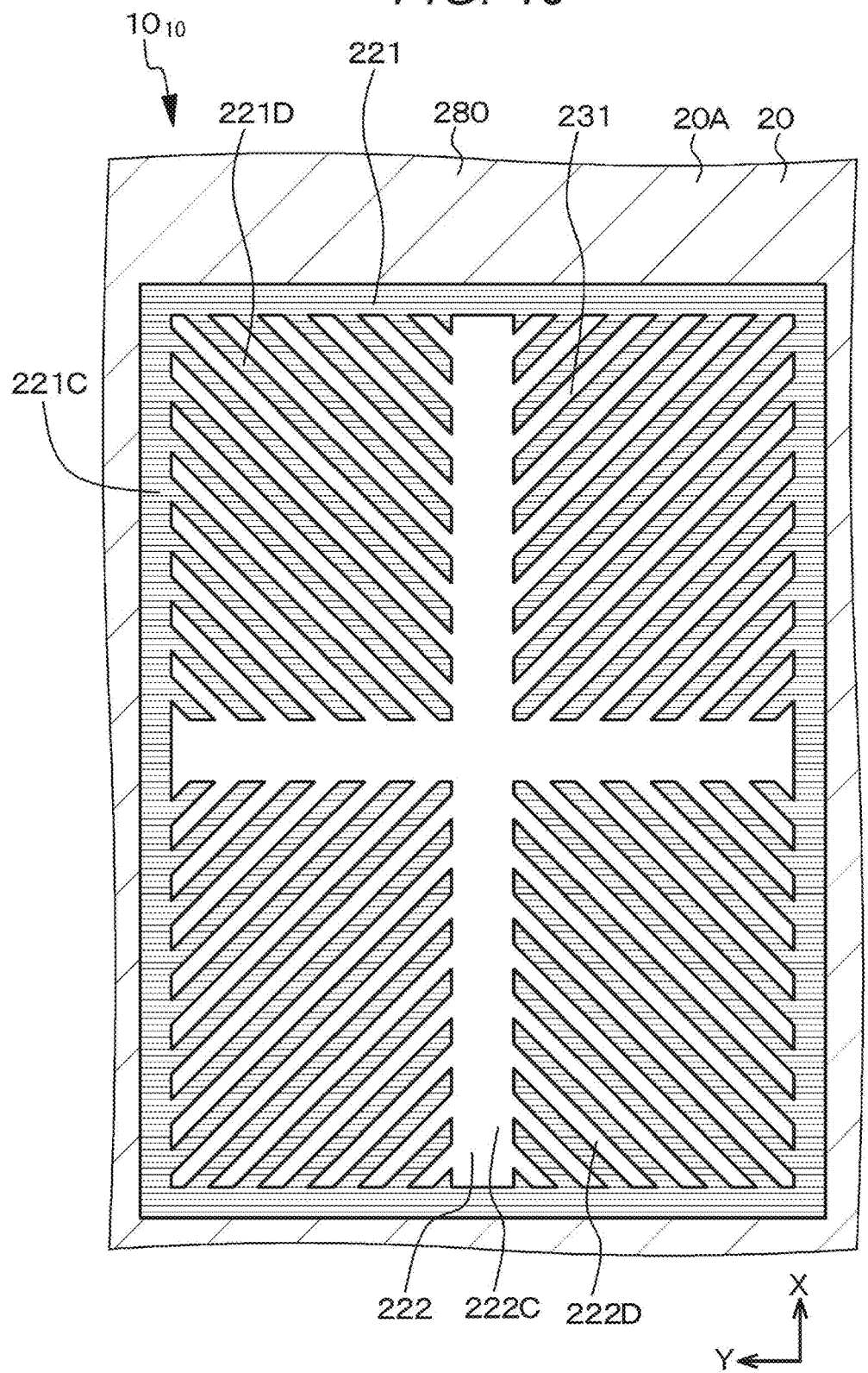

FIG. 46 is a schematic view of one pixel on a first substrate constituting a liquid crystal display device according to a twelfth embodiment as viewed from above.

Figure 47:
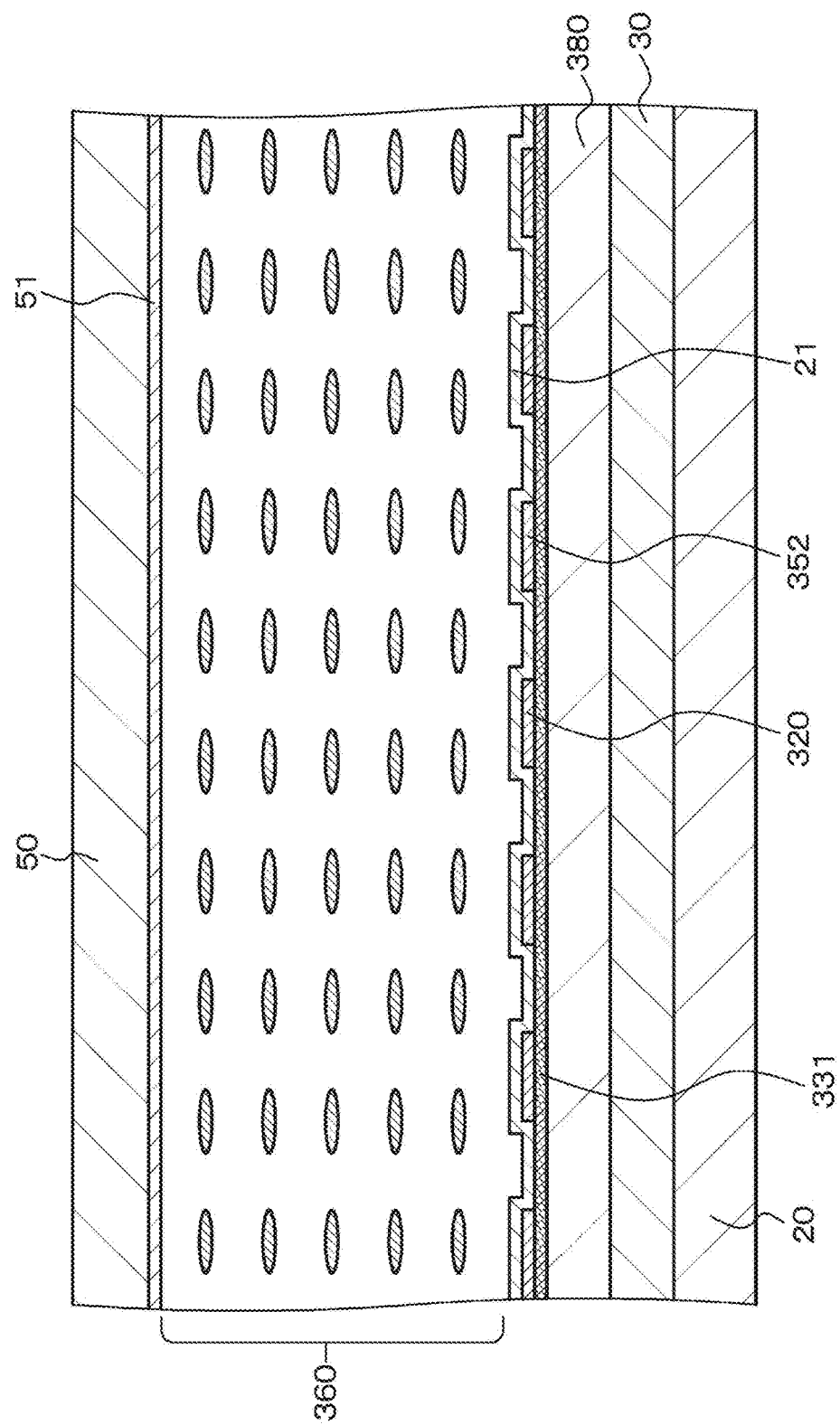

FIG. 47 is a schematic partial cross-sectional view of a liquid crystal display device according to a thirteenth embodiment.

Figure 48:
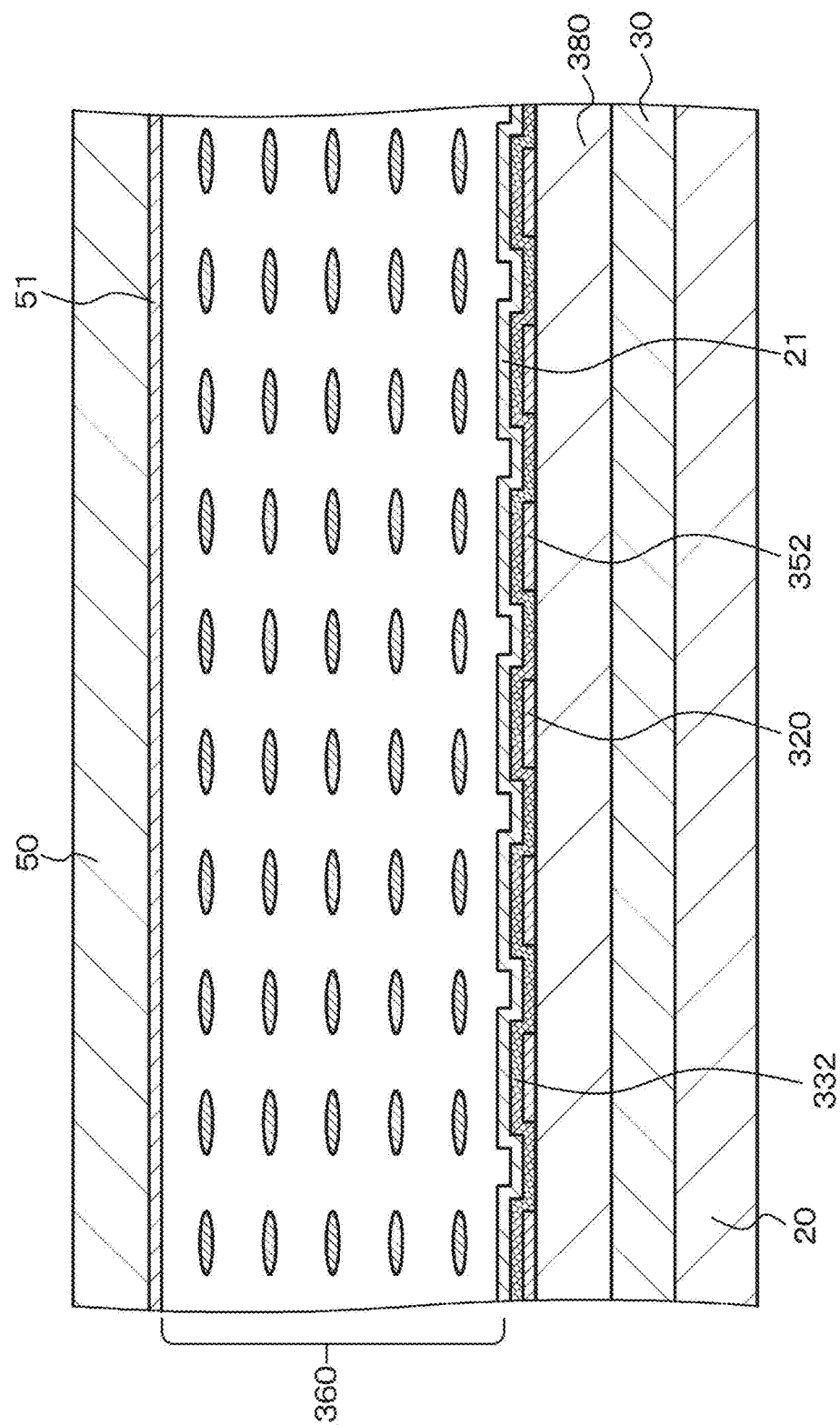

FIG. 48 is a schematic partial cross-sectional view of a liquid crystal display device according to a fourteenth embodiment.

Figure 49:
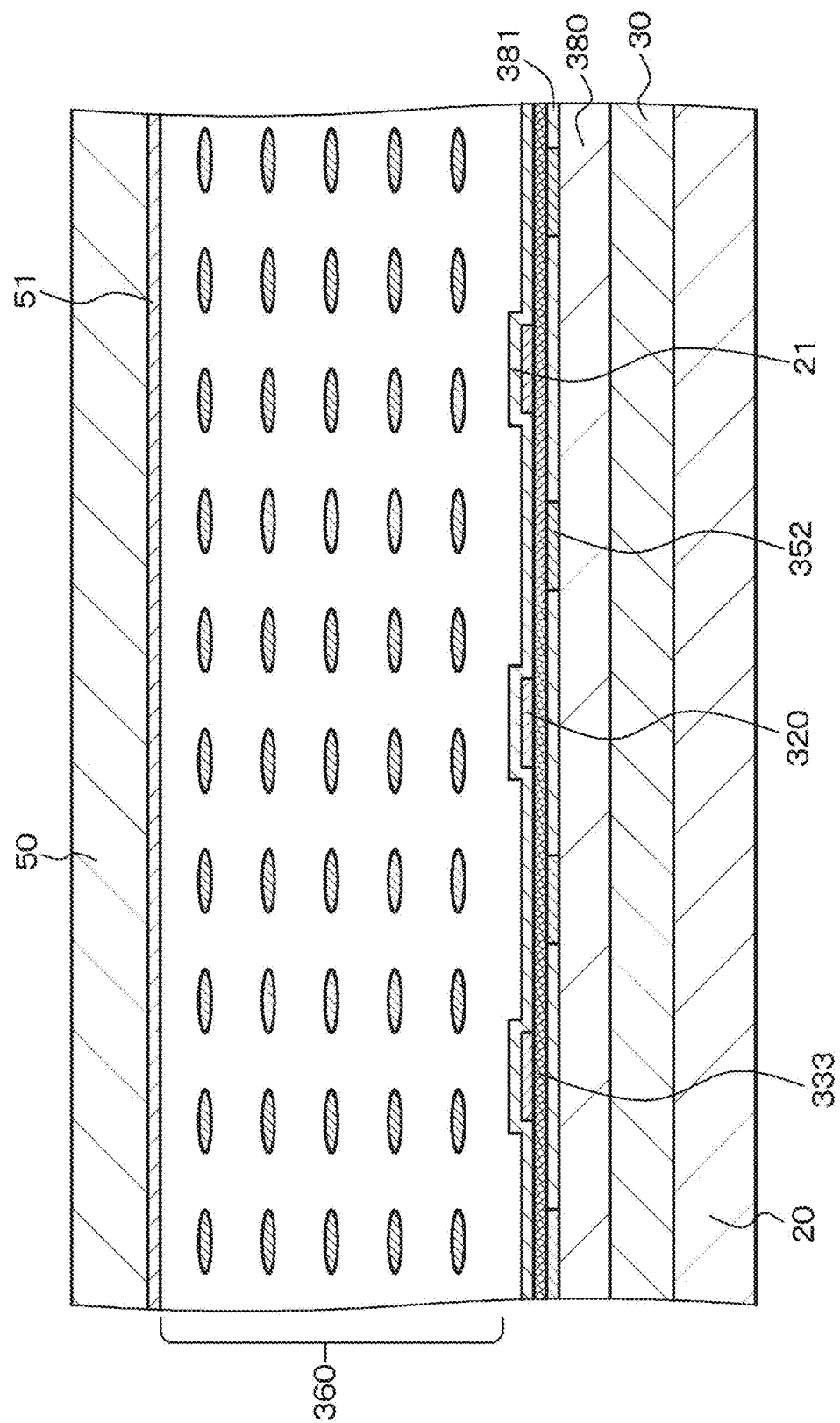

FIG. 49 is a schematic partial cross-sectional view of a liquid crystal display device according to a fifteenth embodiment.

Figure 50:
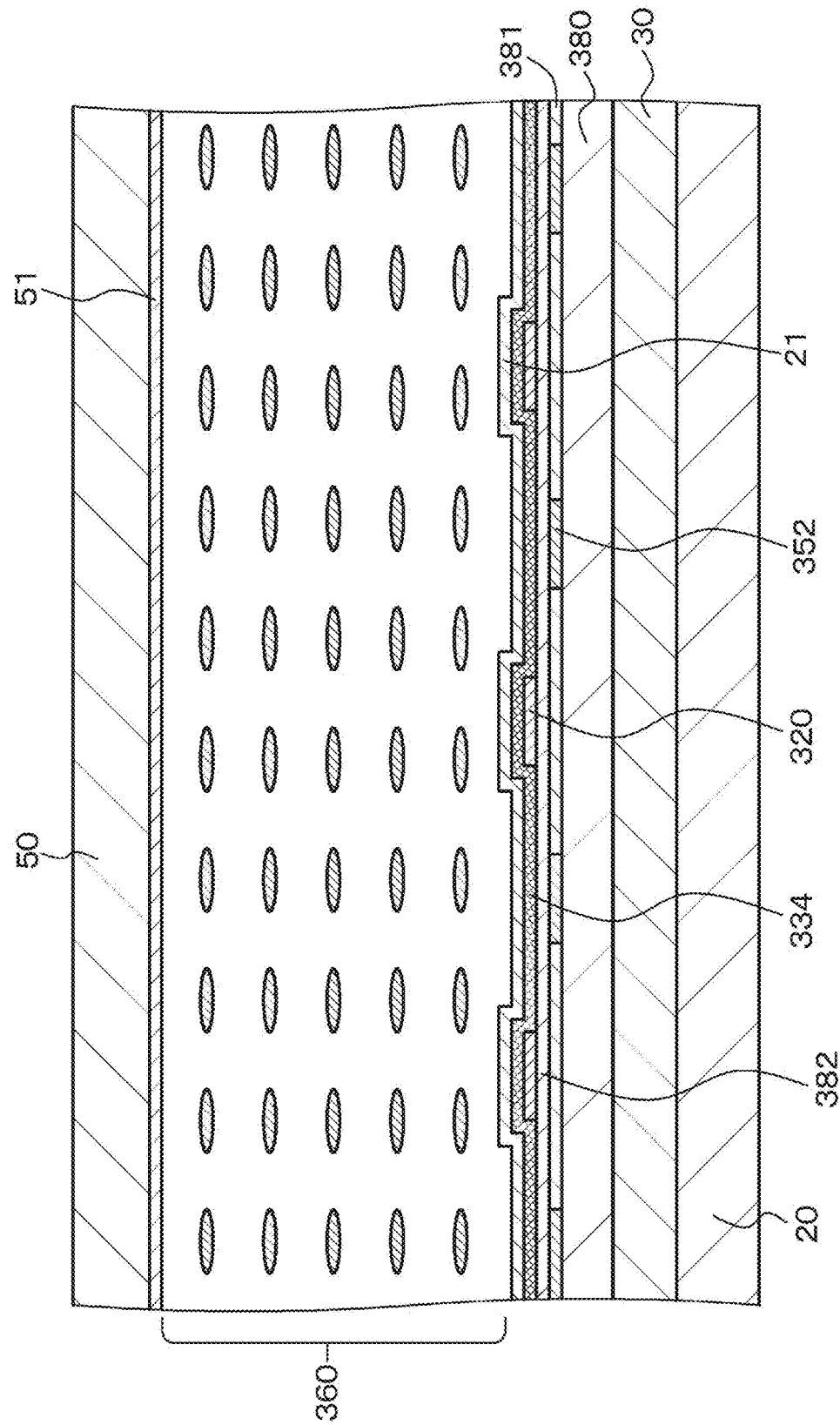

FIG. 50 is a schematic partial cross-sectional view of a liquid crystal display device according to a sixteenth embodiment.

Figure 51A:
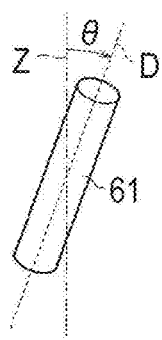
Figure 51B:
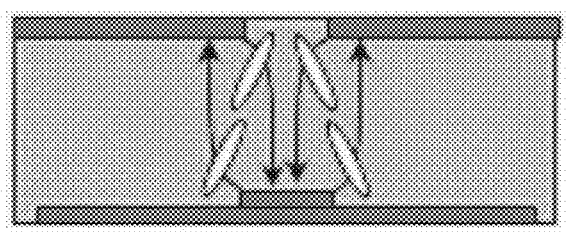
Figure 51C:
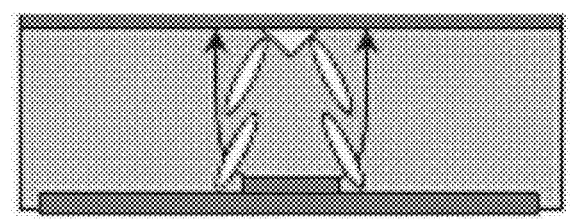

FIG. 51A is a schematic view explaining a pre-tilt of a liquid crystal molecule, while each of FIGS. 51B and 51C is a conceptual view of a behavior of the liquid crystal molecule of the liquid crystal display device according to the third embodiment.

Figure 1:
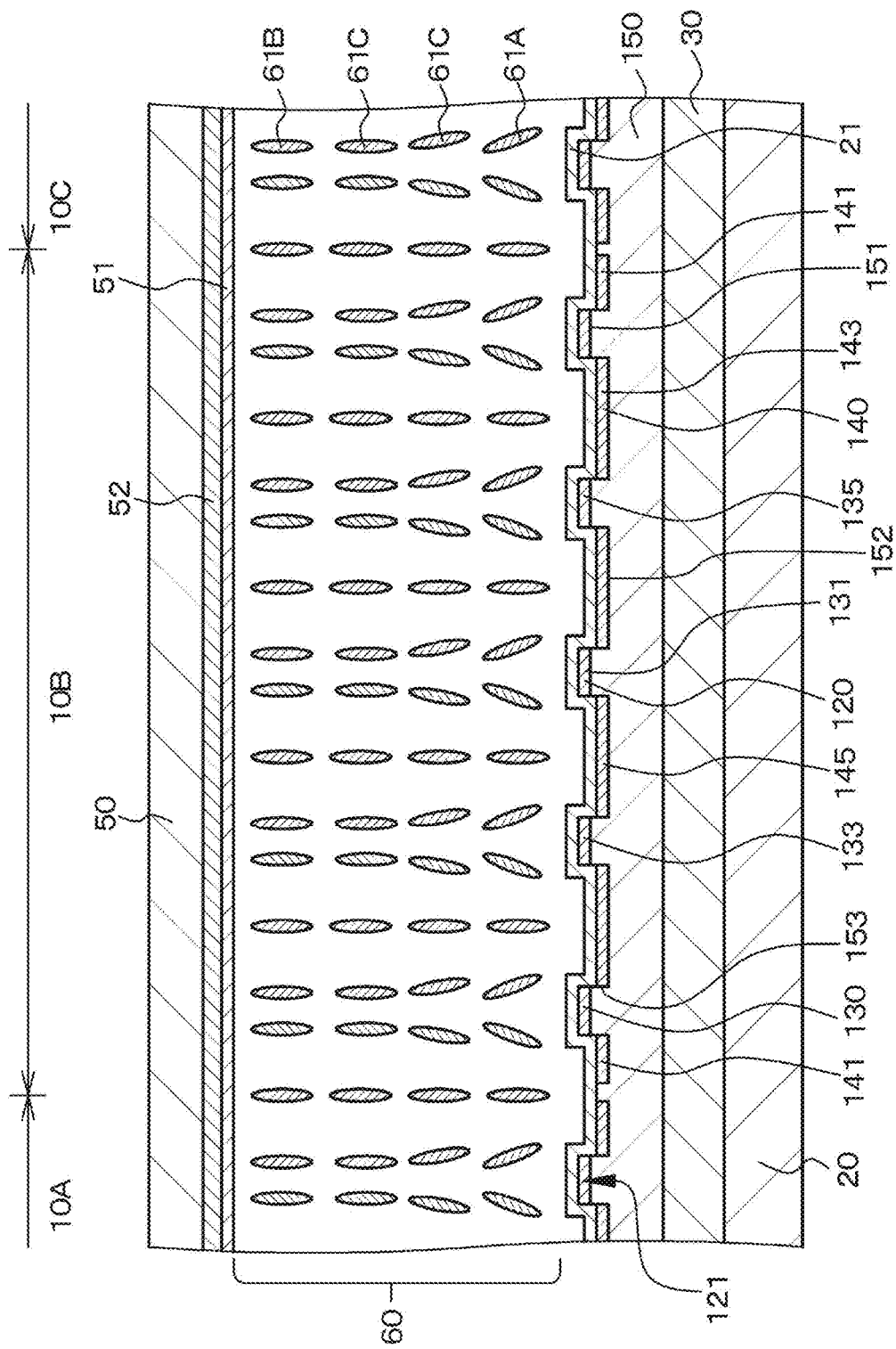
FIG. 1 is a schematic partial cross-sectional view of a liquid crystal display device according to a first embodiment.
Figure 52:
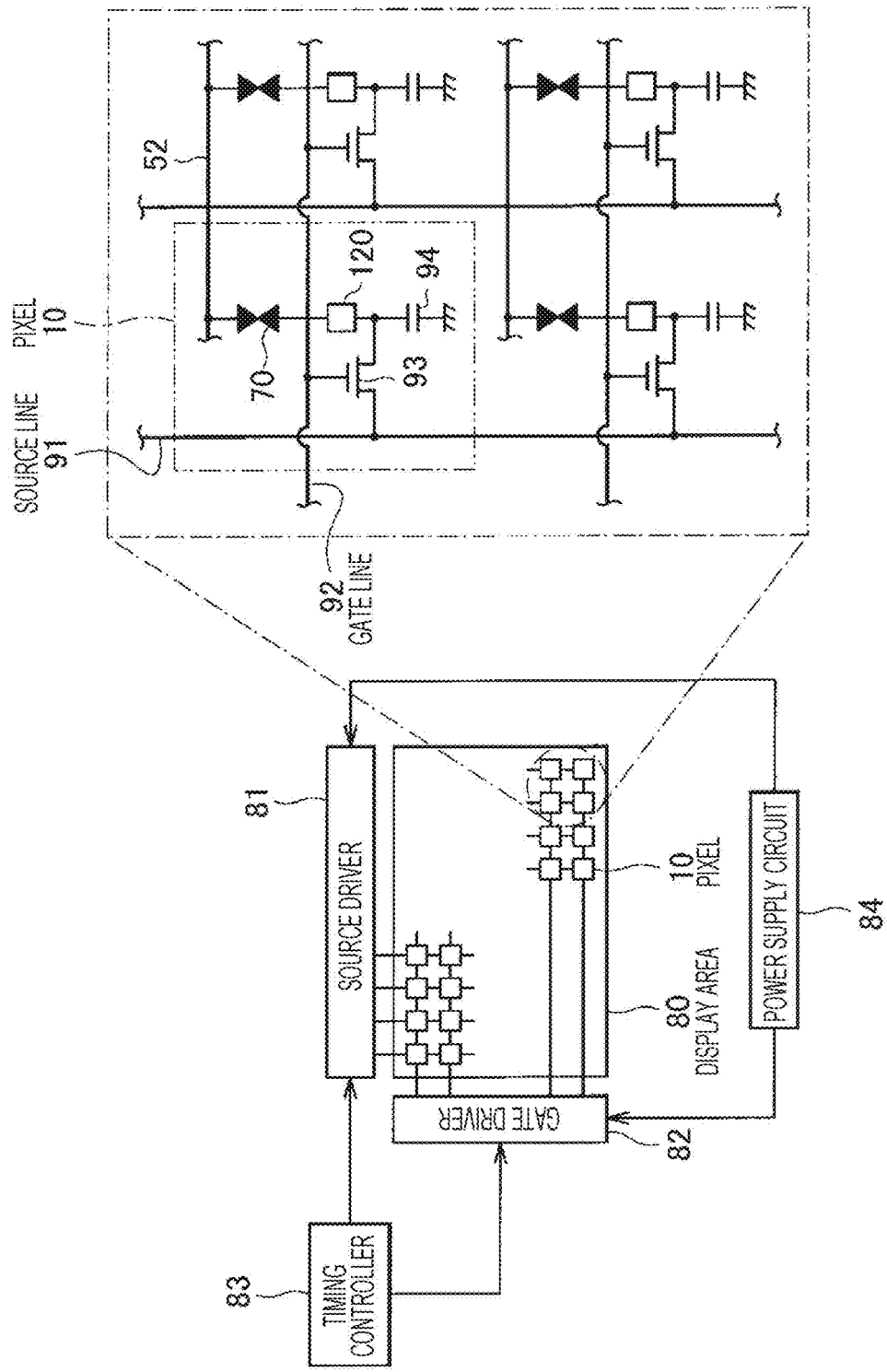

FIG. 52 is a circuit configuration diagram of the liquid crystal display device illustrated in FIG. 1.

Figure 53A:
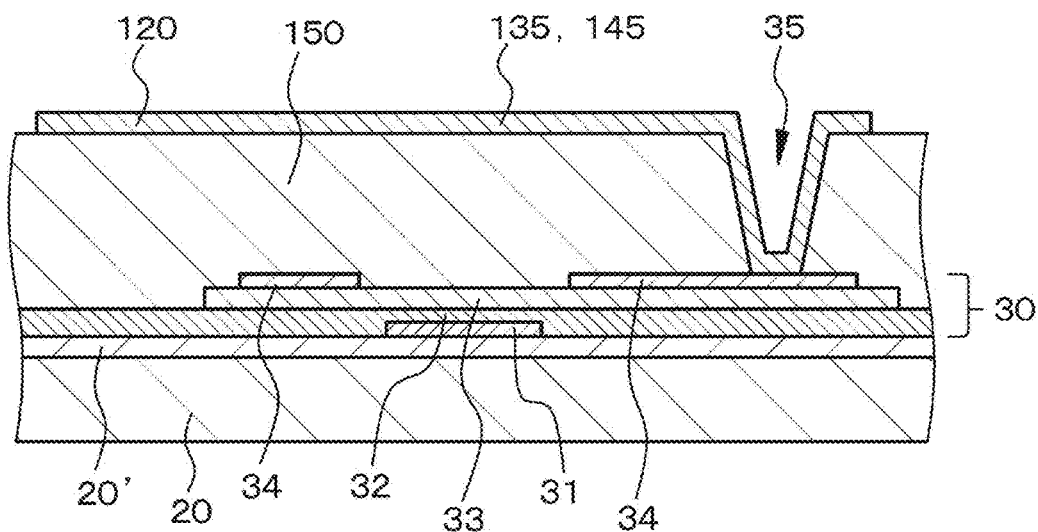
Figure 53B:
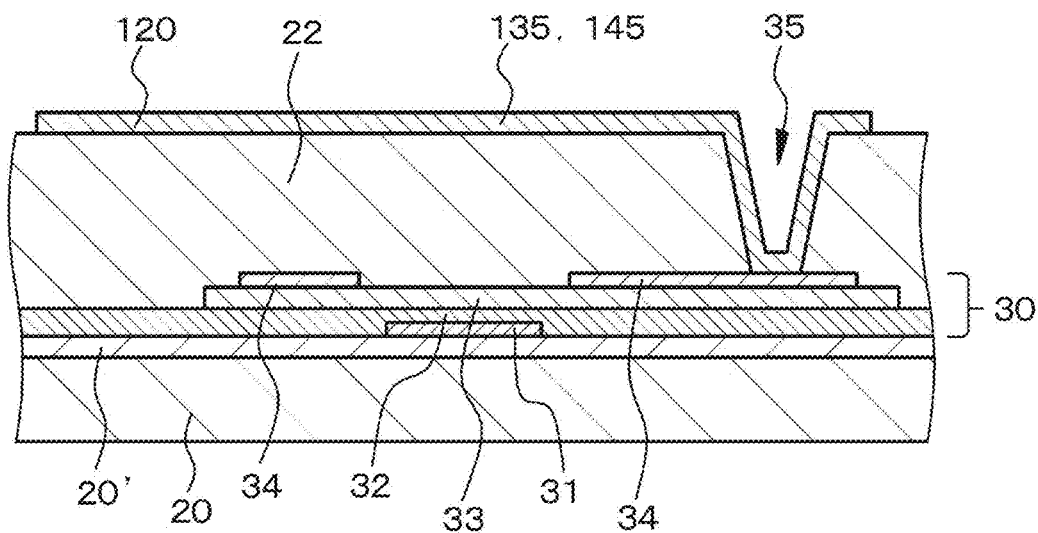

Each of FIGS. 53A and 53B is a schematic partial end face view of a first substrate on which a TFT and the like and a first electrode are formed.

Figure 54:
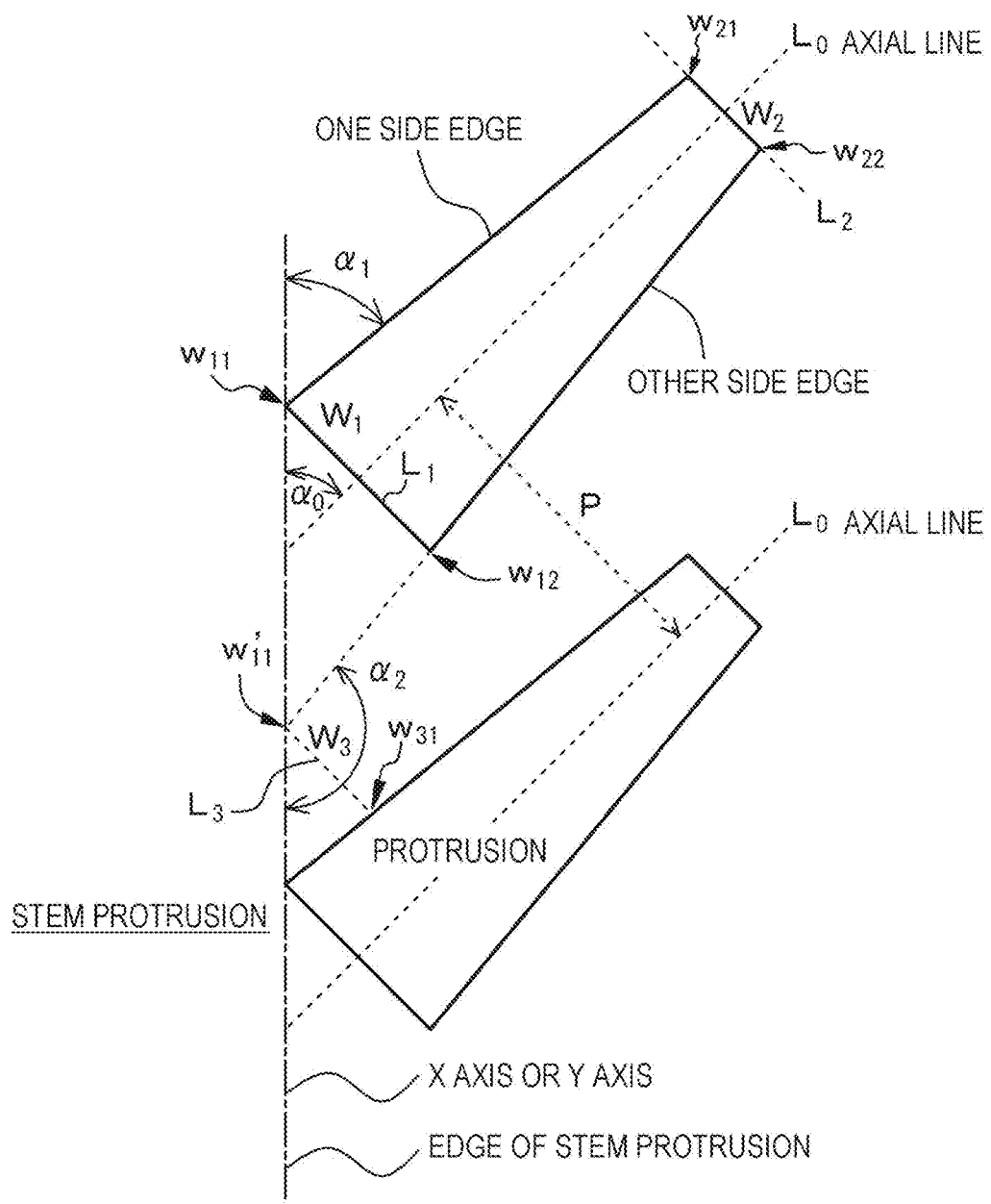

FIG. 54 is a schematic plan view of a part of branch protrusions, explaining a formation pitch of the branch protrusions, a width of each of the branch protrusions, a tip width of the branch protrusions, and others.

Figure 55:
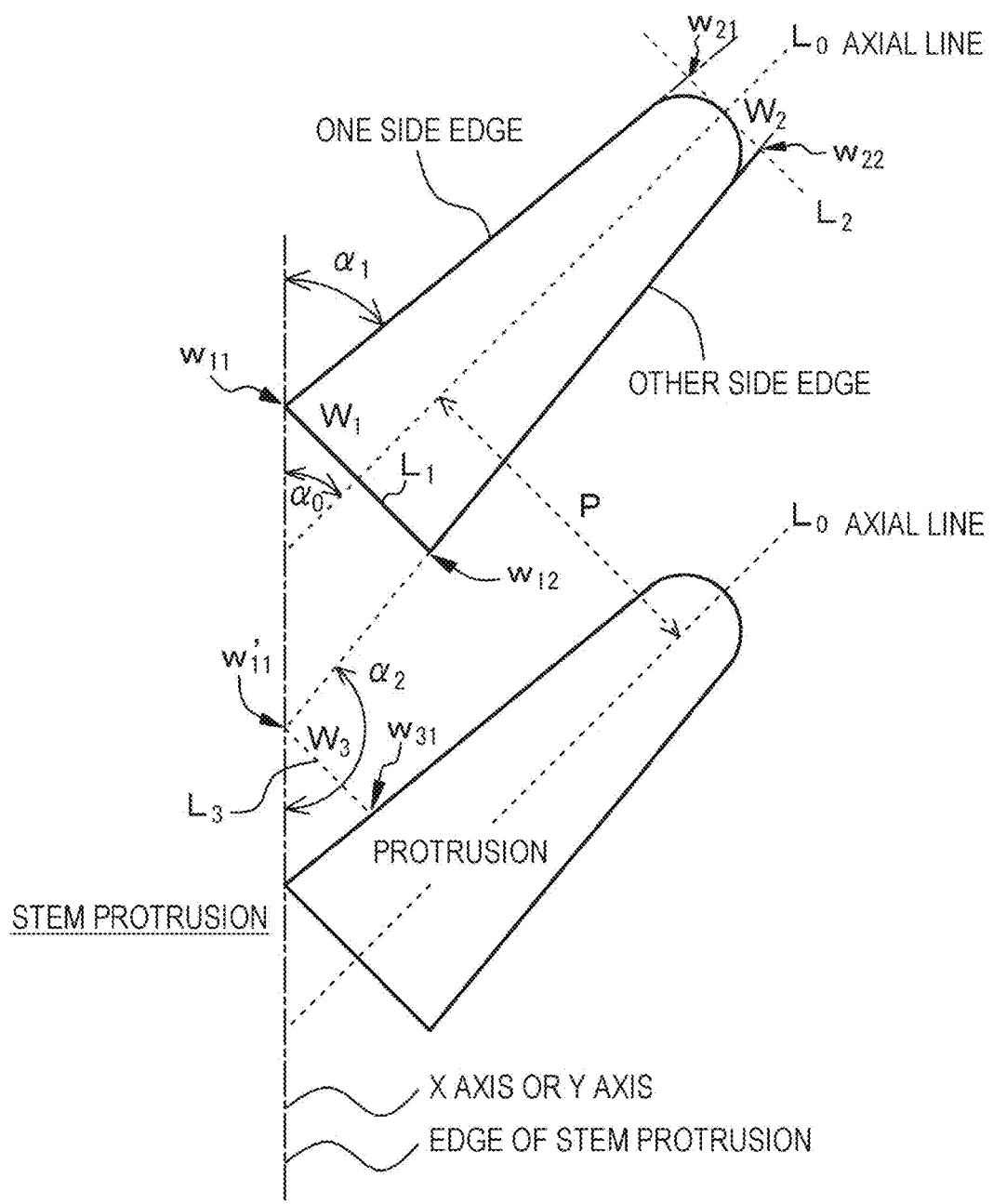

FIG. 55 is a schematic plan view of a part of branch protrusions, explaining a formation pitch of the branch protrusions, a width of each of the branch protrusions, a tip width of the branch protrusions, and others.

MODES FOR CARRYING OUT THE INVENTION

Hereinafter the present disclosure is described on the basis of embodiments with reference to the drawings. However, the present disclosure is not limited to the respective embodiments described herein. Various numerical values and materials included in the respective embodiments are presented only by way of example. Note that the description proceeds in the following order.

1. General description of liquid crystal display device of present disclosure
2. First embodiment (liquid crystal display device in first mode of present disclosure: liquid crystal display device in first example of first mode)
3. Second embodiment (modification of first embodiment: liquid crystal display device in second example of first mode)
4. Third embodiment (modification of first and second embodiments)
5. Fourth embodiment (another modification of first and second embodiments)
6. Fifth embodiment (modification of first through fourth embodiments)
7. Sixth embodiment (another modification of first embodiment)
8. Seventh embodiment (modification of first through sixth embodiments)
9. Eighth embodiment (further modification of first and second embodiments)
10. Ninth embodiment (formation of first electrode separation portion for separation between first transparent conductive material layer and second transparent conductive material layer)
11. Tenth embodiment (liquid crystal display device of second mode in present disclosure)
12. Eleventh embodiment (modification of tenth embodiment)
13. Twelfth embodiment (modification of tenth and eleventh embodiments)
14. Thirteenth embodiment (liquid crystal display device in third mode of present disclosure)
15. Fourteenth embodiment (modification of thirteenth embodiment)
16. Fifteenth embodiment (another modification of thirteenth embodiment)
17. Sixteenth embodiment (modification of fifteenth embodiment)
18. Others <General Description of Liquid Crystal Display Devices in First Through Third Modes of Present Disclosure>

According to a liquid crystal display device in the first mode of the present disclosure, a first transparent conductive material layer formed on protrusion top faces of a base layer, and a second transparent conductive material layer formed on recess bottom faces of the base layer may be separated from each other via a side face of the base layer.

In the liquid crystal display device according to the first mode of the present disclosure including the above preferable configuration, the protrusions may include a stem protrusion that passes through a pixel central portion and radially extends (e.g. in cross shape), and a plurality of branch protrusions that extend from the stem protrusion toward a pixel peripheral portion, and the recesses may include a stem recess that is provided in the pixel peripheral portion in a frame shape and surrounds the protrusions, and branch recesses that extend from the stem recess and are positioned between the branch protrusions. Note that this configuration is also referred to as "liquid crystal display device in first example of first mode" for convenience.

Alternatively, the protrusions may include a stem protrusion that is provided on a pixel peripheral portion in a frame shape, and a plurality of branch protrusions that extend from the stem protrusion toward a pixel inner portion, and the recesses may include a stem recess that passes through a pixel central portion and radially extends (e.g. in cross shape), and branch recesses that extend from the stem recess toward the pixel peripheral portion, and are positioned between the branch protrusions. Note that this configuration is also referred to as "liquid crystal display device in second example of first mode" for convenience.

In the liquid crystal display device according to the first mode of the present disclosure including various preferable configurations described above, assuming that a (X, Y) coordinate system is defined by an X axis and a Y axis that are straight lines passing through the pixel central portion and extending in parallel with the pixel peripheral portion, the plurality of branch protrusions occupying a first quadrant extend in parallel with a direction where a Y coordinate value may increase as an X coordinate value increases, the plurality of branch protrusions occupying a second quadrant extend in parallel with a direction where a Y coordinate value may increase as an X coordinate value decreases, the plurality of branch protrusions occupying a third quadrant extend in parallel with a direction where a Y coordinate value may decrease as an X coordinate value decreases, and the plurality of branch protrusions occupying a fourth quadrant extend in parallel with a direction where a Y coordinate value may decrease as an X coordinate value increases. This positioning state of the branch protrusions is called a multi-domain electrode structure. The branch protrusions in one pixel constitute areas extending in different directions. Accordingly, viewing angle characteristics improve. This point is applicable to the following description.

In addition, the plurality of branch protrusions occupying the first quadrant preferably extend such that the axial line of these branch protrusions and the X axis form an angle of 45 degrees. The plurality of branch protrusions occupying the second quadrant preferably extend such that the axial line of these branch protrusions and the X axis form an angle of 135 degrees. The plurality of branch protrusions occupying the third quadrant preferably extend such that the axial line of these branch protrusions and the X axis form an angle of 225 degrees. The plurality of branch protrusions occupying the fourth quadrant preferably extend such that the axial line of these branch protrusions and the X axis form an angle of 315 degrees. The respective angles are not limited to the specific values (angles). This point is applicable to the following description.

In the liquid crystal display device according to the second mode of the present disclosure, the first electrode includes a plurality of slits. Assuming that parts of the first electrode other than the slits are referred to as "electrode parts", the first electrode may be constituted by the plurality of slits and electrode parts, the electrode parts may include a stem electrode part that passes through a pixel central portion and radially extends (e.g. in cross shape), and a plurality of branch electrode parts that extend from the stem electrode part toward a pixel peripheral portion. The slits correspond to areas between the branch electrode parts. Note that this configuration is also referred to as "liquid crystal display device in first example of second mode" for convenience.

Alternatively, the first electrode may be constituted by the plurality of slits and electrode parts, the electrode parts may include a stem electrode part that is provided on a pixel peripheral portion in a frame shape, and a plurality of branch electrode parts that extend from the stem electrode part toward a pixel inner portion, and the slits may include a stem slit that passes through a pixel central portion and radially extends (e.g. in cross shape), and branch slits that extend from the stem slit toward the pixel peripheral portion, and are positioned between the branch electrode parts. The branch slits correspond to areas between the branch electrode parts. Note that this configuration is also referred to as "liquid crystal display device in second example of second mode" for convenience.

In the liquid crystal display device according to the second mode of the present disclosure including various preferable configurations described above, assuming that a (X, Y) coordinate system is defined by an X axis and a Y axis that are straight lines passing through the pixel central portion and extending in parallel with the pixel peripheral portion, the plurality of branch electrode parts occupying a first quadrant extend in parallel with a direction where a Y coordinate value may increase as an X coordinate value increases, the plurality of branch electrode parts occupying a second quadrant extend in parallel with a direction where a Y coordinate value may increase as an X coordinate value decreases, the plurality of branch electrode parts occupying a third quadrant extend in parallel with a direction where a Y coordinate value may decrease as an X coordinate value decreases, and the plurality of branch electrode parts occupying a fourth quadrant extend in parallel with a direction where a Y coordinate value may decrease as an X coordinate value increases. This positioning state of the branch electrode parts is called a multi-domain electrode structure. The branch electrode parts in one pixel constitute areas extending in different directions. Accordingly, viewing angle characteristics improve. This point is applicable to the following description.

In addition, the plurality of branch electrode parts occupying the first quadrant preferably extend such that the axial line of these branch protrusions and the X axis form an angle of 45 degrees. The plurality of branch electrode parts occupying the second quadrant preferably extend such that the axial line of these branch protrusions and the X axis form an angle of 135 degrees. The plurality of branch electrode parts occupying the third quadrant preferably extend such that the axial line of these branch protrusions and the X axis form an angle of 225 degrees. The plurality of branch electrode parts occupying the fourth quadrant preferably extend such that the axial line of these branch protrusions and the X axis form an angle of 315 degrees. The respective angles are not limited to the specific values (angles). This point is applicable to the following description.

According to the liquid crystal display device in the second mode of the present disclosure, in a state that the first electrode is provided above a high dielectric material layer, the first electrode is practically provided above the high dielectric material layer formed above an interlayer insulation layer, for example. In addition, in a state that the first electrode is provided below a high dielectric material layer, the first electrode is practically provided above an interlayer insulation layer, for example. In this case, a high dielectric material layer is formed on the first electrode, and above the interlayer insulation layer exposed between parts of the first electrode.

According to a liquid crystal display device in the third mode of the present disclosure, the first electrode and the second electrode are provided on the counter face of the first substrate, the counter face facing the second substrate, such that the first electrode and the second electrode are disposed away from each other. At least the first electrode is provided above or below a high dielectric material layer. More specifically, adoptable configurations are:

[a] the first electrode and the second electrode are provided in an identical plane, and the first electrode and the second electrode are provided above the high dielectric material layer;

[b] the first electrode and the second electrode are provided in an identical plane, and the first electrode and the second electrode are provided below the high dielectric material layer;

[c] the first electrode and the second electrode are provided in different planes, and the first electrode is provided above the high dielectric material layer; and

[d] the first electrode and the second electrode are provided in different planes, and the first electrode is provided below the high dielectric material layer.

Here, in case [a}, the high dielectric material layer is practically formed above the interlayer insulation layer. The first electrode and the second electrode are provided above the high dielectric material layer. In addition, in case [b], the first electrode and the second electrode are provided above the interlayer insulation layer. The dielectric material layer is formed above the first electrode, the second electrode, and the interlayer insulation layer exposed between the first electrode and the second electrode. Furthermore, in case [c], the second electrode is provided above the interlayer insulation layer, for example. The high dielectric material layer is formed above the interlayer insulation layer and the second electrode. The first electrode is provided above the high dielectric material layer. Alternatively, the second electrode is provided above the interlayer insulation layer, for example. A second interlayer insulation layer and the high dielectric material layer are formed above the interlayer insulation layer and the second electrode. The first electrode is provided above the high dielectric material layer. In addition, in case [d], the second electrode is provided above the interlayer insulation layer, for example. A second interlayer insulation layer is formed above the interlayer insulation layer and the second electrode. The first electrode is provided above the second interlayer insulation layer. The high dielectric material layer is formed above the first electrode and the second interlayer insulation layer. Note that in any one of the above cases, the first electrode and the second electrode form a comb teeth structure facing each other and alternately combined. In this case, an image of a comb teeth portion of the first electrode projected to the first substrate, and an image of a comb teen portion of the second electrode projected to the first substrate do not overlap with each other.

In addition, according to the liquid crystal display devices in the first through third modes of the present disclosure including various preferable configurations described above, a black matrix may be provided, and a projected image of a part of the first substrate positioned between the pixels and a projected image of the pixel peripheral portion, and a projected image of the black matrix may overlap with each other.

In addition, according to the liquid crystal display device in the first mode of the present disclosure including various preferable configurations described above, the first power supply portion may be connected to a first driving circuit, while the second power supply portion may be connected to a second driving circuit. Note that this configuration is also referred to as "liquid crystal display device of 1-A configuration" for convenience.

According to the liquid crystal display device of 1-A configuration, the first power supply portion may include a first capacity portion, while the second power supply portion may include a second capacity portion.

In addition, according to the liquid crystal display device of 1-A configuration, a first orientation film that covers the first electrode, and a second orientation film that covers the second electrode may be further included, and a pre-tilt may be given to the liquid crystal molecules by reaction of a photosensitive group (orientation control material) that constitutes at least the first orientation film under application of a predetermined electric field to the liquid crystal layer in accordance with application of voltage from the first power supply portion to the first transparent conductive material layer.

Alternatively, a first orientation film that covers the first electrode, and a second orientation film that covers the second electrode may be further included, and a pre-tilt may be given to the liquid crystal molecules by reaction of polymerizable monomers (orientation control material) contained in the liquid crystal layer under application of a predetermined electric field to the liquid crystal layer in accordance with application of voltage from the first power supply portion to the first transparent conductive material layer. Voltages may be applied from the first power supply portion to the first transparent conductive material layer, and from the second power supply portion to the second transparent conductive material layer. In this case, it is preferable that $$|V_{11}|>|V_{12}|$$

holds on the assumption that a voltage applied from the first power supply portion to the first transparent conductive material layer, and a voltage applied from the second power supply portion to the second transparent conductive material layer are $V_{11}$ and $V_{12}$, respectively.

In addition, according to the liquid crystal display device of 1-A configuration including the preferable configuration described above, voltages may be applied from the first power supply portion to the first transparent conductive material layer, and from the second power supply portion to the second transparent conductive material layer during image display. It is preferable that $$|V_{21}|\geq|V_{22}|$$

holds on the assumption that a voltage applied from the first power supply portion to the first transparent conductive material layer, and a voltage applied from the second power supply portion to the second transparent conductive material layer are $V_{21}$ and $V_{22}$, respectively.

Alternatively, according to the liquid crystal display device in the first mode of the present disclosure including various preferable configurations described above, the first power supply portion and the second power supply portion may be connected to a driving circuit, the first power supply portion may include a first capacity portion, and the second power supply portion may include a second capacity portion. Note that this configuration is also referred to as "liquid crystal display device of 1-B configuration" for convenience. Assuming that the capacity of the first capacity portion is $C_1$, and that the capacity of the second capacity portion is $C_2$, $$C_1 < C_2$$

holds. In this case, voltage is applied to the first transparent conductive material layer earlier than to the second transparent conductive material layer, wherefore liquid crystal molecules adjacent to the first transparent conductive material layer start moving earlier than the liquid crystal molecules adjacent to the second transparent conductive material layer. Accordingly, rapid response to image display is achievable.

According to the liquid crystal display device in the first mode of the present disclosure including various preferable configurations and structures described above, the protrusions may have a double layer structure constituted by a lamination of a first insulation layer and a second insulation layer from bottom to top, and an etching speed of the first insulation layer may be higher than an etching speed of the second insulation layer in etching the first insulation layer and the second insulation layer.

According to the liquid crystal display device in the first example of the first mode, the stem protrusion passes through the pixel central portion and extends radially (e.g. in cross shape). More specifically, the stem protrusion may extend in parallel with the X axis and the Y axis, for example. In addition, according to the liquid crystal display device in the second example of the first mode, the stem recess passes through the pixel central portion and extends radially (e.g. in cross shape). More specifically, the stem recess may extend in parallel with the X axis and the Y axis, for example.

According to the respective liquid crystal display devices in the first through third modes of the present disclosure, on the assumption that an average film thickness of the first orientation film and an average film thickness of the second orientation film are $T_1$ and $T_2$, respectively, it is preferable that a relation $$0.5 \le T_2/T_1 \le 1.5,$$

preferably $0.8 \le T_2/T_1 \le 1.2$ holds. The respective average film thicknesses are not limited to these specific values. The average film thickness of an orientation film in this context refers to a value calculated by dividing a volume of the orientation film occupying one pixel (or one sub pixel) by an area of one pixel (or one sub pixel). By thus specifying the value of $T_2/T_1$, i.e., equalizing, or almost equalizing the average film thickness of the first orientation film and the average film thickness of the second orientation film, burning or the like is securely avoidable.

According to the liquid crystal display device in the first example of the first mode, an orientation regulation portion is formed on the second electrode at a part corresponding to the stem protrusion. By the presence of the orientation regulation portion on the second electrode at a part corresponding to the stem protrusion, an electric field generated by the second electrode is distorted in the vicinity of the orientation regulation portion, or the falling directions of the liquid crystal molecules are regulated in the vicinity of the orientation regulation portion. As a result, an orientation regulation force acting on the liquid crystal molecules in the vicinity of the orientation regulation portion increases, wherefore the tilt-state of the liquid crystal molecules in the vicinity of the orientation regulation portion is securely controllable. Accordingly, reduction of generation of dark lines in an image at a part corresponding to the stem protrusion is more securely achievable during image display. In other words, the liquid crystal display device provided herein is capable of realizing more uniform and high light transmittance while maintaining preferable voltage response characteristics. In addition, reduction of cost and power consumption of a light source constituting a backlight, and improvement of TFT reliability are achievable. Note that this description is applicable by switching the "protrusions" to "electrode parts" in the liquid crystal display device according to the second mode of the present disclosure.

In this case, the orientation regulation portion may be constituted by either a second electrode notch structure provided on the second electrode, a second electrode projection provided on the second electrode, or a projected portion of the second electrode. The second electrode projection is made of a resist material, for example. The second electrode is not provided above the second electrode projection. The projected portion of the second electrode may be produced by forming a protrusion below the second electrode, or by a method similar to the method for producing the protrusions on the first electrode. It is preferable that the width of the second electrode notch structure, the second electrode projection, or the projected portion of the second electrode is smaller than the width of the stem protrusion. Note that this description is applicable by switching the "protrusions" to "electrode parts" in the liquid crystal display device according to the second mode of the present disclosure.

In addition, according to the liquid crystal display devices in the first and second examples of the first mode, a first electrode notch structure or a first electrode projection which passes through the pixel central portion and extends in parallel with the pixel peripheral portion may be formed on the first electrode. By the presence of the first electrode notch structure or the first electrode projection provided on the first electrode in such a shape as to pass through the pixel central portion and extend in parallel with the pixel peripheral portion, i.e., by the presence of the first electrode notch structure or the first electrode projection provided on the stem protrusion and the stem recess, an electric field generated by the first electrode is distorted in the vicinity of the first electrode notch structure, or the falling directions of the liquid crystal molecules are regulated in the vicinity of the first electrode projection, unlike a first electrode which includes flat recesses not containing the first electrode notch structure nor the first electrode projection. As a result, an orientation regulation force acting on the liquid crystal molecules in the vicinity of the first electrode notch structure or the first electrode projection increases, whereby the tilt state of the liquid crystal molecules in the vicinity of the first electrode notch structure or the first electrode projection is securely controllable. Accordingly, reduction of generation of dark lines in an image at portions corresponding to the stem protrusion and stem recess is more securely achievable during image display. In other words, the liquid crystal display device provided herein is capable of realizing more uniform and high light transmittance while maintaining preferable voltage response characteristics. In addition, reduction of cost and power consumption of a light source constituting a backlight, and improvement of TFT reliability are achievable. Note that this description is applicable by switching the "protrusions" to "electrode parts" in the liquid crystal display device according to the second mode of the present disclosure.

The first electrode projection is made of a resist material, for example. The first electrode is not provided above the first electrode projection. Alternatively, a protrusion passing through the pixel central portion and extending radially (e.g. in cross shape) may be produced by recesses surrounding the protrusion on the first electrode. This radial protrusion may be produced by forming a radial protrusion below the first electrode, or by a method similar to the method for forming the protrusions on the first electrode. Alternatively, a recess passing through the pixel central portion and extending radially (e.g. in cross shape) may be formed instead of providing the first electrode notch structure or the first electrode projection (rib).

Note that the first electrode notch structure or the first electrode projection (rib) may be combined with the orientation regulation portion.

According to the liquid crystal display devices in the first and second modes of the present disclosure including the preferable configurations and structures described above, a protrusion structure may be provided on the first substrate from a portion positioned between pixels to a portion corresponding to the pixel peripheral portion. A peripheral portion of the recesses and protrusions may be disposed on the protrusion structure. By the presence of the peripheral portion of the recesses and protrusions thus provided on the protrusion structure, a more intense electric field is generated in the peripheral portion of the recesses and protrusions than in a structure of recesses and protrusions having a flat peripheral portion. As a result, an orientation regulation force acting on the liquid crystal molecules in the peripheral portion of the recesses and protrusions increases, whereby the tilt state of the liquid crystal molecules in the peripheral portion of the recesses and protrusions is securely controllable. Accordingly, preferable voltage response characteristics are realizable. The protrusion structure may be produced on the basis of a black matrix made of a known material.

Alternatively, according to the liquid crystal display devices in the first and second examples of the first mode including the preferable configurations and structures described above, a width of each of the branch protrusions provided on the first electrode may decrease toward a tip of the branch protrusion. Further reduction of dark lines is achievable by decreasing the width of the branch protrusions provided on the first electrode toward the tip of the branch protrusion. Accordingly, more uniform and high light transmittance is realizable, wherefore reduction of dark lines is achievable. A width of each of the branch protrusions may be the largest at a part of connection with the stem protrusion, and decrease from the part of connection with the stem protrusion toward a tip of the branch protrusion. For each of the branch protrusions, the two sides facing each other and extending from the portion connected to the stem protrusion toward the tip of the branch protrusion are referred as "sides" for convenience. In addition, in these configurations, the width of each of the branch protrusions may linearly decrease from the portion connected to the stem protrusion toward the tip of the branch protrusion (each of sides forming branch protrusion is constituted by one line segment, and has constant width change rate). However, other configurations may be adopted in this point and the width may decrease in a curved shape (each of sides forming branch protrusion is constituted by one smooth curve, and has variable width change rate). Alternatively, the respective sides forming each of the branch protrusions may be constituted by two or more line segments or curves, or the width of each of the protrusions may decrease stepwise (each of sides constituting branch protrusion has step shape).

Alternatively, according to the liquid crystal display devices in the second mode of the present disclosure including the preferable configuration and structure described above, a width of each of the branch electrode parts provided on the first electrode may decrease toward a tip of the branch electrode part. Further reduction of dark lines is achievable by thus decreasing the width of the branch electrode parts provided on the first electrode toward the tip of the branch electrode part. Accordingly, more uniform and high light transmittance is realizable, wherefore reduction of dark lines is achievable. A width of each of the branch electrode parts may be the largest at a part connected to the stem electrode part, and decrease from the part connected to the stem electrode part toward a tip of the branch electrode part. For each of the branch electrode parts, the two sides facing each other and extending from the portion connected to the stem electrode part toward the tip of the branch electrode part are referred as "sides" for convenience. In addition, in these configurations, the width of each of the branch electrode parts may linearly decrease from the portion connected to the stem electrode part toward the tip of the branch electrode part (each of sides forming branch electrode part is constituted by one line segment, and has constant width change rate). However, other configurations may be adopted in this point and the width may decrease in a curved shape (each of sides forming branch electrode part is constituted by one smooth curve, and has variable width change rate). Alternatively, the respective sides constituting each of the branch electrode parts may be constituted by two or more line segments or curves, or the width of each of the branch electrode parts may decrease stepwise (each of sides constituting branch electrode part has step shape).

More specifically, according to the liquid crystal display device in the first example of the first mode, for example, the width of each of the branch protrusions may be the largest at a part connected to the stem protrusion as described above, or on or in the vicinity of the X axis, or on or in the vicinity of the Y axis (referred to as "branch protrusion root" for convenience), and decrease toward a peripheral portion of the pixel, i.e., toward the tip of the branch protrusion. It is assumed herein that the formation pitch of the branch protrusions, the width of the root of each branch protrusion, and the width of the tip of each branch protrusion are "P, "$W_1$", and "$W_2$", respectively. As illustrated in FIGS. 54 and 55, assuming that an angle formed by an edge of the stem protrusion connected to the branch protrusion and one edge of the branch protrusion (side edge) (or angle formed by the X axis or Y axis and the one edge (side edge) of the branch protrusion) is $\alpha_1$, and that an angle formed by an outer edge of the stem protrusion connected to the branch protrusion and the other side edge of the branch protrusion (or angle formed by the X axis or Y axis and the other side edge of the branch protrusion) is $\alpha_2$, an angle $\alpha_0$ formed by an axial line $L_0$ of the branch protrusion and the outer edge of the stem protrusion (or angle formed by the X axis or Y axis and the axial line $L_0$ of the branch protrusion) in the vicinity of the outer edge of the stem protrusion is expressed as $\alpha_0=\{\alpha_1+(180-\alpha_2)\}/2$. The ranges of $\alpha_1$ and $\alpha_2$ are set to $0<\alpha_1 \leq 90$ degrees, and $90 \leq \alpha_2 <180$ degrees. Further, in this case, assuming that an intersection between the outer edge of the stem protrusion and the one side edge of the branch protrusion (or intersection between the X axis or Y axis and the one side edge of the branch protrusion) is $w_{11}$, that an intersection between the X axis or Y axis and the other side edge of the branch protrusion is $w'_{11}$, and that a crossing point between the other side edge of the branch protrusion and a straight line $L_1$ passing through the intersection $w_{11}$ and crossing the axial line $L_0$ of the branch protrusion at right angles is $w_{12}$, a distance between the intersection $w_{11}$ and the intersection $w_{12}$ is defined as a width $W_1$ of the root of the branch protrusion. On the other hand, an intersection between the one side edge of the branch protrusion and a straight line $L_2$ crossing the axial line $L_0$ of the branch protrusion at right angles and contacting the tip of the branch protrusion (or intersection between an extension line of the one side edge of the branch protrusion and the straight line $L_2$) is $w_{21}$, and that an intersection between the line $L_2$ and the other side edge of the branch protrusion (or intersection between an extension line of the other side edge of the branch protrusion and the straight line $L_2$) is $w_{22}$, a distance between the intersection $w_{21}$ and the intersection $w_{22}$ is defined as the width $W_2$ of the tip of the branch protrusion. Note that the side edge extension line is indicated by a chain line in FIG. 55. Furthermore, a distance between the axial lines $L_0$ of the adjoining branch protrusions is defined as a formation pitch P of the branch protrusions. In addition, assuming that a crossing point between a straight line $L_3$ passing through the intersection $w'_{11}$ and extending in parallel with the straight line $L_1$ and the one side edge of the branch protrusion facing (adjacent to) the other side edge of the branch protrusion is $w_{31}$, a distance between the intersection $w'_{11}$ and the intersection $w_{31}$ is defined as a distance $W_3$ between the branch protrusions. A full taper width TP of the branch protrusion is defined as $TP=W_1-W_2$. In addition, an average width $W_{ave1}$ of the branch protrusion and an average width $W_{ave2}$ of the recess are expressed as $$W_{ave1}=(W_1 W_2)/2$$

$W_{ave2}=P-W_{ave1}$. In this case, the value of $W_3$ may range from 1 μm to 10 μm, preferably from 2 μm to 5 μm, while the value of $W_2$ may range from 1 μm to 10 μm, preferably from 2 μm to 5 μm. The value of P may range from 2 μm to 20 μm, preferably from 2 μm to 10 μm. In addition, the value of TP may be in the range from 0.1 times to 10 times of $W_3$, for example. Note that these values may be applied to the longest branch protrusion. The similar discussion is applicable to the liquid crystal display device in the second example of the first mode. In addition, the similar discussion is applicable to the liquid crystal display device in the second mode of the present disclosure by switching the "protrusions" to the "electrode parts".

According to the liquid crystal display devices in the first and second examples of the first mode of the present disclosure including the preferable configurations and structures described above, an extension direction of a side portion of the stem protrusion not connected to the branch protrusions may be in parallel with neither the X axis nor the Y axis. In other words, the extension direction of the side part of the stem protrusion not connected to the branch protrusions is a direction different from the X axis and the Y axis. This configuration reduces generation of dark lines in areas corresponding to the X axis and the Y axis. Accordingly, the liquid crystal display device provided herein is capable of realizing more uniform and high light transmittance. In addition, the liquid crystal display device provided herein has a configuration and a structure capable of reducing a time required for giving a pre-tilt to the liquid crystal molecules. The side portion of the stem protrusion not connected to the branch protrusions may have a linear shape and/or a curved shape, i.e., a linear shape, a curved shape, or a combination of linear and curved shapes. Alternatively, the width of the stem protrusion at the part not connected to the branch protrusions may decrease toward the tip of the stem protrusion.

In addition, according to the liquid crystal display devices in the second mode of the present disclosure including the preferable configuration and structure described above, an extension direction of a side portion of the stem electrode part not connected to the branch electrode parts may be in parallel with neither the X axis nor the Y axis. In other words, the extension direction of the side part of the stem electrode part not connected to the branch electrode parts is a direction different from the X axis and the Y axis. This configuration reduces generation of dark lines in areas corresponding to the X axis and the Y axis. Accordingly, the liquid crystal display device provided herein is capable of realizing more uniform and high light transmittance. In addition, the liquid crystal display device provided herein has a configuration and a structure capable of reducing a time required for giving a pre-tilt to the liquid crystal molecules. The side portion of the stem electrode part not connected to the branch electrode parts may have a linear shape and/or a curved shape, i.e., a linear shape, a curved shape, or a combination of linear and curved shapes. Alternatively, the width of the stem electrode part at the part not connected to the branch electrode parts may decrease toward the tip of the stem electrode part.

In addition, according to the liquid crystal display devices in the first and second examples of the first mode of the present disclosure including the preferable configurations and structures described above, a depression may be formed in the first electrode in the center area of the pixel. In other words, the protrusions, the recesses, and a depression are formed in the first electrode. The transparent conductive material layer constituting the first electrode is formed on the depression. Note that this configuration is referred to as a "liquid crystal display device of a third example of the first mode" for convenience. The depression thus formed produces such a state that the liquid crystal molecules positioned in the vicinity of the depression fall toward the center of the pixel. In this case, the depression may narrow toward the first substrate. More specifically, the depression may have a so-called forward tapered slope. However, the depression may have other shapes, such as a vertical face. Further, in case of the configuration of the depression narrowing toward the first substrate, the tilt angle of the depression may range from 5 degrees to 60 degrees, preferably from 20 degrees to 30 degrees. The shape of the outer edge of the depression may be either circular or rectangular. In the latter case, an angle formed by the outer edge of the rectangular depression and the extension direction of the protrusion (angle formed by the outer edge of the rectangular depression and the extension direction of the protrusion whose extension portion crosses the outer edge) may be 90 degrees, or an acute angle. The shape of the outer edge of the depression may be other shapes as long as a structure allowing the liquid crystal molecules to fall toward the pixel center is securable. In addition, the center of the depression may constitute a part of a contact hole. This point is applicable to the liquid crystal display device in the second mode of the present disclosure.

In addition, according to the liquid crystal display device in the first mode of the present disclosure including the preferable configuration and structure described above, the first electrode may further include a slit structure. More specifically, the first electrode includes the protrusions, the recesses, a separation portion between the first transparent conductive material layer and the second transparent conductive material layer (also referred to as "first electrode separation portion"), and the slit structure. The transparent conductive material layer constituting the first electrode is not formed on the slit structure. Note that this configuration is referred to as a "liquid crystal display device in a fourth example of the first mode" for convenience. The slit structure thus formed distorts an electric field generated by the first electrode in the vicinity of the slit structure, and intensely regulates the falling directions of the liquid crystal molecules. As a result, an orientation regulation force acting on the liquid crystal molecules in the vicinity of the slit structure increases, wherefore the tilt-state of the liquid crystal molecules in the vicinity of the slit structure is securely controllable. Problems arising from the conventional fine slit structure are avoidable by the presence of the protrusions and the recesses as well as the slit structure.

According to the liquid crystal display device in the fourth example of the first mode, it is more preferable that the slit structure is formed on the protrusion areas rather than the recess areas, depending on the configuration of the liquid crystal display device. In addition, in case of this preferable configuration, the slit structure may be disposed in the protrusion areas containing the center area (center portion) of the pixel, may be disposed in the protrusion areas extending toward the center area of the pixel, or may be disposed in the protrusion areas sandwiched between the Y axis and the branch protrusions extending toward the center area of the pixel. The width of the slit structure may range from 1 µm to 4 µm, preferably from 2 µm to 3 µm, for example. This point is applicable to following description of the slit structure.

Alternatively, according to the liquid crystal display device in the fourth example of the first mode, a slit structure extending in parallel with the protrusions may be provided on the tops of the protrusions, or a slit structure extending in parallel with the recesses may be provided on the bottoms of the recesses. Further, in these cases, the slit structure may be formed in all of the protrusions, or a part of the protrusions. In case of the slit structure formed in a part of the protrusions, it is preferable that the slit structure is disposed on the protrusions in the center area (center portion) of the pixel and in the vicinity thereof. In addition, the slit structure may be formed in all of the recesses, or a part of the recesses. In case of the slit structure formed in a part of the recesses, it is preferable that the slit structure is disposed on the recesses of the center area (center portion) of the pixel and in the vicinity thereof. Alternatively, the slit structure extending in parallel with the protrusions may be provided on the tops of the protrusions, and the slit structure extending in parallel with the recesses may be provided on the bottoms of the recesses. In this case, the slit structure may be formed in all of the protrusions, or a part of the protrusions. In addition, the slit structure may be formed on all of the recesses, or a part of the recesses. The first electrode is provided on the tops of the protrusions in parts not including the slit structure, and also provided on the bottoms of the recesses in parts not including the slit structure. It is needed to form the slit structure such that no protrusion isolated from the other protrusion, or no recess isolated from the other recesses is produced by the presence of the slit structure. Accordingly, in case of a so-called multi-pixel driving system display device which divides one pixel into a plurality of areas and drives the respective areas independently from each other, the slit structure is formed such that no protrusion isolated from the other protrusion, or no recess isolated from the other recesses is produced by the presence of the slit structure in each of the areas. For providing the slit structure on the tops of the protrusions, the width of each of the protrusions and the width of the slit structure may have a following relationship, for example $0.2 \leq$ (width of slit structure/width of protrusion) $\leq 0.8$, or for providing the slit structure on the bottoms of the recesses, the width of each of the recesses and the width of the slit structure may have a following relationship, for example $0.2 \leq$ (width of slit structure/width of recess) $\leq 0.8$ This point is applicable to following description of the slit structure.

According to the liquid crystal display devices in the first example through the fourth example of the first mode including the preferable configurations and structures described above, assuming that a formation pitch of the branch protrusions in the X axis is $P_X$, and that a formation pitch of the branch protrusions in the Y axis is $P_Y$, the branch protrusions extending from the stem protrusion in parallel with the X axis and occupying the first quadrant, and the branch protrusions extending from the stem protrusion in parallel with the X axis and occupying the fourth quadrant deviate from each other by $(P_X/2)$, the branch protrusions extending from the stem protrusion in parallel with the Y axis and occupying the first quadrant, and the branch protrusions extending from the stem protrusion in parallel with the Y axis and occupying the second quadrant deviate from each other by $(P_Y/2)$, the branch protrusions extending from the stem protrusion in parallel with the X axis and occupying the second quadrant, and the branch protrusions extending from the stem protrusion in parallel with the X axis and occupying the third quadrant deviate from each other by $(P_X/2)$, and the branch protrusions extending from the stem protrusion in parallel with the Y axis and occupying the third quadrant, and the branch protrusions extending from the stem protrusion in parallel with the Y axis and occupying the fourth quadrant deviate from each other by $(P_Y/2)$. Note that this description is applicable by switching the "protrusions" to "electrode parts" in the liquid crystal display device according to the second mode of the present disclosure.

According to the liquid crystal display devices in the first example through the fourth example of the first mode including the preferable configurations and structures described above, an average width of each of the branch protrusions and the recesses may range from 1 µm to 20 µm, preferably from 2 µm to 10 µm, for example. In case of the average width of the branch protrusion and the recess smaller than 1 µm, formation of the branch protrusions and the recesses may be difficult. In this case, sufficient manufacture yields may not be secured. On the other hand, in case of the average width of the branch protrusion and the recess exceeding 20 µm, generation of a preferable oblique electric field may be difficult between the first electrode and the second electrode to which driving voltage is applied. An average width of the stem protrusion may range from $2 \times 10^{-6}$ m to $2\times10^{-3}$ m, preferably from $4\times10^{-6}$ m to $1.5\times10^{-3}$ m, for example. An average height from the recesses to the protrusions may range from $5\times10^{-8}$ m to $1\times10^{-6}$ m, preferably from $1\times10^{-7}$ m to $5\times10^{-7}$ m, for example. Further, according to these settings, preferable orientation control and sufficient manufacture yields are achievable. In addition, lowering of light transmittance and elongation of the processing time are avoidable.

Alternatively, according to the liquid crystal display devices in the first example through the fourth example of the first mode including the preferable configurations and structures described above, the minimum width and the maximum width of each of the branch protrusions and the recesses may range from 1 μm to 25 μm, preferably from 2 μm to 20 μm, for example. In case of the minimum width of the branch protrusion and the recess smaller than 1 μm, the branch protrusions and the recesses may be difficult to produce. In this case, sufficient manufacture yields may not be secured. On the other hand, in case of the maximum width of the branch protrusion and the recess exceeding 25 μm, generation of a preferable oblique electric field may be difficult between the first electrode and the second electrode to which driving voltage is applied. The width of the stem protrusion may range from $2\times10^{-6}$ m to $2\times10^{-3}$ m, preferably from $4\times10^{-6}$ m to $1.5\times10^{-3}$ m, for example. An average height from the recesses to the protrusions may range from $5\times10^{-8}$ m to $1\times10^{-6}$ m, preferably from $1\times10^{-7}$ m to $1\times10^{-6}$ m, more preferably from $2\times10^{-7}$ m to $6\times10^{-7}$ m, for example. Further, according to these settings, preferable orientation control and sufficient manufacture yields are achievable. In addition, lowering of light transmittance and elongation of the processing time are avoidable.

According to the liquid crystal display device in the second mode of the present disclosure, the minimum width and the maximum width of each of the branch electrode parts may range from 1 μm to 25 μm, preferably from 2 μm to 20 μm, for example. In case of the minimum width of the branch electrode parts smaller than 1 μm, formation of the branch electrode parts may be difficult. In this case, sufficient manufacture yields may not be secured. On the other hand, in case of the maximum width of the branch electrode parts exceeding 25 μm, generation of a preferable oblique electric field may be difficult between the first electrode and the second electrode to which driving voltage is applied. The width of the stem electrode part may range from $2\times10^{-6}$ m to $2\times10^{-3}$ m, preferably from $4\times10^{-6}$ m to $1.5\times10^{-3}$ m, for example. An average thickness of the electrode parts may range from $5\times10^{-8}$ m to $1\times10^{-6}$ m, preferably from $1\times10^{-7}$ m to $1\times10^{-6}$ m, more preferably from $2\times10^{-7}$ m to $6\times10^{-7}$ m, for example. Further, according to these settings, preferable orientation control and sufficient manufacture yields are achievable. In addition, lowering of light transmittance and elongation of the processing time are avoidable.

According to the liquid crystal display device in the first mode or the second mode of the present disclosure including various preferable configurations and structures described above (hereinafter also collectively referred to as "liquid crystal display device in the first/second mode or the like of the present disclosure"), the liquid crystal molecules may have negative dielectric anisotropy. On the other hand, according to a liquid crystal display device in a third mode of the present disclosure including various preferable configurations and structures described above (hereinafter also collectively referred to as "liquid crystal display device in the third mode or the like of the present disclosure"), the liquid crystal molecules may have positive or negative dielectric anisotropy.

According to the liquid crystal display device in the second mode or the third mode of the present disclosure including various preferable configuration and structure described above (hereinafter also collectively referred to as "liquid crystal display device in the second/third mode or the like of the present disclosure"), it is preferable that a dielectric constant of a material constituting the high dielectric material layer (including ferroelectric material) ranges from $1\times10$ to $1\times10^3$ (inclusive), more preferably from $5\times10$ to $1.2\times10^2$ (inclusive). The material constituting the high dielectric material layer is magnesium oxide (dielectric constant: 15), hafnium dioxide (dielectric constant: 40), titanium oxide (dielectric constant: 83 to 183), or barium titanate (dielectric constant: 1000 to 3000), for example. The thickness of the high dielectric material layer may range from 0.05 μm to 1 μm, preferably from 0.05 μm to 0.2 μm, for example. It is preferable that the high dielectric material layer is patterned for each pixel in view of reduction of stray capacitance between respective wires for driving pixels. The high dielectric material layer may be constituted by a single layer made of the above material, or may be constituted by a mixed layer of the above material and an insulation material. In the latter case, the material constituted by a mixture of the above material containing fine particles, and an insulation material may be used, for example. In case of the first electrode disposed below the high dielectric material layer, the first orientation film may be formed above the high dielectric material layer, or the high dielectric material layer may function as the first orientation film. The method for producing the high dielectric material layer may be appropriately selected in accordance with the material constituting the high dielectric material layer. In case of the first electrode and the like disposed above the high dielectric material layer, the transparent conductive material layer needs to be etched to form the first electrode. In this case, an etching stopper layer made of SiN or $SiO_2$ may be formed between the high dielectric material layer and the transparent conductive material layer.

The liquid crystal display devices in the first mode and the second mode or the like, or a liquid crystal display element according to the present disclosure may be manufactured by a manufacturing method of the liquid crystal display device or the liquid crystal display element, the manufacturing method including:

a step for forming the first electrode on the first substrate, and forming the first orientation film on the counter face of the first substrate facing the second substrate, and on the first electrode;

a step for forming the second electrode on the second substrate, and forming the second orientation film on the counter face of the second substrate facing the first substrate, and on the second electrode;

a step for positioning the first substrate and the second substrate such that the first orientation film and the second orientation film face each other, and sealing a liquid crystal layer between the first orientation film and the second orientation film; and a step for applying a predetermined electric field for orientation of the liquid crystal molecules.

In this case, in the liquid crystal display device in the first/second mode or the like of the present disclosure, it is preferable that an electric field is applied to arrange the liquid crystal molecules in an oblique direction with respect to the surface of at least one of the pair of substrates. Note that for giving a pre-tilt, an azimuth (declination) of each of the liquid crystal molecules is basically regulated by the intensity and direction of the electric field, while a polar angle (zenith angle) is basically regulated by the intensity of the electric field. The azimuth (declination) and the polar angle (zenith angle) of the liquid crystal molecules for giving a pre-tilt may be regulated by a molecule structure of an orientation film material as well in some cases.

The step for applying the predetermined electric field for orientation of the liquid crystal molecules is constituted by a step for causing reaction of an orientation control material while applying a predetermined electric field to the liquid crystal layer containing the liquid crystal molecules and polymerizing monomers (orientation control material) to allow orientation of the liquid crystal molecules and give a pre-tilt thereto. This manufacturing method of the liquid crystal display device is called polymer stabilized alignment (PSA) system. Alternatively, the step for applying the predetermined electric field for orientation of the liquid crystal molecules is constituted by a step for causing reaction of an orientation control material while applying a predetermined electric field to the liquid crystal layer in a state that an orientation film containing a photosensitive group (orientation control material) is formed on the counter face of at least one substrate and the electrode to allow orientation of the liquid crystal molecules and give a pre-tilt thereto. This manufacturing method of the liquid crystal display device is called field-induced photo-reactive alignment (FPA) system.

According to the liquid crystal display device in the first/second mode or the like of the present disclosure, the pair of substrates is constituted by a substrate including a pixel electrode, and a substrate including a counter electrode. For example, the first substrate may be the substrate including the pixel electrode, while the second substrate may be the substrate including the counter substrate. A color filter layer is formed on the substrate including the counter electrode (second substrate), or on the substrate including the pixel electrode (first substrate). A circuit for driving pixels, such as a TFT, is provided on the substrate including the pixel electrode (first substrate). Note that the layer including the circuit for driving pixels, such as a TFT, is also called a "TFT layer". In case of the structure where the color filter layer is formed on the substrate including the counter electrode (second substrate), a smoothing film corresponding to the base layer is formed on the TFT layer, while the first electrode is provided on the smoothing film. On the other hand, in case of the structure where the color filter layer is formed on the substrate including the pixel electrode (first substrate), the color filter layer is formed on the TFT layer. In this case, the first electrode is provided on the color filter layer (corresponding to base layer), an overcoat film (corresponding to base layer) formed on the color filter layer, or a passivation film (corresponding to base layer) made of an inorganic material. In case of a liquid crystal display device which includes pixels constituted by a plurality of sub pixels, the pixels are switched to sub pixels.

According to the liquid crystal display device in the third mode of the present disclosure, a color filter layer is formed on the second substrate, or on the first substrate. A circuit for driving pixels, such as a TFT, is provided on the first substrate including the pixel electrode. In case of the structure where the color filter layer is formed on the second substrate, an interlayer insulation layer corresponding to a smoothing film (base layer) is formed on the TFT layer, while the first electrode and the like are provided on the interlayer insulation layer. On the other hand, in case of the structure where the color filter layer is formed on the first substrate, the color filter layer is formed on the TFT layer. In this case, the first electrode and the like are provided on an overcoat film (corresponding to interlayer insulation layer as base layer) formed on the color filter layer, or a passivation film (corresponding to interlayer insulation layer as base layer) made of an inorganic material.

The interlayer insulation layer of the liquid crystal display devices in the second mode and the third mode of the present disclosure is constituted by an interlayer insulation layer made of an organic insulation material, such as photosensitive polyimide resin and acrylic resin, or an inorganic insulation material, such as $SiO_2$, SiN, and SiON, for example.

Each of the first electrode and the second electrode may be made of a transparent conductive material having transparency, such as indium tin oxide (ITO), IZO, ZnO, and SnO, for example. In addition, the second electrode may be constituted by a so-called solid electrode (not patterned electrode). For example, a first polarizing plate is affixed to an outer face of the first substrate, while a second polarizing plate is affixed to an outer face of the second substrate. The first polarizing plate and the second polarizing plate are disposed such that the respective absorption axes cross each other at right angles. According to the liquid crystal display device in the first/second mode or the like of the present disclosure, it is preferable that the absorption axis of the first polarizing plate is in parallel with the X axis or the Y axis, and that the absorption axis of the second polarizing plate is in parallel with the Y axis or the X axis. However, other configurations may be adopted in this point. In addition, according to the liquid crystal display device in the third mode or the like of the present disclosure, the director and the direction of the polarization axis of one of the polarizing plates are substantially the same in a state of no application of an electric field to the liquid crystal layer, and form an angle of substantially 45 degrees in a state of application of an electric field to the liquid crystal layer. However, other configurations may be adopted in this point.

The liquid crystal display device according to the first mode of the present disclosure including various preferable configurations and structures described above may be combined with the liquid crystal display device according to the second mode of the present disclosure including various preferable configurations and structures described above. More specifically, the high dielectric material layer may be formed on the base layer including the plurality of recesses and protrusions, while the first transparent conductive material layer and the second transparent conductive material layer may be formed on the high dielectric material layer. Alternatively, the first transparent conductive material layer and the second transparent conductive material layer may be formed on the base layer including the plurality of recessed and protrusions, while the high dielectric material layer may be formed on the base layer, the first transparent conductive material layer, and the second transparent conductive material layer.

The liquid crystal display device is illuminated by a known planar illumination device (backlight). The planar illumination device may be a direct type planar light source device, or an edge light type (also called side light type) planar light source device. In this case, the direct type planar light source device is constituted by a light source disposed within a housing, a reflection member disposed at a portion of the housing positioned below the light source and reflecting emission light from the light source upward, and a diffusion plate attached to a housing opening positioned above the light source and transmitting the emission light from the light source and the reflection light from the reflection member while diffusing the light, for example. On the other hand, the edge light type planar light source device is constituted by a light guide plate, and a light source disposed on the side of the light guide plate, for example. A reflection member is disposed below the light guide plate, while a diffusion sheet and a prism sheet are disposed above the light guide plate. The light source is constituted by a cold cathode linear fluorescent lamp, for example, and emits white light. Alternatively, the light source is constituted by a light emitting element such as a light emitting diode (LED) and a semiconductor laser element. The liquid crystal display device controls passage of light emitted from the planar illumination device (backlight) to display an image on the liquid crystal display device.

Note that a part of pixels in an image may contain non-uniform contrast (light transmittance of liquid crystal layer) caused by light emitted from the planar illumination device and leaking through the liquid crystal layer, depending on the orientation state of the liquid crystal molecules. In this case, it is preferable that a light shield area is provided to prevent entrance of light into this part of the pixels. A wiring layer may function as a light shield area in some cases.

First Embodiment

Figure 2:
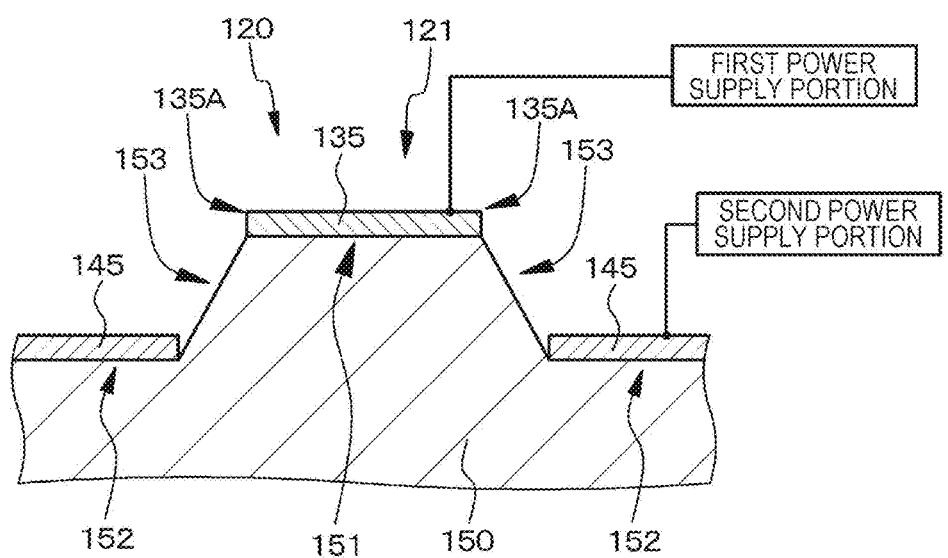
FIG. 2 is a schematic partial end face view illustrating an enlarged first electrode separation portion corresponding to a separation portion between a first transparent conductive material layer and a second transparent conductive material layer in the liquid crystal display device according to the first embodiment.
Figure 8A:
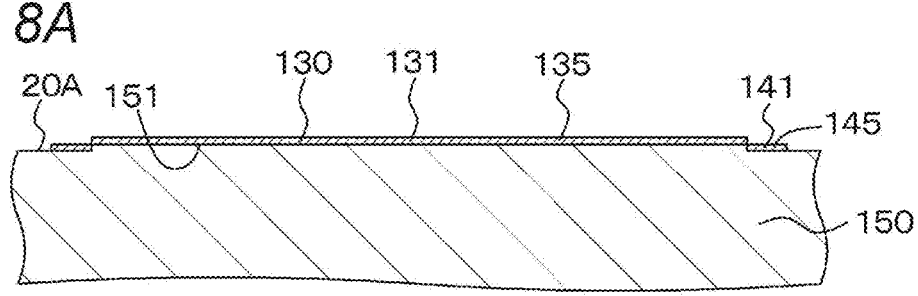
Figure 8B:
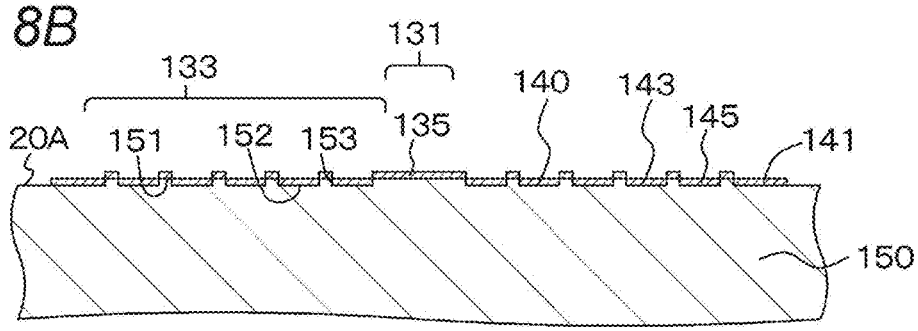
Figure 8C:
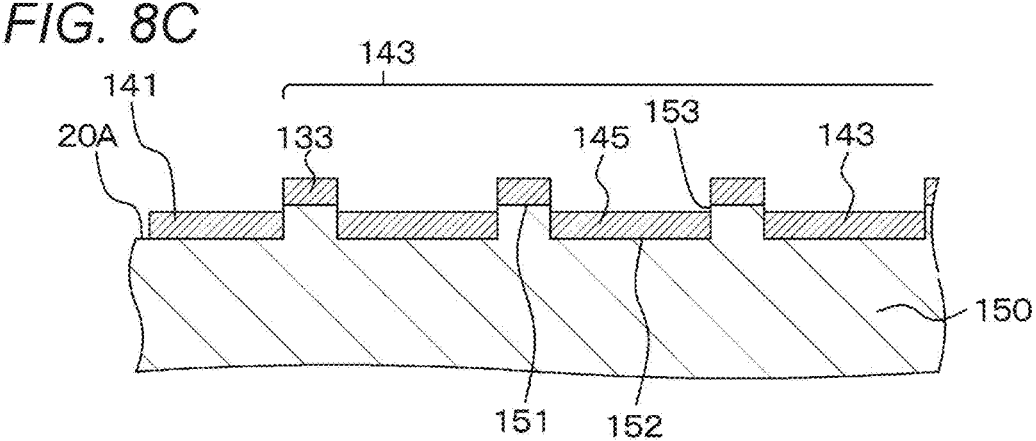
FIG. 8C is a partial end face view of an enlarged part illustrated in FIG. 8B.

A first embodiment relates to a liquid crystal display device in the first mode of the present disclosure, more specifically, a liquid crystal display device in a first example of the first mode. FIG. 1 illustrates a schematic partial cross-sectional view of the liquid crystal display device according to the first embodiment. FIG. 2 is a schematic partial end face view showing an enlarged part of recesses and protrusions of a base layer, a first transparent conductive material layer, and a second transparent conductive material layer. FIG. 3 is a schematic view of one pixel $10_1$ on a first substrate 20 as viewed from above. FIG. 8A is a schematic end face view taken along an arrow A-A in FIG. 3. FIG. 8B is a schematic end face view taken along an arrow B-B in FIG. 3. FIG. 8C is a schematic partial end face view of an enlarged part illustrated in FIG. 8B.

The liquid crystal display device according to the first embodiment, or each of liquid crystal display devices according to the second through ninth embodiments described below includes a plurality of arranged pixels, each of the pixels including:

the first substrate 20 and a second substrate 50;

a first electrode (pixel electrode) 120 formed on a counter face of the first substrate 20, the counter face facing the second substrate 50;

a second electrode (counter electrode) 52 formed on a counter face of the second substrate 50, the counter face facing the first substrate 20; and a liquid crystal layer 60 containing liquid crystal molecules 61, 61A, 61B, and 61C, and sandwiched between the first substrate 20 and the second substrate 50. A pre-tilt is given to the liquid crystal molecules 61. The first electrode 120 is constituted by a base layer 150 including a plurality of recesses and protrusions 121, a first transparent conductive material layer 135, and a second transparent conductive material layer 145. At least the liquid crystal molecules on the first electrode 120 side are given a pre-tilt, and exhibit negative dielectric anisotropy.

In addition, in the liquid crystal display device according to the first embodiment or each of the second through ninth embodiments described above, a first transparent conductive material layer 135 connected to a first power supply portion is formed on each of protrusion top faces 151 of the base layer 150. In addition, a second transparent conductive material layer 145 connected to a second power supply portion is formed on each of recess bottom faces 152 of the base layer 150. Furthermore, the first transparent conductive material layer 135 is separated from the second transparent conductive material layer 145. More specifically, the first transparent conductive material layer 135 formed on the protrusion top faces 151 of the base layer 150 and the second transparent conductive material layer 145 formed on the recess bottom faces 152 of the base layer 150 are separated from each other via sides 153 of the base layer 150. Note that a first electrode separation portion is not clearly shown in some of the figures. A reference number 20A indicates a portion of the first substrate 20 between pixels. In each of the pixels, all parts of the first transparent conductive material layer 135 are connected to one another, while all parts of the second transparent conductive material layer 145 are connected to one another. However, the first transparent conductive material layer 135 and the second transparent conductive material layer 145 are not connected.

In the liquid crystal display device according to the first embodiment, protrusions 130 are constituted by a stem protrusion (main protrusion) 131 passing through a pixel central portion and extending radially (e.g. in cross shape), and a plurality of branch protrusions (sub protrusions) 133 extending from the stem protrusion 131 toward a pixel peripheral portion. More specifically, the stem protrusion 131 extends in parallel with X axis and Y axis described below, for example. On the other hand, recesses 140 are constituted by a stem recess (main recess) 141 surrounding the protrusions 130, and branch recesses (sub recesses) 143 extending from the stem recess 141 and positioned between the branch protrusions 133. Note that the recesses are hatched with narrow vertical hatching lines for clear distinction between the protrusions and the recesses in the schematic view of the one pixel formed on the first substrate 20 as viewed from above. This point is applicable to the following description.

Figure 4:
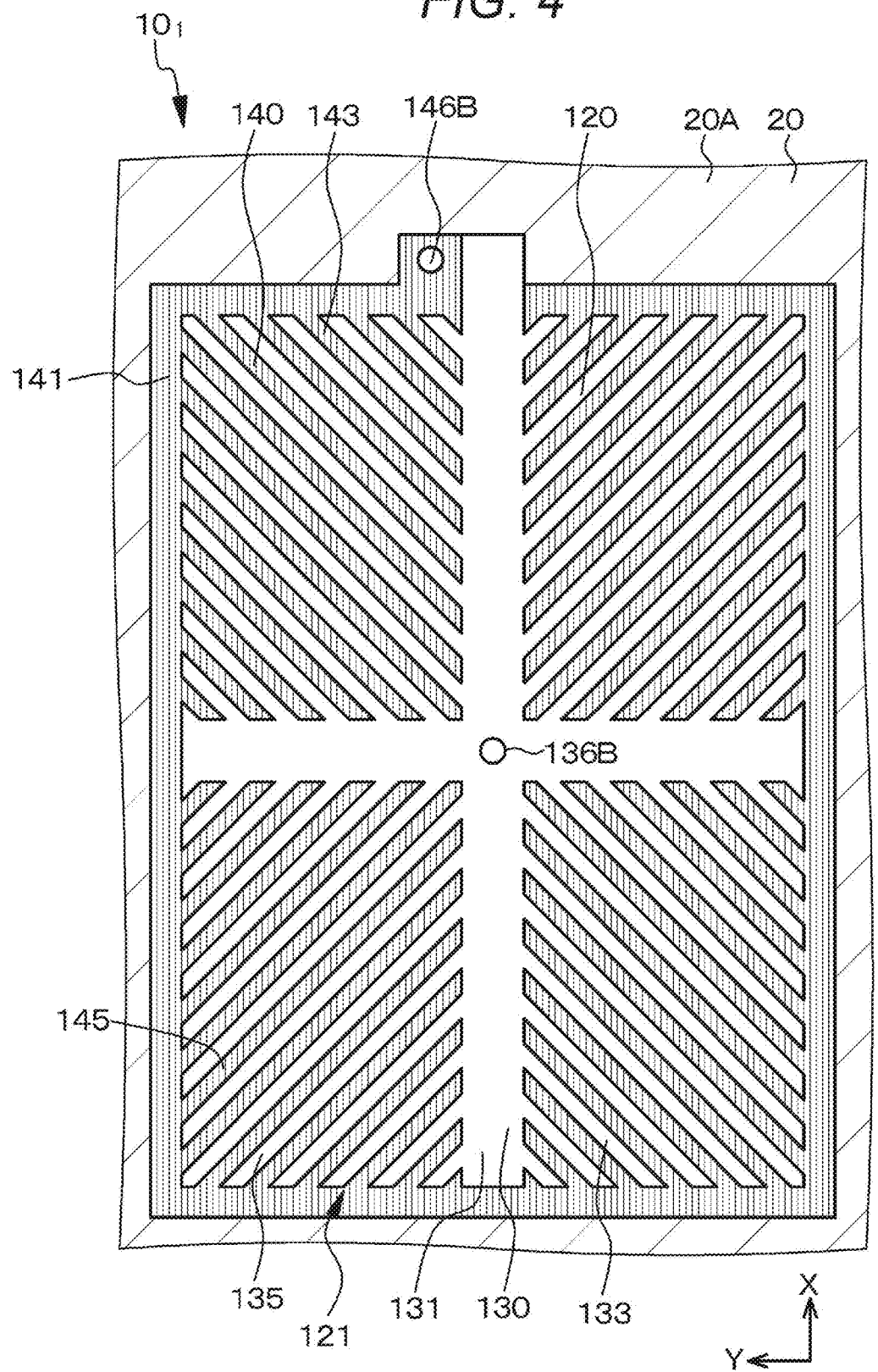
FIG. 4 is a schematic view of one pixel on a first substrate constituting a liquid crystal display device according to a modified example of the first embodiment as viewed from above.

In the liquid crystal display device illustrated in FIG. 3, a first power supply portion 136A and a second power supply portion 146A are separately provided in the pixel peripheral portion. In addition, in the liquid crystal display device illustrated in FIG. 4, a first power supply portion 136B is provided in the pixel central portion, while a second power supply portion 146B is provided in the pixel peripheral portion. Note that light emitted from a planar illumination device may pass through the liquid crystal layer 60, and cause non-uniformity of contrast of an image (light transmittance of the liquid crystal layer) in the power supply portion 136B or in the vicinity thereof, depending on an orientation state of the liquid crystal molecules 61. In this case, it is preferable that a light shield area is provided to prevent entrance of light into the power supply portion 136B or in the vicinity thereof. A wiring layer may function as a light shield area in some cases. Each of the power supply portions 136A, 136B, 146A, and 146B is constituted by an extension portion of a connection hole 35 described below, for example. The first power supply portions 136A and 136B are connected to a first driving circuit (not shown), while the second power supply portions 146A and 146B are connected to a second driving circuit (not shown). Alternatively, the first power supply portions 136A and 136B and the second power supply portions 146A and 146B are connected to a driving circuit (not shown).

In the liquid crystal display device according to the first embodiment, or each of the liquid crystal display devices according to the second through ninth embodiments described below, on the assumption that a (X, Y) coordinate system is defined by the X axis and the Y axis corresponding to straight lines in parallel with the pixel peripheral portion, a plurality of the branch protrusions 133, 233 occupying a first quadrant extend in parallel with a direction where a Y coordinate value increases as an X coordinate value increases, a plurality of the branch protrusions 133, 233 occupying a second quadrant extend in parallel with a direction where a Y coordinate value increases as an X coordinate value decreases, a plurality of the branch protrusions 133, 233 occupying a third quadrant extend in parallel with a direction where a Y coordinate value decreases as an X coordinate value decreases, and a plurality of the branch protrusions 133, 233 occupying a fourth quadrant extend in parallel with a direction where a Y coordinate value decreases as an X coordinate value increases. This multi-domain electrode structure adopted herein forms areas of the branch protrusions extending in different directions within one pixel. Accordingly, viewing angle characteristics improve.

Note that the plurality of branch protrusions 133, 233 occupying the first quadrant extend such that the axial line of these branch protrusions and the X axis form an angle of 45 degrees. The plurality of branch protrusions 133, 233 occupying the second quadrant extend such that the axial line of these branch protrusions and the X axis form an angle of 135 degrees. The plurality of branch protrusions 133, 233 occupying the third quadrant extend such that the axial line of these branch protrusions and the X axis form an angle of 225 degrees. The plurality of branch protrusions 133, 233 occupying the fourth quadrant extend such that the axial line of these branch protrusions and the X axis form an angle of 315 degrees. The respective angles are not limited to the specific values.

The liquid crystal molecules 61 may be classified into the liquid crystal molecules 61A held by a first orientation film 21 in the vicinity of an interface between the liquid crystal molecules 61 and the first orientation film 21, the liquid crystal molecules 61B held by a second orientation film 51 in the vicinity of an interface between the liquid crystal molecules 61 and the second orientation film 51, and the remaining liquid crystal molecules 61C. The liquid crystal molecules 61C are positioned in an intermediate area of the liquid crystal layer 60 in the thickness direction thereof, and arranged such that a major axis direction (director) of each of the liquid crystal molecules 61C becomes substantially perpendicular to the first substrate 20 and the second substrate 50 in an off-state of driving voltage. The director of each of the liquid crystal molecules 61C is oriented with a tilt directed parallel with the first substrate 20 and the second substrate 50 in an on-state of driving voltage. This behavior is caused by such a feature of the liquid crystal molecules 61C that a dielectric constant in the major axis direction is smaller than a dielectric constant in the minor axis direction. Each of the liquid crystal molecules 61A and 61B has a similar feature, and therefore basically performs a behavior similar to that of the liquid crystal molecules 61C in accordance with a change of the on-off state of driving voltage. However, in the off-state of driving voltage, the liquid crystal molecules 61A are given a pre-tilt $\theta_1$ by the first orientation film 21, or given the pre-tilt $\theta_1$ by polymerizable monomers mixed in the liquid crystals beforehand. In this case, each director of the liquid crystal molecules 61A has a posture tilted from the normal direction of the first substrate 20 and the second substrate 50. Similarly, the liquid crystal molecules 61B are given a pre-tilt $\theta_2$ by the second orientation film 51, or given the pre-tilt $\theta_2$ by polymerizable monomers mixed in the liquid crystals beforehand. In this case, each director of the liquid crystal molecules 61B has a posture tilted from the normal direction of the first substrate 20 and the second substrate 50. Note that the "held" state in this context refers to a state that the orientation of the liquid crystal molecules 61 is regulated without fixation between the orientation films 21 and 51 and the liquid crystal molecules 61A and 61B. In addition, the "pre-tilt $\theta$ ($\theta_1, \theta_2$)" in this context refers to a tilt angle of a director D of each of the liquid crystal molecules 61 (61A, 61B) with respect to a Z direction in the off-state of driving voltage, on the assumption that a direction perpendicular to the surfaces of the first substrate 20 and the second substrate 50 (normal direction) is defined as the Z direction as illustrated in FIG. 51A. This description is applicable to the respective embodiments 2 through 12 described below.

Each of the pre-tilts $\theta_1$ and $\theta_2$ in the liquid crystal layer 60 has a degree larger than 0 degrees. The pre-tilts $\theta_1$ and $\theta_2$ in the liquid crystal layer 60 may have the same angle ($\theta_1 = \theta_2$), or different angles ($\theta_1 \square \theta_2$). However, it is more preferable that the pre-tilts $\theta_1$ and $\theta_2$ have different angles. In this case, a response speed to application of driving voltage improves more than that speed in case of the pre-tilts $\theta_1$ and $\theta_2$ set to 0 degrees. Furthermore, contrast becomes substantially the same as the contrast produced in case of the pre-tilts $\theta_1$ and $\theta_2$ set to 0 degrees. Accordingly, response characteristics improve, while a light transmission amount during black display decreases. As a result, excellent contrast is realizable. In case of the pre-tilts $\theta_1$ and $\theta_2$ having different angles, it is preferable that the larger one (pre-tilt $\theta$) of the pre-tilts $\theta_1$ and $\theta_2$ lies in a range from 1 degree to 4 degrees (inclusive). Particularly desirable advantages are offered when the larger pre-tilt $\theta$ is set in the above range. This description is applicable to the respective embodiments 2 through 12 described below.

A thin film transistor (TFT) layer 30 (detailed below) is formed on the first substrate 20. The base layer 150 made of an organic insulation material, such as photosensitive polyimide resin and acrylic resin, and also functioning as a smoothing film is formed on the TFT layer 30. The first transparent conductive material layer 135 and the second transparent conductive material layer 145 constituting the first electrode 120 are formed on the base layer 150. The base layer 150 may be made of an inorganic insulation material such as $SiO_2$, SiN, and SiON. This description is applicable to each of the second through ninth embodiments described below.

For example, the recesses and protrusions may be produced by:

(a) forming a resist material layer on a smoothing film (or color filter layer) corresponding to a base layer (smoothing film and color filter layer are collectively referred to as "smoothing film and the like");

(b) forming recesses and protrusions in the resist material layer by exposure and development;

(c) forming recesses and protrusions in the smoothing film or the like (base layer) by etching back the resist material layer and the smoothing film and the like (base layer); and (d) forming and patterning a transparent conductive material layer on the smoothing film and the like (base layer).

Alternatively, for example, the recesses and protrusions may be produced by:

(a) forming a resist material layer on a base layer formed on a smoothing film and the like;

(b) forming recesses and protrusions in the resist material layer by exposure and development;

(c) forming recesses and protrusions in the base layer by etching back the resist material layer and the base layer; and (d) forming and patterning a transparent conductive material layer on the base layer.

Alternatively, for example, the recesses and protrusions may be produced by:

(a) forming an insulation material layer on a smoothing film and the like;

(b) forming a resist material layer on the insulation material layer, and patterning the resist material layer;

(c) patterning the insulation material layer by using an etching mask constituted by the resist material layer, and forming a base layer including recesses and protrusions on the basis of the patterning (recess bottom faces are constituted by smoothing film or the like, protrusions are constituted by insulation material layer, and base layer is constituted by smoothing film and the like and insulation material layer); and (b) forming and patterning a transparent conductive material layer on the base layer.

Alternatively, for example, the recesses and protrusions may be formed by optimizing the thickness of the smoothing film. In this case, the protrusions of the smoothing film are produced by the effect of the thicknesses of elements constituting the liquid crystal display device and disposed on the first substrate or above the first substrate (e.g., various signal lines, auxiliary capacity electrodes, gate electrodes, source/drain electrodes, and various wirings).

The description about the foregoing recesses and protrusions is applicable to each of the second through ninth embodiments described below.

The sides (side walls) of each of the protrusion, stem protrusion, and branch protrusions may have a forward tapered shape, a vertical face, or a reverse tapered shape.

A first polarizing plate (not shown) is affixed to an outer face of the first substrate 20, while a second polarizing plate (not shown) is affixed to an outer face of the second substrate 50. The first polarizing plate and the second polarizing plate are disposed such that the respective absorption axes cross each other at right angles. An absorption axis of the first polarizing plate extends in parallel with the X axis or the Y axis, while an absorption axis of the second polarizing plate extends in parallel with the Y axis or the X axis. This description is applicable to each of the second through twelfth embodiments described below.

In addition, a color filter layer (not shown) and a black matrix (not shown) are formed on the second substrate 50. The second electrode 52 constituted by a so-called solid electrode is formed on the color filter layer and the black matrix. The second orientation film 51 is formed on the second electrode 52. In addition, in this case, a projected image of a part of the first substrate 20 positioned between the pixels $10_1$, and a projected image of the pixel peripheral portion overlap with a projected image of the black matrix. This description is applicable to each of the second through sixteenth embodiments described below. The first power supply portion 136A and the second power supply portions 146A and 146B are positioned within the projected image of the black matrix.

FIG. 52 shows a circuit configuration of the liquid crystal display device illustrated in FIG. 1, or the liquid crystal display device according to each of the second through sixteenth embodiments.

As shown in FIG. 52, the liquid crystal display device includes a liquid crystal display element which contains a plurality of pixels 10 in a display area 80. There are provided, around the display area 80 of this liquid crystal display device, a source driver 81 and a gate driver 82, a timing controller 83 for controlling the source driver 81 and the gate driver 82, and a power supply circuit 84 for supplying power to the source driver 81 and the gate driver 82.

The display area 80 is an area for image display, and contains the plurality of pixels 10 disposed in matrix to display an image. Note that FIG. 52 shows enlarged areas corresponding to the four pixels 10, as well as the display area 80 containing the plurality of pixels 10.

A plurality of source lines 91 are arranged in the row direction, and a plurality of gate lines 92 are arranged in the column direction in the display area 80. The respective pixels 10 are disposed at intersections between the source lines 91 and the gate lines 92. Each of the pixels 10 includes the first electrode 120 and the liquid crystal layer 60, and further includes a TFT 93 and a capacitor 94. In each of the TFTs 93, a source electrode is connected to a source line 91, a gate electrode is connected to the gate line 92, and a drain electrode is connected to the capacitor 94 and the first electrode 120. Each of the source lines 91 is connected to the source driver 81 to receive an image signal from the source driver 81. Each of the gate lines 92 is connected to the gate driver 82 to sequentially receive a scanning signal from the gate driver 82.

The source driver 81 and the gate driver 82 select the particular pixel 10 from the plurality of pixels 10.

The timing controller 83 outputs, to the source driver 81, an image signal (e.g. R, G, or B image signal in red, green, or blue), and a source driver control signal for controlling an operation of the source driver 81, for example. In addition, the timing controller 83 further outputs a gate driver control signal for controlling an operation of the gate driver 82 to the gate driver 82. The source driver control signal is a horizontal synchronous signal, a start pulse signal, or a source driver clock signal, for example. The gate driver control signal is a vertical synchronous signal or a gate driver clock signal, for example.

The liquid crystal display device according to the first embodiment may be constituted by a liquid crystal display device having 1-A configuration. More specifically, as described above, the first power supply portions 136A and 136B of the liquid crystal display device according to the first embodiment are connected to the first driving circuit, while the second power supply portions 146A and 146B are connected to the second driving circuit. The first driving circuit and the second driving circuit are contained in the source driver 81, for example. Each of the first power supply portions 136A and 136B may include the first capacity portion, while each of the second power supply portions 146A and 146B may include the second capacity portion. During display of an image, voltage is applied from the first power supply portions 136A and 136B to the first transparent conductive material layer 135, while voltage is applied from the second power supply portions 146A and 146B to the second transparent conductive material layer 145. Assuming that voltage applied from the first power supply portions 136A and 136B to the first transparent conductive material layer 135 is $V_{21}$, and that voltage applied from the second power supply portions 146A and 146B to the second transparent conductive material layer 145 is $V_{22}$, $$|V_{21}| \geq |V_{22}|$$

holds. Two sets of the source line 91, the TFT 93, and the capacitor 94 are provided to supply the image signal to each of the first power supply portions 136A and 136B, and the second power supply portions 146A and 146B. For example, each of the first capacity portion and the second capacity portion may be constituted by the capacitor 94, or separately from the capacitor 94, or may be provided without use of the capacitor 94.

Alternatively, as described above, the liquid crystal display device according to the first embodiment may be constituted by a liquid crystal display device having 1-B configuration. More specifically, the first power supply portions 136A and 136B and the second power supply portions 146A and 146B are connected to a driving circuit. The driving circuit is contained in the source driver 81, for example. Further, each of the first power supply portions 136A and 136B includes the first capacity portion, while each of the second power supply portions 146A and 146B includes the second capacity portion. Assuming here that the capacity of the first capacity portion is $C_1$, and that the capacity of the second capacity portion is $C_2$, $$C_1 < C_2$$

holds. In this case, voltage is applied to the first transparent conductive material layer 135 earlier than to the second transparent conductive material layer 145, wherefore liquid crystal molecules adjacent to the first transparent conductive material layer 135 start moving earlier than the liquid crystal molecules adjacent to the second transparent conductive material layer 145. Accordingly, rapid response to image display is achievable. A set of the source line 91, the TFT 93, and the capacitor 94 is provided to supply an image signal to each of the first power supply portions 136A and 136B, and the second power supply portions 146A and 146B. In addition, each of the first capacity portion and the second capacity portion may be constituted separately from the capacitor 94, or the first capacity portion and the second capacity portion may be provided without use of the capacitor 94.

A manufacturing method of the liquid crystal display device according to the first embodiment is hereinafter described.

Note that the first orientation film 21 covering the first electrode 120, and the second orientation film 51 covering the second electrode 52 are further provided according to the first embodiment. A pre-tilt is given to the liquid crystal molecules 61 by reaction of polymerizable monomers (orientation control material) constituting at least the first orientation film 21 under application of a predetermined electric field to the liquid crystal layer 60 in accordance with voltage applied from the first power supply portions 136A and 136B to the first transparent conductive material layer 135. This manufacturing system is called PSA system as described above.

Alternatively, the first orientation film 21 covering the first electrode 120, and the second orientation film 51 covering the second electrode 52 are further provided according to the first embodiment. A pre-tilt is given to the liquid crystal molecules 61 by reaction of a photosensitive group (orientation control material) contained in the liquid crystal layer 60 under application of a predetermined electric field to the liquid crystal layer 60 in accordance with voltage application from the first power supply portions 136A and 136B to the first transparent conductive material layer 135. This manufacturing system is called FPA system as described above.

In either the PSA system or the FPA system, voltage is not applied from the second power supply portions 146A and 146B to the second transparent conductive material layer 145 during application of voltage from the first power supply portions 136A and 136B to the first transparent conductive material layer 135. However, voltage may be applied from the second power supply portions 146A and 146B to the second transparent conductive material 145 in this state. In addition, in the latter case, it is preferable that $|V_{11}| > |V_{12}|$ holds on the assumption that a voltage applied from the first power supply portions 136A and 136B to the first transparent conductive material layer 135, and a voltage applied from the second power supply portions 146A and 146B to the second transparent conductive material layer 145 are $V_{11}$ and $V_{12}$, respectively.

For manufacturing the liquid crystal display device according to the first embodiment, a TFT is initially formed by a method described below. Thereafter, the transparent conductive material layers 135 and 145 made of ITO are formed on the counter face of the first substrate 20 on which the base layer 150 is formed (i.e., on the base layer 150). The first substrate 20 is constituted by a glass substrate having a thickness of 0.7 mm.

More specifically, as illustrated in FIG. 53A, a gate electrode 31 is formed on an insulation film 20' formed on the first substrate 20, whereafter a gate insulation layer 32 is formed on the gate electrode 31 and the insulation film 20'. The gate insulation layer 32 is made of $SiO_2$, SiN, SiON, or a metal oxide, for example. Thereafter, a semiconductor layer 33 constituting a channel forming area is formed on the gate insulation layer 32, and source/drain electrodes 34 are formed on the semiconductor layer 33. For example, the semiconductor layer 33 is made of polysilicon or amorphous silicon, while the source/drain electrodes 34 are made of a metal film such as titanium, chrome, aluminum, molybdenum, tantalum, tungsten, and copper, or an alloy film or a laminated film of these materials. Manufacture of the TFT layer 30 is now completed. The TFT layer 30 thus formed may be produced by a known method. Note that the TFT is not limited to a so-called bottom-gate and top-contact type adopted in this example, but may be a bottom-gate and bottom-contact type, a top-gate and top-contact, or a top-gate and bottom-contact type. Two sets of the TFT and the like are provided as necessary for the first transparent conductive material layer 135 and the second transparent conductive material layer 145. In addition, the capacitor 94, the first capacity portion, and the second capacity portion are provided by a known method.

Thereafter, the base layer 150 having a thickness of 2.5 μm is formed on the entire surface, and the connection hole 35 is subsequently formed in the base layer 150 above the one source/drain electrode 34. The one source/drain electrode 34 is exposed to a bottom of the connection hole 35. Thereafter, a resist material layer is formed on the base layer 150, and subsequently subjected to exposure and development to form recesses and protrusions having a predetermined depth in the resist material layer. Moreover, the resist material layer and the base layer 150 are etched back to form the recesses and protrusions 121 in the base layer 150. Note that the two connection holes 35 are formed for the first transparent conductive material layer 135 and the second transparent conductive material layer 145.

Alternatively, a smoothing film 150A is subsequently formed on the entire surface. Thereafter, the connection hole 35 is formed in the smoothing film 150A above the one source/drain electrode 34. The one source/drain electrode 34 is exposed to a bottom of the connection hole 35. Moreover, an insulation material layer is formed on the smoothing film including the connection hole 35, and a resist material layer is further formed on the insulation material layer. The resist material layer used for producing recesses and protrusions extends inside the connection hole 35. Thereafter, the resist material layer is patterned by exposure and development. Furthermore, the insulation material layer is etched by using an etching mask constituted by the resist material layer to remove the resist material layer and form the recesses and protrusions 121 in the base layer 150 (see FIG. 24A). Each of the recess bottom faces 152 is constituted by the smoothing film, the protrusion is constituted by the insulation material layer, and the base layer 150 is constituted by the smoothing film and the insulation material layer. The recesses and protrusions 121 of the base layer 150 extend inside the connection hole 35, and reach a position above the one source/drain electrode 34 exposed to the bottom of the connection hole 35.

Thereafter, the transparent conductive material layers 135 and 145 made of ITO having a predetermined thickness are formed on the entire surface by sputtering, for example. Note that selected for sputtering are a sputtering device and sputtering conditions not forming the transparent conductive material layers on the sides of the recesses and protrusions. Depending on cases, so-called soft etching may be performed for the transparent conductive material layers after formation of the transparent conductive material layers to remove the transparent conductive material layers which may be formed on the sides of the recesses and protrusions (or have been formed on the sides of the recesses and protrusions) (see FIGS. 24B and 24C). Alternatively, for example, etching back may be performed for an organic film formed on the entire surface to remove the transparent conductive material layers which may be formed on the sides of the recesses and protrusions (or have been formed on the sides of the recesses and protrusions) (see FIGS. 25A and 25B). As a result, the first electrode separation portion is produced for separation between the first transparent conductive material layer 135 and the second transparent conductive material layer 145. The transparent conductive material layers extend to the one source/drain electrode 34 exposed to the bottom of the connection hole 35. Thereafter, the transparent conductive material layers 135 and 145 are patterned by a known method to separate pixels and produce the first electrode 120 in a shape of matrix. Specifications of the protrusions 130 and the recesses 140 are determined as in following Table 1.

Note that another method for forming the first electrode separation portion for separation between the first transparent conductive material layer 135 and the second transparent conductive material layer 145 will be described below.

On the other hand, for producing the second substrate 50, a color filter layer (not shown) is formed on the second substrate 50 made of a glass substrate having a thickness of 0.7 mm. Subsequently, the second electrode 52 constituted by a so-called solid electrode is formed on the color filter layer.

TABLE 1

| | |
|---|---|
| average height of protrusion | 0.4 μm |
| formation pitch of protrusion | 5.0 μm |
| width of protrusion | 2.5 μm |
| width of recess | 2.5 μm |
| thickness of transparent conductive material layer | 0.1 μm |
| tilt angle of side of branch protrusion | 90 degrees |
| average film thickness of first orientation film | 0.1 μm |
| average film thickness of second orientation film | 0.1 μm |
| $T_2/T_1$: | 1 |

Thereafter, the first orientation film 21 is formed on the first electrode 120, and the second orientation film 51 is formed on the second electrode 52. More specifically, an orientation film material is applied to or printed on each of the first electrode 120 and the second electrode 52, and subsequently heated thereon. The orientation film material used herein is a vertically orientation film material, i.e., JALS2131-R6 manufactured by JSR Corporation. The heating temperature is preferably 80° C. or higher, more preferably in a range from 150° C. to 200° C. (inclusive). In addition, the heating temperature of the heating process may be varied stepwise. By the heating process, a solvent contained in the applied or printed orientation film material is evaporated to form the orientation films 21 and 51 containing highly polymerized compounds. Thereafter, rubbing or other processing may be performed as necessary. More specifically, the vertically orientation film material is applied to the first electrode 120 and the second electrode 52 by spin-coating to form the first orientation film 21 and the second orientation film 51. Subsequently, the first electrode 120 and the second electrode 52 are dried on a hot plate at 80° C. for 80 seconds, and then baked in a clean oven under a nitrogen atmosphere at 200° C. for 60 minutes to obtain the first orientation film 21 and the second orientation film 51.

Thereafter, the first substrate 20 and the second substrate 50 are disposed such that the orientation film 21 and the orientation film 51 face each other, in which condition the liquid crystal layer 60 containing the liquid crystal molecules 61 is sealed between the orientation film 21 and the orientation film 51. More specifically, spacer protrusions for securing cell gaps, such as plastic beads each of which has a diameter of 3.0 μm are scattered toward the face where either the orientation film 21 or 51 is formed on the first substrate 20 or the second substrate 50. On the other hand, ultraviolet curable resin containing silica particles each of which has a particle diameter of 3.5 μm is applied to an outer edge of the second substrate 50 by screen printing, for example, to form a sealing portion. Subsequently, liquid crystal material containing 0.3 mass % polymerizable monomers corresponding to orientation control material (more specifically, acrylic monomers A-BP-2E manufactured by Shin-Nakamura Chemical Co., Ltd.) in negative-type liquid crystals is instilled into a portion surrounded by the sealing portion. This manufacturing system of the liquid crystal display device is called PSA system. Thereafter, the first substrate 20 and the second substrate 50 are affixed to each other, in which condition the sealing portion is cured at 120° C. for 1 hour. As a result, the liquid crystal layer 60 is sealed. Subsequently, voltage is applied between the first electrode 120 and the second electrode 52, more specifically, between the first transparent conductive material layer 135 and the second electrode 52, or between the first transparent conductive material layer 135, the second transparent conductive material layer 145, and the second electrode 52, for example, by using a voltage application means. The voltage to be applied is an alternating electric field (60 Hz) having a rectangular wave and in a range from 3 volts to 30 volts, more specifically, an effective voltage of 7 volts, for example. Simultaneously, reaction of polymerizable monomers is caused by performing a heating process, or applying ultraviolet light (e.g. uniform ultraviolet light of 10 J (measured at wavelength of 360 nm), depending on the types of polymerizable monomers. As a result, an electric field having a predetermined angle with respect to the surfaces of the first substrate 20 and the second substrate 50 is generated. Accordingly, the liquid crystal molecules 61 are oriented with a tilt in a predetermined direction with respect to the vertical direction of the first substrate 20 and the second substrate 50. More specifically, an azimuth (declination) of each of the liquid crystal molecules 61 in this case is regulated by the intensity and direction of the electric field, and the polymerizable monomers mixed with the liquid crystals, while a polar angle (zenith angle) is regulated by the intensity of the electric field, and the polymerizable monomers mixed with the liquid crystals. Accordingly, the pre-tilts $\theta_1$ and $\theta_2$ of the liquid crystal molecules 61A and 61B are controllable by appropriate control of the value of the voltage. The recesses and protrusions 121 formed in the first electrode 120 add an oblique electric field between the first substrate 20 and the second substrate 50. In addition, a polymeric layer is formed in the vicinity of the counter faces of the substrates by reaction of the polymerizable monomers mixed with the liquid crystals. In this case, the direction for reaction of the liquid crystal molecules 61 is regulated by the polymeric layer thus formed, whereby the pre-tilt state of the liquid crystal molecules 61 in the vicinities of the first substrate 20 and the second substrate 50 is fixed by reaction products of the polymerizable monomers. Manufacture of liquid crystal cells is thus completed.

On the other hand, in case of the FPA system, an orientation film having a function of memorizing a pre-tilt is applied to at least one of the electrodes and formed thereon. Thereafter, negative type liquid crystals are injected and sealed into the film. According to this system, liquid crystal material constituted by negative type liquid crystals is instilled into a portion surrounded by a sealing portion after formation of the sealing portion. Thereafter, the first substrate 20 and the second substrate 50 are affixed to each other, in which condition the sealing portion is cured by using ultraviolet light having a wavelength of 410 nm. Subsequently, voltage is applied between the first electrode 120 and the second electrode 52, more specifically, between the first transparent conductive material layer 135 and the second electrode 52, or between the first transparent conductive material layer 135, the second transparent conductive material layer 145, and the second electrode 52, for example, by using a voltage application means. The voltage to be applied is an alternating electric field (60 Hz) having a rectangular wave and in a range from 3 volts to 30 volts, more specifically, an effective voltage of 7 volts, for example. As a result, an electric field in a direction having a predetermined angle with respect to the surfaces of the first substrate 20 and the second substrate 50 is generated, whereby the liquid crystal molecules 61 are oriented with a tilt in a predetermined direction with respect to the vertical direction of the first substrate 20 and the second substrate 50. More specifically, an azimuth (declination) of each of the liquid crystal molecules 61 in this case is regulated by the intensity and direction of the electric field, and the molecule structure of the orientation film material, while a polar angle (zenith angle) is regulated by the intensity of the electric field, and the molecule structure of the orientation film material. Accordingly, the pre-tilts $\theta_1$ and $\theta_2$ of the liquid crystal molecules 61A and 61B are controllable by appropriate control of the value of the voltage. Thereafter, energy light (more specifically, ultraviolet light UV), such as uniform ultraviolet light of 10 J (measured at wavelength of 360 nm), is applied from the outside of the first substrate 20 to the orientation films 21 and 51. More specifically, ultraviolet light is applied under application of an electric field or a magnetic field such that the liquid crystal molecules 61 are arranged in an oblique direction with respect to the surfaces of the pair of substrates 20 and 50. As a result, a crosslinking functional group or a polymerizable functional group within the orientation films 21 and 51 is reacted and crosslinked. The recesses and protrusions 121 formed in the first electrode 120 add an oblique electric field between the first substrate 20 and the second substrate 50. As a result, the direction for reaction of the liquid crystal molecules 61 is memorized by highly polymerized compounds obtained by polymerization of a photosensitive group. A pre-tilt is given to the liquid crystal molecules 61 in the vicinities of the orientation films 21 and

51. Moreover, as a result, the pre-tilts $\theta_1$ and $\theta_2$ are given to the liquid crystal molecules 61A and 61B, respectively, positioned in the vicinities of the interfaces of the orientation films 21 and 51 in the liquid crystal layer 60 in a non-driving state. It is preferable that the ultraviolet light UV is constituted by ultraviolet light containing a large number of light components having wavelengths approximately in a range from 295 nm to 365 nm. In case of use of ultraviolet light containing a large number of light components in a shorter wavelength range, photolysis of the liquid crystal molecules 61 may be produced and cause deterioration. Note that while the ultraviolet light UV is applied from the outside of the first substrate 20 in this example, the ultraviolet light UV may be applied from the outside of the second substrate 50, or from the outsides of both the first substrate 20 and the second substrate 50. In this case, it is preferable that the ultraviolet light UV is applied from the substrate having a higher light transmittance. In addition, in case of application of the ultraviolet light UV from the outside of the second substrate 50, the ultraviolet light UV may be absorbed by the color filter layer and have difficulty in causing cross-linking reaction depending on the wavelength range of the ultraviolet light UV. It is therefore preferable that the ultraviolet light UV is applied from the outside of the first substrate 20 (substrate including pixel electrode).

As described above, a pre-tilt is given to the liquid crystal molecules 61 by reaction of at least the photosensitive group (orientation control material) constituting at least the first orientation film 21 under application of a predetermined electric field to the liquid crystal layer 60 (FPA system). Alternatively, a pre-tilt is given to the liquid crystal molecules 61 by reaction of the polymerizable monomers (orientation control material) contained in the liquid crystal layer 60 under application of a predetermined electric field to the liquid crystal layer 60 (PSA system).

On the assumption that an average film thickness of the first orientation film 21 and an average film thickness of the second orientation film 51 are $T_1$ and $T_2$, respectively, it is preferable that a relation $0.5 \leq T_2/T_1 \leq 1.5$, preferably $0.8 \leq T_2/T_1 \leq 1.2$ holds. By regulating the value of $T_2/T_1$, i.e., by equalizing or almost equalizing the average film thickness of the first orientation film 21 and the average film thickness of the second orientation film 51 as described above, burning or the like is securely avoidable. This description is applicable to each of the second through sixteenth embodiments described below.

Manufacture of the liquid crystal display device (liquid crystal display element) illustrated in FIG. 1 and containing the pre-tilted liquid crystal molecules 61A on the sides of the first substrate 20 and the second substrate 50 is completed by the foregoing steps. Finally, a pair of polarizing plates (not shown) is affixed to the outside of the liquid crystal display device such that respective absorption axes cross each other at right angles. Note that the respective liquid crystal display devices presented in the second through ninth embodiments may be manufactured by a substantially similar method.

When driving voltage is applied to the selected pixel 10 in an operation of the liquid crystal display device (liquid crystal display element), the orientation state of the liquid crystal molecules 61 contained in the liquid crystal layer 60 varies in accordance with a potential difference between the first electrode 120 and the second electrode 52. More specifically, when driving voltage is applied in a state prior to application of driving voltage as illustrated in FIG. 1, the liquid crystal molecules 61A and 61B positioned in the vicinities of the orientation films 21 and 51 fall in the respective tilt directions while rotating in the liquid crystal layer 60. This operation is also transmitted to the different liquid crystal molecules 61C. As a result, the liquid crystal molecules 61 respond in a posture substantially horizontal (parallel) with respect to the first substrate 20 and the second substrate 50. Accordingly, light entering the liquid crystal display element is emitted as modulated light based on a resultant change of the optical characteristics of the liquid crystal layer 60. An image is displayed with a gradation expression corresponding to the emitted light. This description is applicable to the respective embodiments 2 through 12 described below.

According to this liquid crystal display device, an image is displayed by application of driving voltage between the first electrode (pixel electrode) 120 and the second electrode (counter electrode) 52 in a manner described below. More specifically, in response to reception of a source driver control signal from the timing controller 83, the source driver 81 supplies an individual image signal to the predetermined source line 91 on the basis of an image signal received from the same timing controller 83. Simultaneously, the gate driver 82 sequentially supplies a scanning signal to the gate line 92 at predetermined timing in response to reception of a gate driver control signal from the timing controller 83. Accordingly, driving voltage is applied to the pixel 10 selected as a pixel positioned at an intersection between the source line 91 to which the image signal has been supplied and the gate line 92 to which the scanning signal has been supplied. This description is applicable to each of the second through sixteenth embodiments described below.

A color filter layer may be formed on the first substrate 20. More specifically, the TFT layer 30 is formed on the first substrate 20 as described above. Thereafter, a color filter layer 22 is formed on the TFT layer 30 by a known method in place of the base layer 150. As a result, a color filter on array (COA) structure is produced. Then, after the connection hole 35 is formed in the color filter layer 22 above the one source/drain electrode 34, recesses and protrusions are formed in the color filter layer 22 including the connection hole 35. Thereafter, the first electrode 120 (transparent conductive material layers 135 and 145) is further formed (see FIG. 53B). This description is applicable to each of the second through sixteenth embodiments described below.

Figure 5:
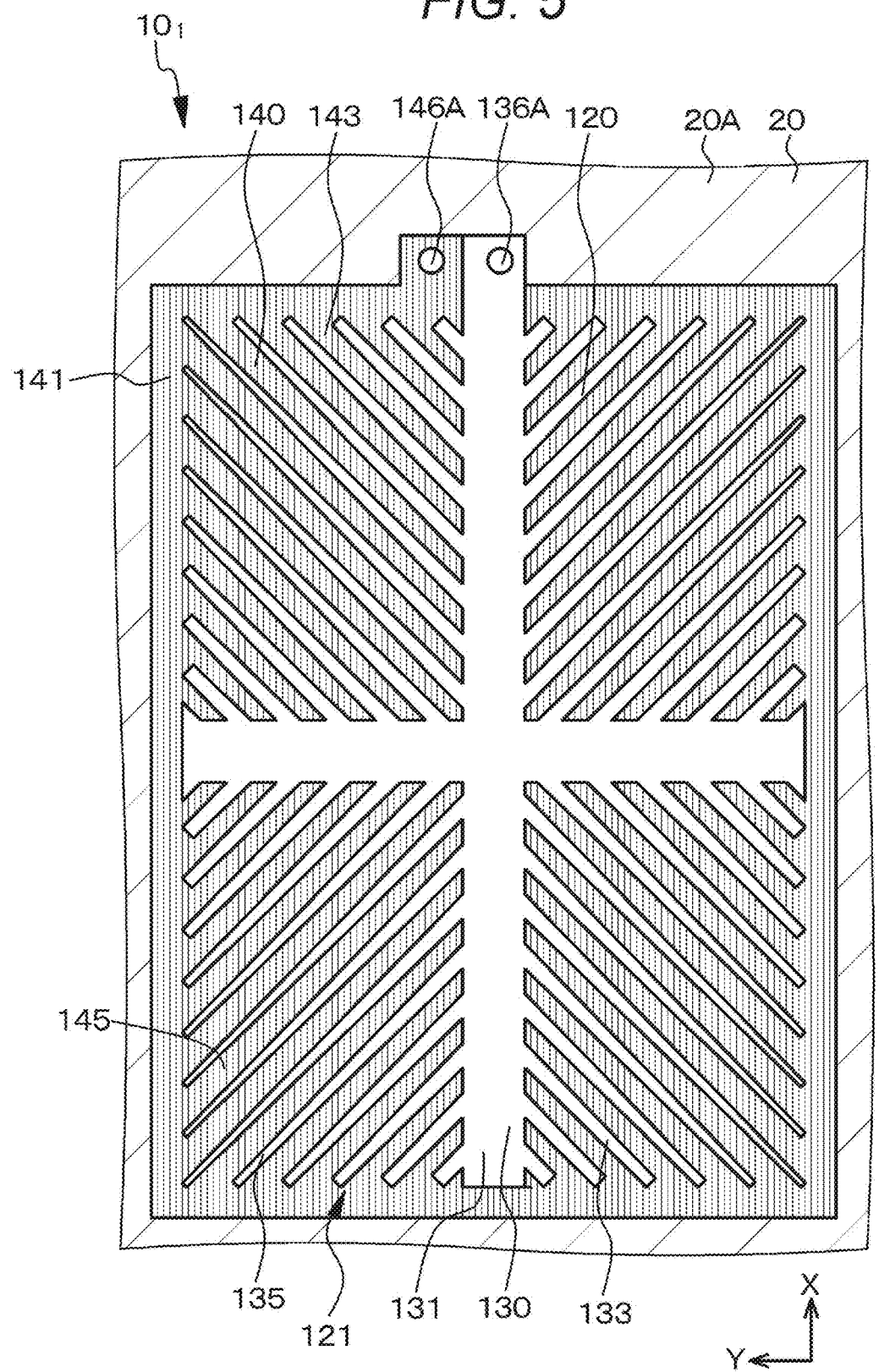
FIG. 5 is a schematic view of one pixel on a first substrate constituting a liquid crystal display device according to a different modified example of the first embodiment as viewed from above.
Figure 6:
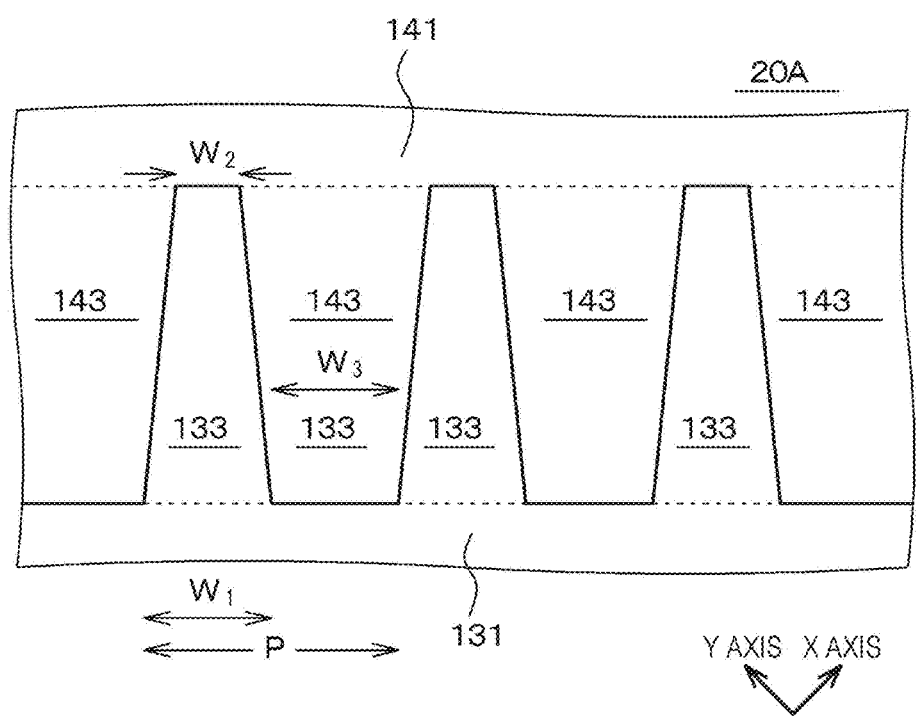
FIG. 6 is a schematic plan view illustrating an enlarged part of a first electrode of one pixel constituting the liquid crystal display device according to the different modified example of the first embodiment illustrated in FIG. 5.

In addition, as illustrated in FIG. 5, the width of each of the branch protrusions 133 formed in the first electrode 120 may be reduced toward a tip of each of the branch protrusions. FIG. 6 is a schematic plan view illustrating an enlarged part of the first electrode of one pixel. Note that while each of portions of the stem protrusion 131 from which the branch protrusions 133 extend, and each of portions of the stem protrusion 131 positioned between branch protrusions 133 (indicated by dotted lines in FIGS. 6, 7A, and 7B) are not in parallel with the X axis or the Y axis in FIGS. 6, 7A, and 7B, these portions of the stem protrusion 131 practically extend in parallel with the X axis or the Y axis.

Figure 7A:
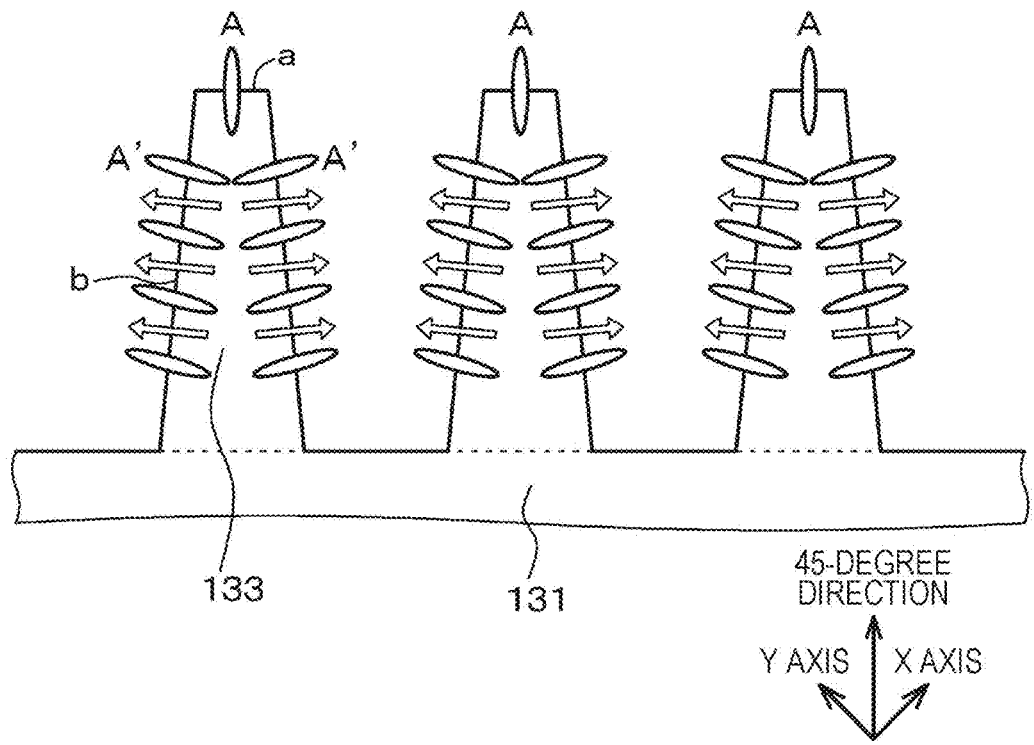
FIGS. 7A and 7B are schematic views explaining behaviors of liquid crystal molecules in tapered branch protrusions of a liquid crystal display device, and in not-tapered branch protrusions of a liquid crystal display device, respectively.
Figure 7B:
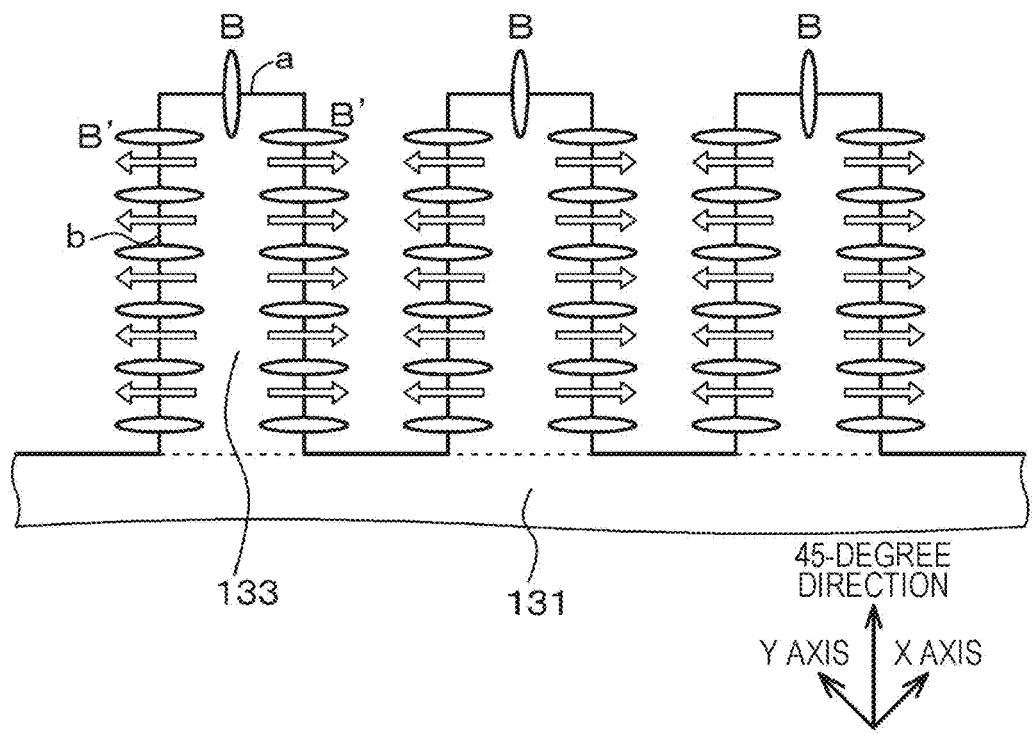

During manufacture of the liquid crystal display device, a pre-tilt is given to the liquid crystal molecules under application of voltage to the electrodes. In this case, liquid crystal molecules A positioned at tip edges a or in the vicinities thereof (referred to as "tip areas" for convenience) are tilted such that the major axis directions (directors) approach toward the stem protrusion as illustrated in FIGS. 7A and 7B. Moreover, in the liquid crystal layer, assuming that an area in the thickness direction including the liquid crystal molecules A is defined, movement of the liquid crystal molecules A is transmitted to liquid crystal molecules (referred to as "liquid crystal molecules A' for convenience) in the one entire pixel except for the edge portions of the branch protrusions affected by a local electric field produced by the structure. Accordingly, the directors of the liquid crystal molecules A' are tilted toward the stem protrusion. In this case, the movement of the liquid crystal molecules A is more easily transmitted to the liquid crystal molecules A' in the liquid crystal display device which includes tapered branch protrusions as illustrated in FIG. 7A than in the liquid crystal display device which includes not-tapered branch protrusions as illustrated in FIG. 7B. Alternatively, the movement of the liquid crystal molecules A is transmitted in a shorter time to the liquid crystal molecules A' in the liquid crystal display device in FIG. 7A than in FIG. 7B.

When voltage is applied to the electrodes during display of an image on the liquid crystal display device, the liquid crystal molecules change such that the directors become parallel with the first substrate and the second substrate in the entire liquid crystal layer. The directions of the electric fields at the respective side edges are indicated by white arrows in FIGS. 7A and 7B. Assuming here that a columnar area in the thickness direction is defined in the liquid crystal layer containing liquid crystal molecules B positioned at side edges b or in the vicinities of the side edges b (referred to as "side area" for convenience), the liquid crystal molecules arranged in lines in the thickness direction of the columnar area are rotated. More specifically, the directions of the directors of the liquid crystal molecules B positioned in the side areas are different from the directions of the directors of the liquid crystal molecules (referred to as liquid crystal molecules B' for convenience) arranged in lines in the thickness direction of the columnar area containing the liquid crystal molecules B. It is assumed that an angle formed by the director of each of the liquid crystal molecules B and the director of the corresponding liquid crystal molecule B' is an angle β. As illustrated in FIG. 7B, a rotation angle range of the liquid crystal molecules is wide (i.e., angle β is large) in the liquid crystal display device including the not-tapered branch protrusions. In this case, a proportion of liquid crystal molecules having retardation in the X axis direction or the Y axis direction may become small. On the other hand, a rotation angle range of the liquid crystal molecules is narrow (i.e., angle β is small) in the liquid crystal display device including the tapered branch protrusions as illustrated in FIG. 7A. In this case, a proportion of liquid crystal molecules having retardation in the X axis direction or the Y axis direction is large. Accordingly, non-uniformity of the light transmittance of the branch portions in the branch protrusions is avoidable, wherefore reduction of generation of dark lines is more securely achievable.

In other words, more uniform and higher light transmittance is realizable, and more preferable voltage response characteristics are obtainable. Furthermore, improvement of initial orientation is expectable. Accordingly, a time required for giving a pre-tilt to the liquid crystal molecules decreases when uniform ultraviolet light is applied to the liquid crystal cells under application of a rectangular-wave alternating electric field to give the pre-tilt to the liquid crystal molecules. Moreover, reduction of orientation defects is expectable, wherefore improvement of yields, and reduction of production costs of the liquid crystal display device are achievable. In addition, the rise of the light transmittance leads to reduction of power consumption of a backlight, and improvement of TFT reliability. In the second embodiment described next, the width of each of branch protrusions 233 is the maximum at a connection portion between the branch protrusion 233 and a stem protrusion 231, and decreases from the connection portion with the stem protrusion 231 toward a tip portion to meet the foregoing discussion. This description is also similarly applicable to each of the second through twelfth embodiments described below.

Simulations were performed on the basis of parameters shown in following Table 2 to obtain an electric field profile and a light transmittance profile. FIGS. 29 and 30 show results obtained from these simulations. Note that a cell gap in Table 2 refers to a distance from the second transparent conductive material layer 145 (or first electrode) to the second electrode. In addition, simulations were performed on the basis of parameters shown in following Table 3 to obtain an electric field profile and a light transmittance profile of a liquid crystal display device (first comparative example) which has a conventional fine slit structure including a plurality of fine slits on the first electrode. FIGS. 31 and 32 show results obtained from these simulations.

TABLE 2

| | |
|---|---|
| cell gap | 3.0 μm |
| average height of protrusion | 0.3 μm |
| formation pitch of protrusion | 8.0 μm |
| width of protrusion | 4.0 μm |
| width of recess | 4.0 μm |

TABLE 3

| | |
|---|---|
| cell gap | 3.0 μm |
| formation pitch of slit | 8.0 μm |
| width of slit | 4.0 μm |

Comparing FIGS. 29 and 31, the electric field profile of the first embodiment is flatter than that of the first comparative example. In addition, comparing FIGS. 30 and 32, the light transmittance profile of the first embodiment is flatter than that of the first comparative example. It is therefore apparent that the light transmittance of the liquid crystal layer is more equalized in the first embodiment.

According to the liquid crystal display device in the first embodiment described above, the first transparent conductive material layer 135 connected to the first power supply portion is formed on the protrusion top faces 151 of the base layer 150, while the second transparent conductive material layer 145 connected to the second power supply portion is formed on the recess bottom faces 152 of the base layer 150. The first transparent conductive material layer 135 and the second transparent conductive material layer 145 are separated from each other. More specifically, as illustrated in FIG. 2 which is a schematic partial cross-sectional view illustrating the enlarged first electrode separation portion corresponding to a separation portion between the transparent conductive material layer 135 and the second transparent conductive material layer 145, a certain type of edge portion 135A is formed at a portion of the first transparent conductive material layer 135 separated from the second transparent conductive material layer 145. Accordingly, the intensity of the electric field generated by application of voltage to the first electrode 120 formed on the recesses and protrusions increases by the presence of the certain type of edge portion 135A formed on the first transparent conductive material layer 135. As a result, generation of orientation defects caused by inappropriate orientation control over the liquid crystals is securely avoidable. Moreover, non-uniformity of contrast of an image (light transmittance of liquid crystal layer) caused by non-uniformity of the orientation state of the liquid crystal molecules positioned in the vicinities of the sides 153 of the base layer 150 is securely avoidable. Furthermore, the degree of designing freedom in determining the protrusion height of the recesses and protrusions, and the tilt angle of the sides of the recesses and protrusions increases, wherefore the protrusion height of the recesses and protrusions may be further reduced.

In addition, voltage applied to the first transparent conductive material layer 135 and voltage applied to the second transparent conductive material layer 145, or application timing of voltage to the first transparent conductive material layer 135 and application timing of voltage to the second transparent conductive material layer 145 may be different from each other. Accordingly, the degree of freedom for controlling the orientation state of the liquid crystal molecules further increases.

Second Embodiment

Figure 9:
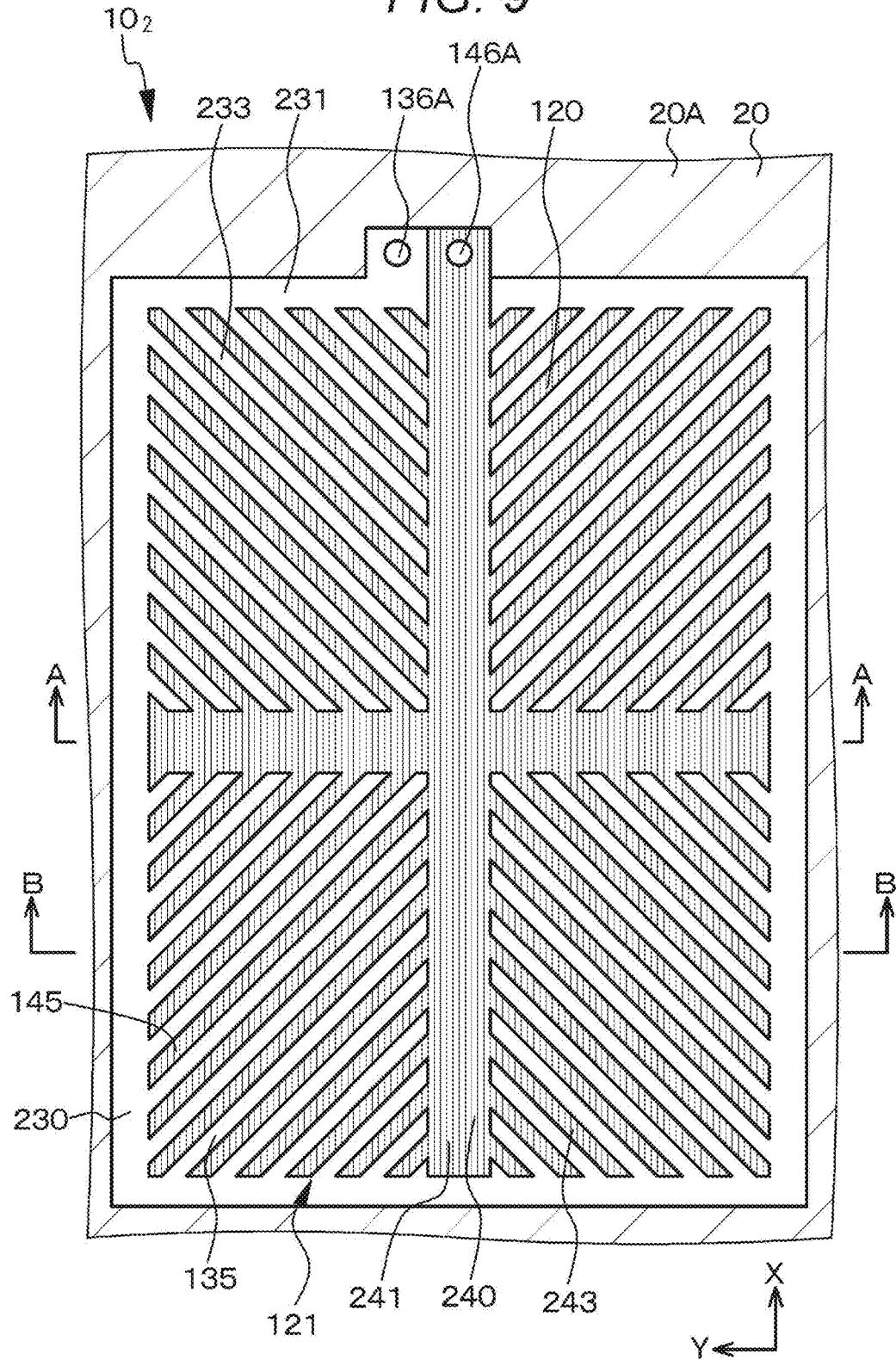
FIG. 9 is a schematic view of one pixel on a first substrate constituting a liquid crystal display device according to a second embodiment as viewed from above.
Figure 11A:
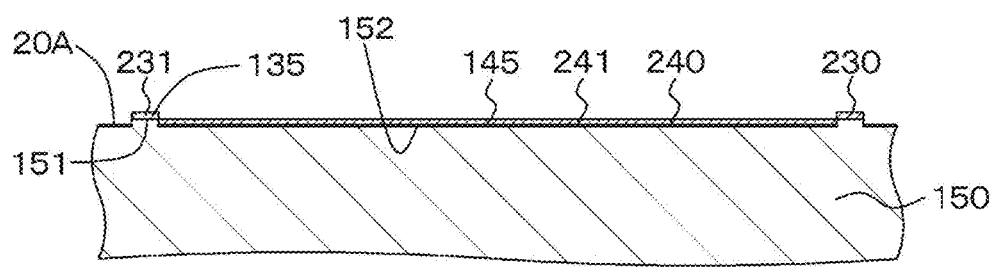
Figure 11B:
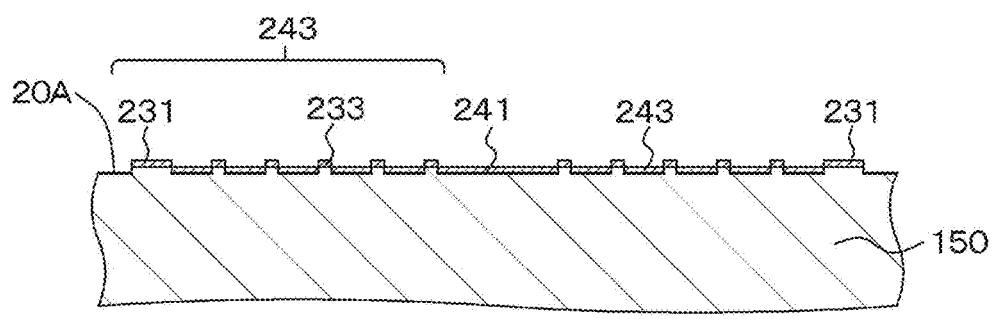
FIG. 11B is a schematic end face view taken along an arrow B-B in FIG. 9.

The second embodiment is a modification of the first embodiment, and relates to the liquid crystal display device in the second example of the first mode. FIG. 9 is a schematic view of one pixel $10_2$ on the first substrate 20 constituting the liquid crystal display device of the second embodiment as viewed from above. FIG. 11A is a schematic end face view taken along an arrow A-A in FIG. 9, while FIG. 11B is a schematic end face view taken along an arrow B-B in FIG. 9. While the liquid crystal display device in the second embodiment illustrated in FIG. 9 is a modification of the liquid crystal display device in the first embodiment illustrated in FIG. 3, the liquid crystal display device in the second embodiment may have other configurations, such as a modification of the liquid crystal display device of the first embodiment illustrated in FIG. 4.

In the liquid crystal display device according to the second embodiment, protrusions 230 are constituted by the stem protrusion 231 formed in a frame shape and disposed in a pixel peripheral portion, and the plurality of branch protrusions 233 extending from the stem protrusion 231 toward a pixel inner portion, and recesses 240 are constituted by a stem recess 241 passing through a pixel central portion and extending radially (e.g. in cross shape), and branch recesses 243 extending from the stem recess 241 toward the pixel peripheral portion and positioned between the branch protrusions 233. More specifically, the stem recess 241 extends in parallel with the X axis and the Y axis, for example.

Figure 10:
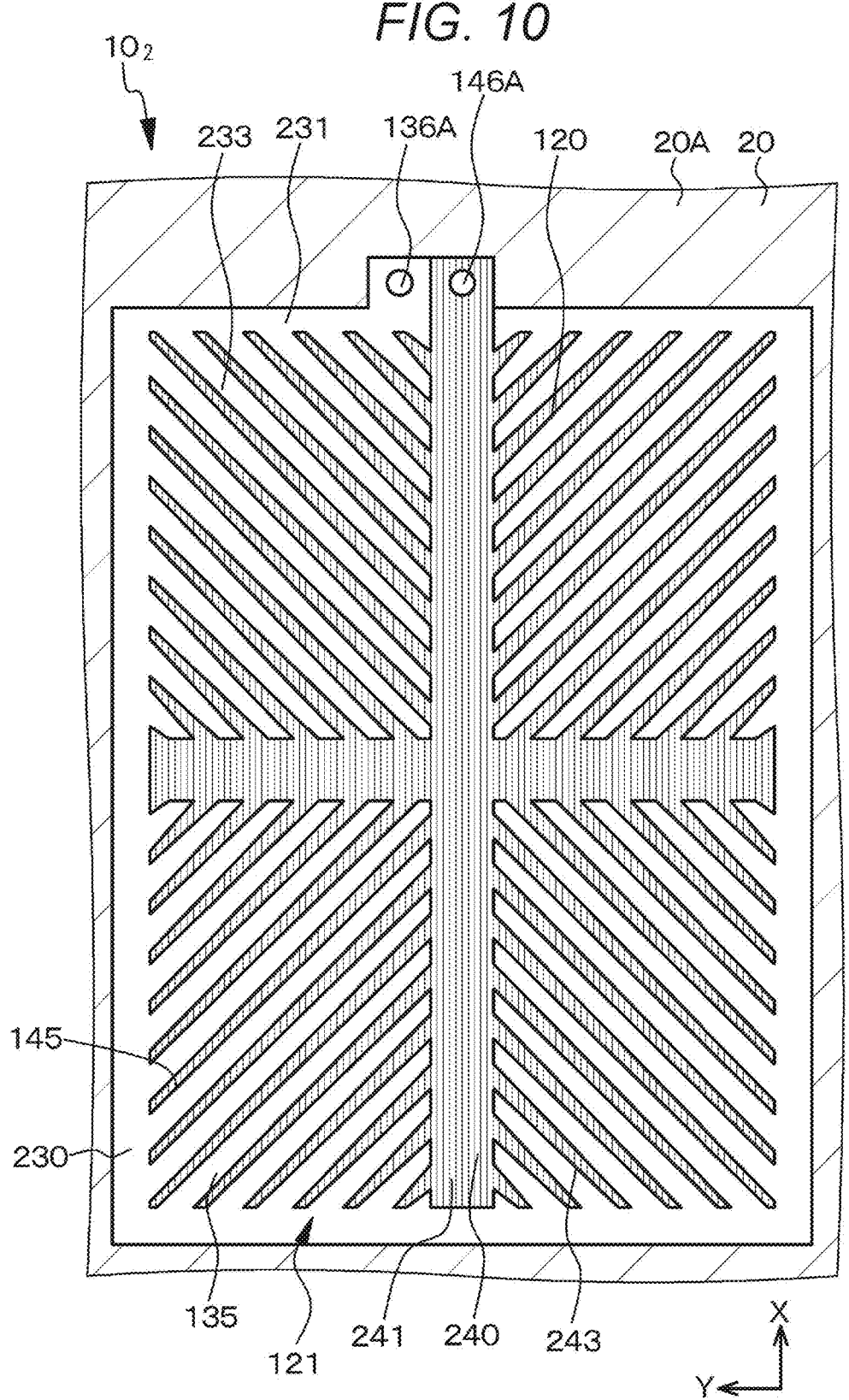
FIG. 10 is a schematic view of one pixel on a first substrate constituting a liquid crystal display device according to a modified example of the second embodiment as viewed from above.

FIG. 10 is a schematic view of one pixel on the first substrate constituting a modified example of the liquid crystal display device according to the second embodiment illustrated in FIG. 9 as viewed from above. Each width of the branch protrusions 133 formed on the first electrode 120 of the liquid crystal display device illustrated in FIG. 10 by way of example decreases toward the tip of the branch protrusion 133.

A schematic partial end face view of the liquid crystal display device according to the second embodiment is substantially identical to FIG. 1. The configuration and structure of the liquid crystal display device according to the second embodiment are similar to those of the liquid crystal display device of the first embodiment. Accordingly, detailed description of the liquid crystal display device of the second embodiment is omitted.

Third Embodiment

Figure 12:
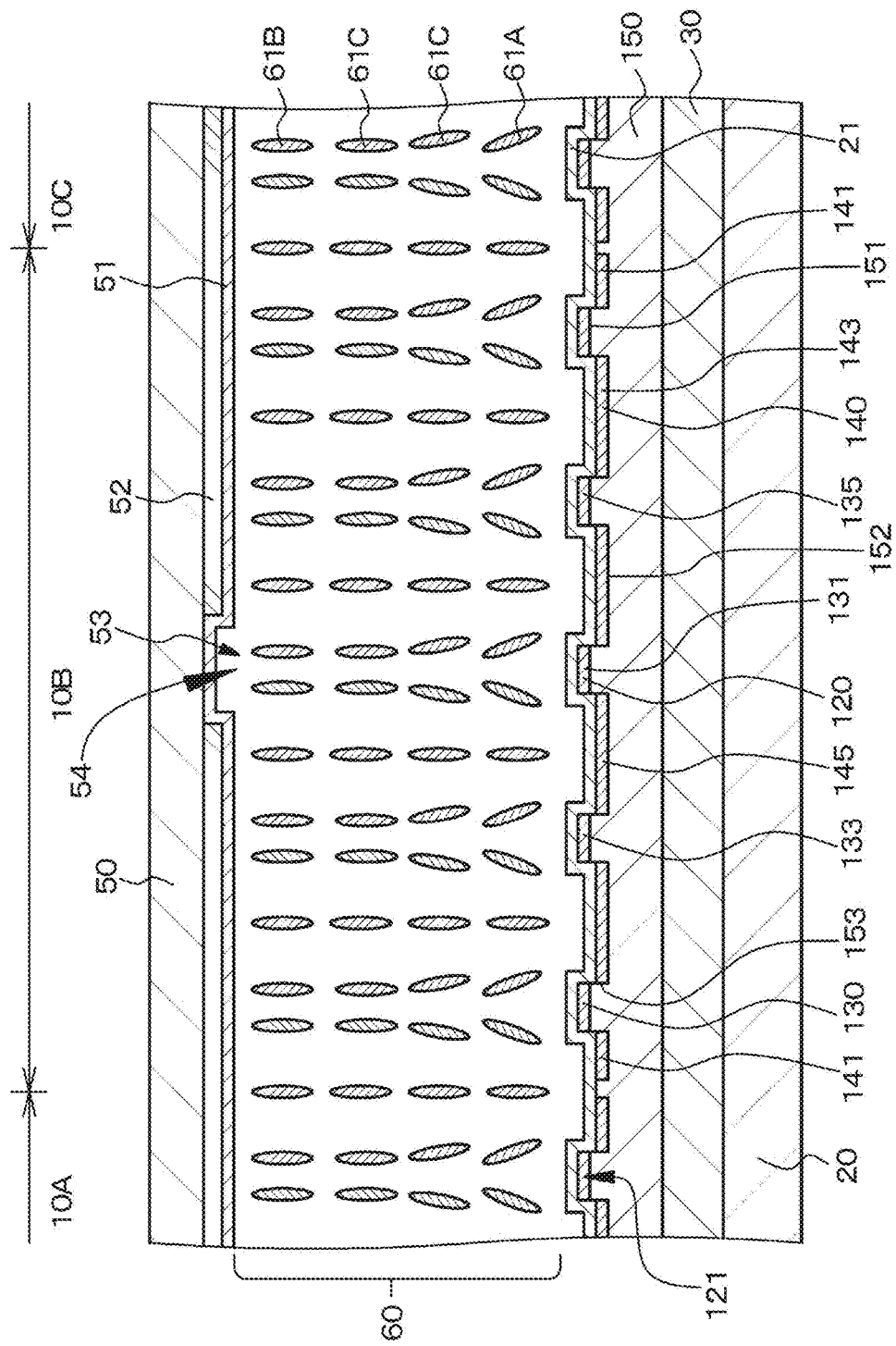
FIG. 12 is a schematic partial end face view of a liquid crystal display device according to a third embodiment.
Figure 13:
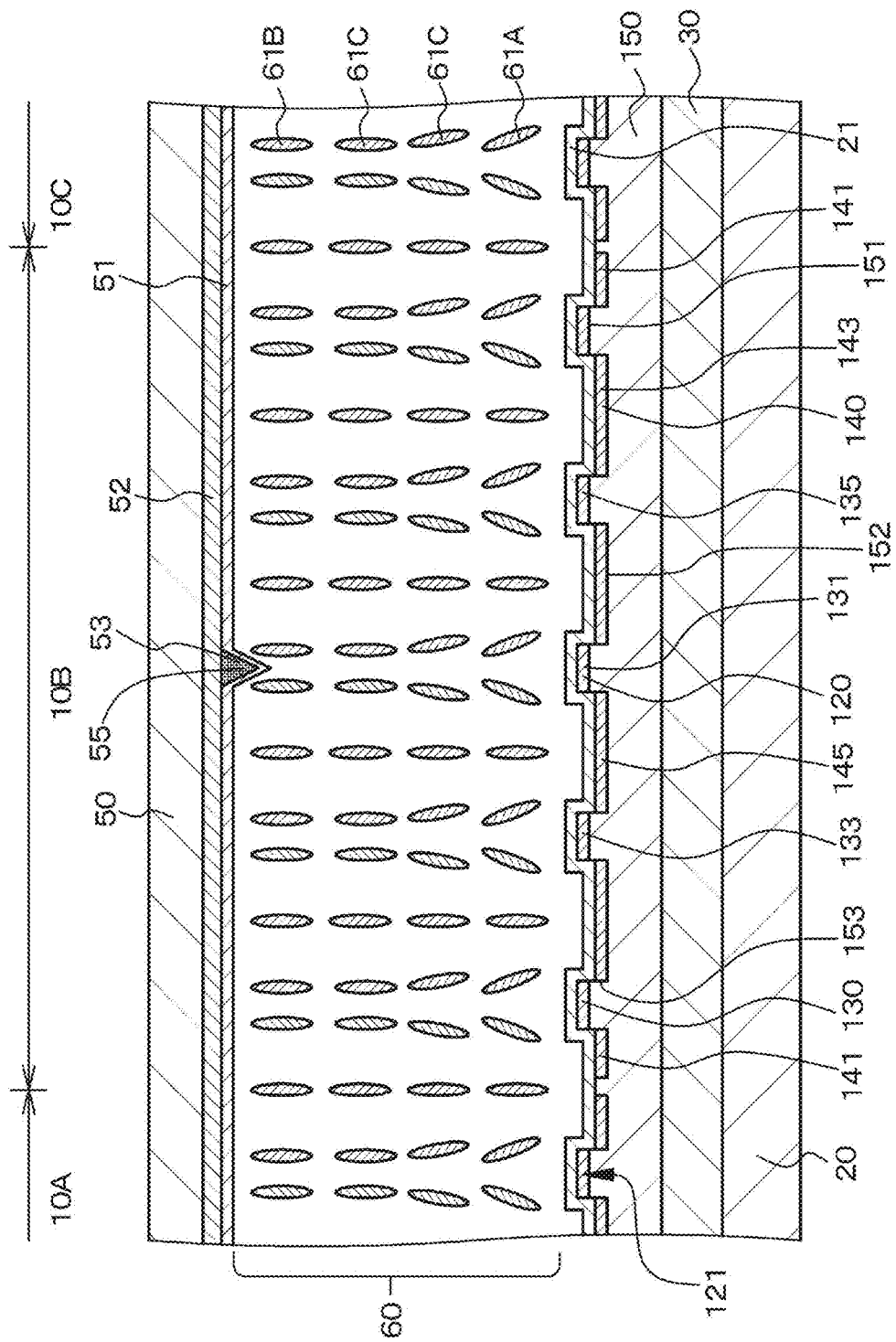
FIG. 13 is a schematic partial end face view of a liquid crystal display device according to a modified example of the third embodiment.

The third embodiment is a modification of the liquid crystal display devices of the first and second examples of the first mode. Each of FIGS. 12 and 13 is a schematic partial end face view of a liquid crystal display device according to the third embodiment. In addition, each of FIGS. 51B and 51C is a conceptual view illustrating a behavior of liquid crystal molecules in the liquid crystal display device according to the third embodiment.

According to the liquid crystal display device of the third embodiment, the stem protrusion 131 passing through a pixel central portion and extending radially (e.g. in cross shape) (more specifically, extending in parallel with X axis and Y axis, for example) is formed on the first electrode 120 similarly to the first embodiment. In addition, an orientation regulation portion 53 is formed in a portion of the second electrode 52 corresponding to the stem protrusion 131 as illustrated in FIG. 12 or 13.

More specifically, the orientation regulation portion 53 is constituted by a second electrode notch structure 54 having a length of 4.0 µm and formed in the second electrode 52 (see FIG. 12 and FIG. 51B), or a second electrode projection (rib) 55 formed in the second electrode 52 (see FIG. 13 and FIG. 51C). In more detail, the second electrode projection 55 is made of a negative type photo resist material (OPTMER AL: manufactured by JSR Corporation), and has a width of 1.4 µm and a height of 1.2 µm. The second electrode notch structure 54 or the second electrode projection (rib) 55 has a radial planar shape (such as cross shape, and extending in parallel with X axis direction and Y axis direction, for example). The cross-sectional shape of the second electrode projection 55 has an isosceles triangular shape. The second electrode 52 is not provided above the second electrode notch structure 54 or the second electrode projection 55.

According to the liquid crystal display device of the third embodiment, the orientation regulation portion 53 constituted by the second electrode notch structure 54 is formed in the portion of the second electrode 52 corresponding to the stem protrusion 131. Accordingly, an electric field generated by the second electrode 52 is distorted in the vicinity of the orientation regulation portion 53. Alternatively, by the presence of the orientation regulation portion 53 constituted by the second electrode projection (rib) 55, the falling directions of the liquid crystal molecules in the vicinity of the second electrode projection 55 are regulated. As a result, an orientation regulation force acting on the liquid crystal molecules in the vicinity of the orientation regulation portion 53 increases, whereby the tilt-state of the liquid crystal molecules in the vicinity of the orientation regulation portion 53 is securely controllable. Accordingly, reduction of generation of dark lines in an image at a part corresponding to the stem protrusion is securely achievable during image display. In other words, the liquid crystal display device provided herein is capable of realizing more uniform and high light transmittance while maintaining preferable voltage response characteristics. In addition, reduction of cost and power consumption of a light source constituting a backlight, and improvement of TFT reliability are achievable. The orientation regulation portion 53 may be constituted by a projecting portion of the second electrode 52.

Fourth Embodiment

Figure 14:
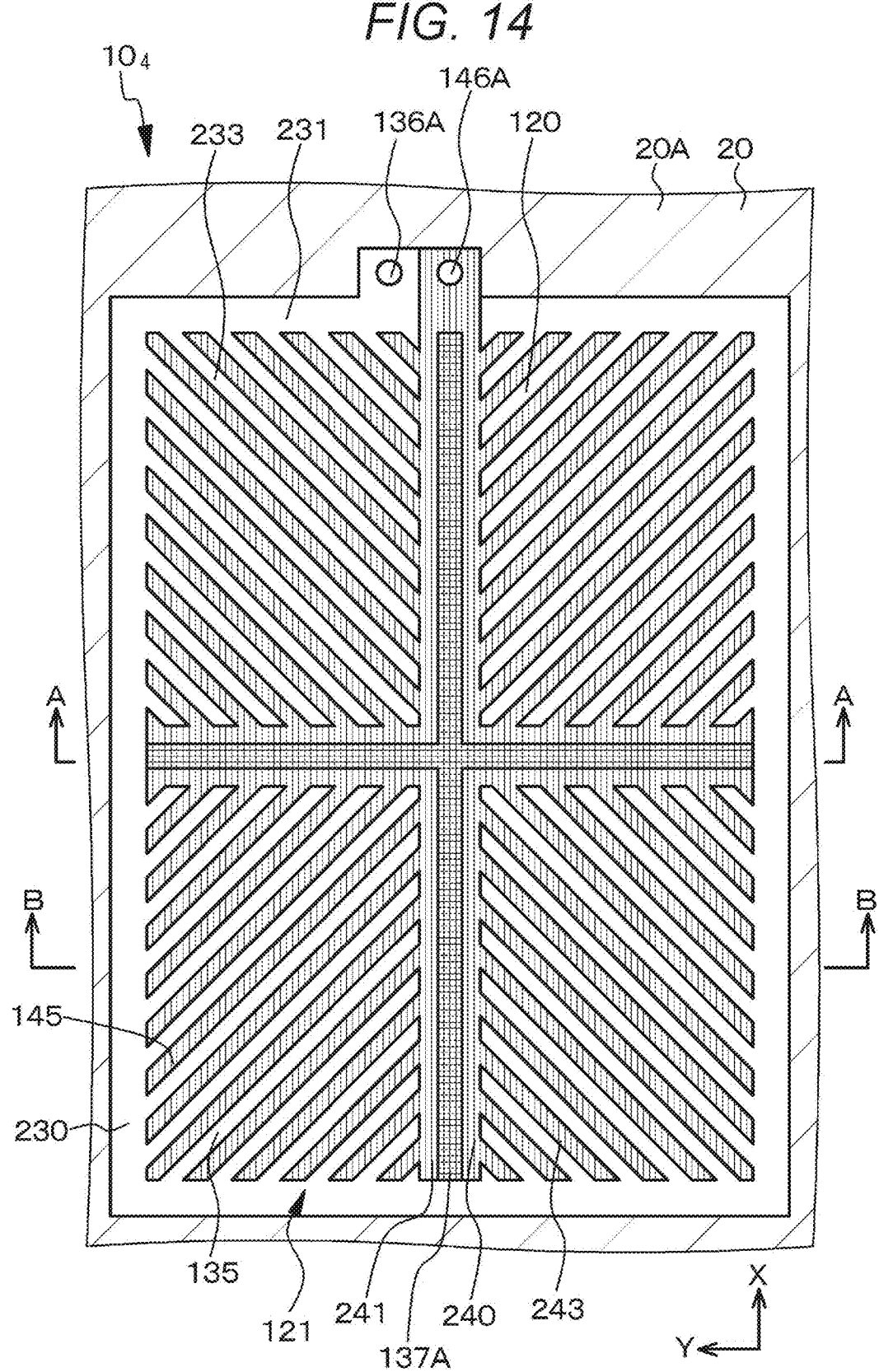
FIG. 14 is a schematic plan view of a first electrode of one pixel constituting a liquid crystal display device according to a fourth embodiment.
Figure 15:
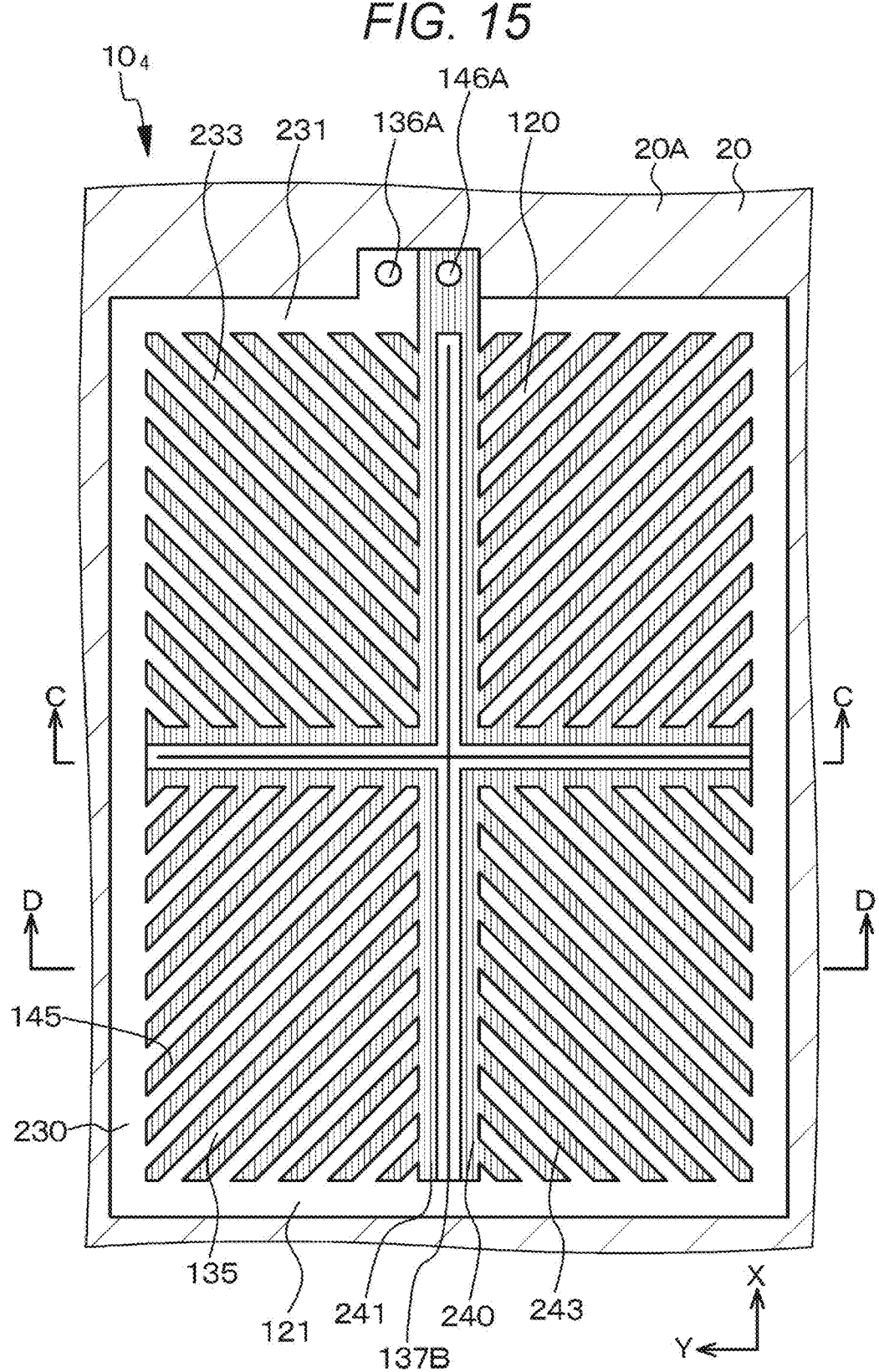
FIG. 15 is a schematic plan view of a first electrode of one pixel constituting a liquid crystal display device according to a modified example of the fourth embodiment.
Figure 16A:
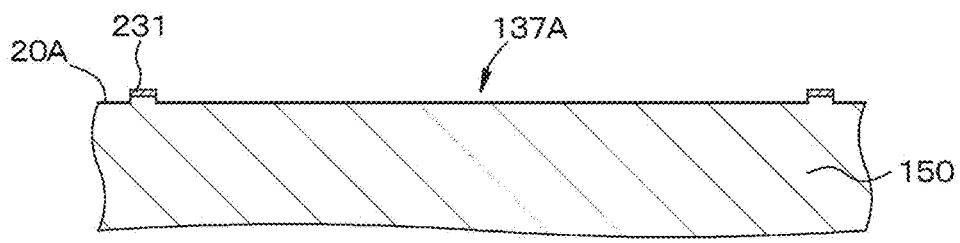
Figure 16B:
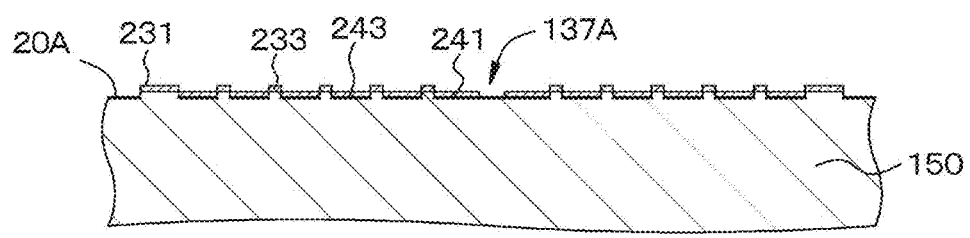
Figure 16C:
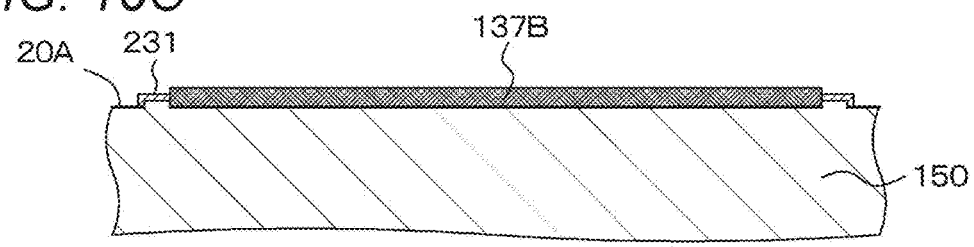
FIGS. 16C and 16D are partial end face views of the first electrode and the like of the liquid crystal display device according to the fourth embodiment taken along an arrow C-C in FIG. 15, and an arrow D-D in FIG. 15, respectively.
Figure 16D:
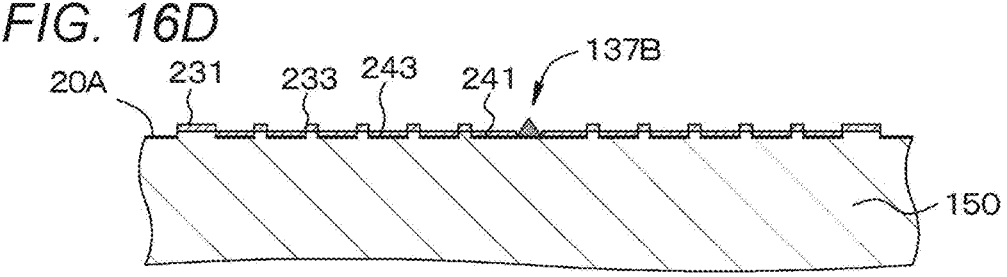

The fourth embodiment is also a modification of the liquid crystal display devices in the first and second examples of the first mode. Each of FIGS. 14 and 15 is a schematic view of one pixel $10_4$ on the first substrate constituting the liquid crystal display device according to the fourth embodiment as viewed from above. Each of FIGS. 16A and 16B is a schematic partial cross-sectional view of the first electrode and the like taken along an arrow A-A and an arrow B-B in FIG. 14, respectively. Each of FIGS. 16C and 16D is a schematic partial cross-sectional view of the first electrode and the like taken along arrows C-C and D-D in FIG. 15, respectively. The example illustrated in FIGS. 14 and 15 is a modified example of the second embodiment.

A first electrode notch structure 137A (see FIG. 14) or a first electrode projection (rib) 137B (see FIG. 15) passing through a pixel central portion and extending in parallel with a pixel peripheral portion is formed on the first electrode 120 of the liquid crystal display device according to the fourth embodiment. More specifically, the first electrode notch structure 137A or the first electrode projection 137B is formed on the stem recess 241 provided at the center of the pixel and extending radially (e.g. in cross shape). The first electrode notch structure 137A or the first electrode projection 137B has a radial planar shape (cross shape extending in parallel with X axis direction and Y axis direction, for example). The width of the first electrode notch structure 137A is set to 4.0 µm. In addition, the first electrode projection 137B made of a negative type photo resist material (OPTMER AL manufactured by JSR Corporation) has a width of 1.4 µm and a height of 1.2 µm. The cross-sectional shape of the first electrode projection 137B has an isosceles triangular shape. The first electrode 120 is not provided above the first electrode notch structure 137A or the first electrode projection 137B.

The first electrode of the liquid crystal display device according to the fourth embodiment has the first electrode notch structure or the first electrode projection which passes through the pixel central portion and extends in parallel with the pixel peripheral portion. Accordingly, an electric field generated by the first electrode is distorted (by the first electrode notch structure), or the falling directions of the liquid crystal molecules are regulated (by the first electrode projection) in the vicinity of the first electrode notch structure or the first electrode projection, unlike a first electrode which includes flat protrusions or recesses not containing the first electrode notch structure or the first electrode projection. As a result, an orientation regulation force acting on the liquid crystal molecules in the vicinity of the first electrode notch structure or the first electrode projection increases, whereby the tilt state of the liquid crystal molecules in the vicinity of the first electrode notch structure or the first electrode projection is securely controllable. Accordingly, generation of dark lines in an image at a portion corresponding to a stem protrusion, a second stem protrusion, or a stem recess securely decreases during image display. In other words, the liquid crystal display device provided herein is capable of realizing more uniform and high light transmittance while maintaining preferable voltage response characteristics. In addition, reduction of cost and power consumption of a light source constituting a backlight, and improvement of TFT reliability are achievable.

The first electrode projection 137B formed on the first electrode 120 may be configured such that a protrusion passing through the pixel central portion and extending radially (extending in cross shape in parallel with X axis and Y axis, for example) is surrounded by a recess. This radial protrusion may be produced by forming a radial protrusion below the first electrode 120, or may be produced by a method similar to the forming method of the recesses and protrusions of the first electrode 120. Alternatively, a radial recess passing through the pixel central portion may be provided in place of the first electrode notch structure 137A or the first electrode projection (rib) 137B.

Fifth Embodiment

Figure 17A:
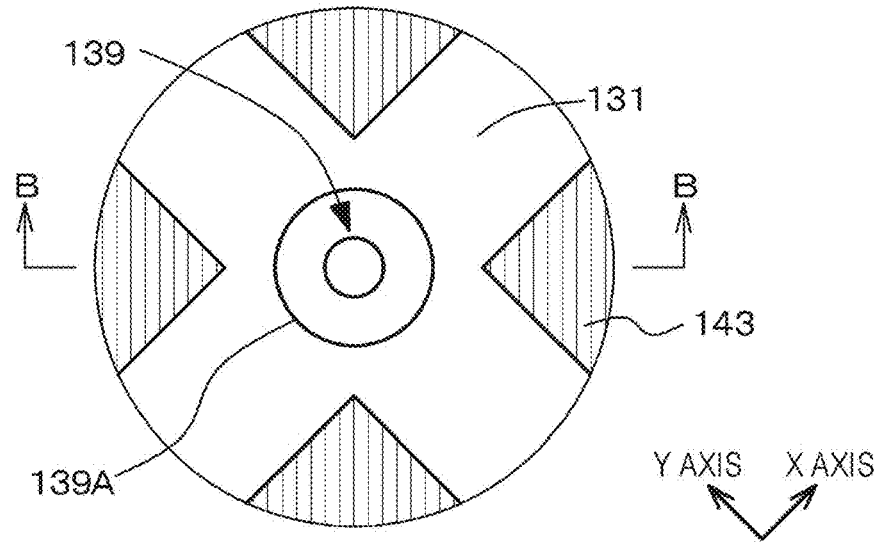
FIG. 17A is a schematic plan view illustrating a part of a first electrode in a center area of one pixel constituting a liquid crystal display device according to a fifth embodiment, while each of FIGS. 17B and 17C is a schematic partial cross-sectional view illustrating a part of the first electrode in the center area of the one pixel constituting the liquid crystal display device according to the fifth embodiment.
Figure 17B:
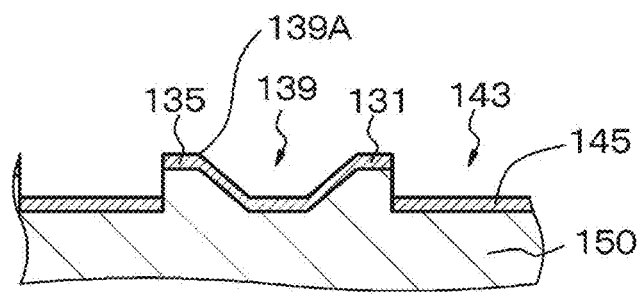

The fifth embodiment is a modification of the first through fourth embodiments. Each of FIGS. 17A, 18A, and 18B is a schematic partial plan view, and FIG. 17B is a schematic partial cross-sectional view, illustrating the first electrode in a center area of one pixel constituting the liquid crystal display device according to the fifth embodiment. As illustrated in these figures, a depression 139 is formed in the first electrode 120 in the center area of the pixel. Note that a schematic plan view of the first electrode of one pixel constituting the liquid crystal display device according to the fifth embodiment is similar to the plan view illustrated in FIG. 3, for example.

As illustrated in FIG. 17B, the depression 139 narrows toward the first substrate. More specifically, the depression 139 has a so-called forward tapered slope. It is preferable that an inclination angle of the depression 139 lies in a range from 5 degrees to 60 degrees, more preferably in a range from 20 degrees to 30 degrees. This inclination angle may be produced by etching the base layer 150 in such a manner as to produce inclination of the base layer 150 on the basis of an etching back method, for example. In addition, a shape of an outer edge 139A of the depression 139 may be either circular (e.g. circle with diameter of 15 μm or 7 μm) as illustrated in FIG. 17A, or rectangular (e.g. square having one side length of 12 μm) as illustrated in FIGS. 18A and 18B. An angle formed by the outer edge 139A of the rectangular depression 139 and the extension direction of the stem protrusion 131 may be 45 degrees (see FIG. 18A), or other angles such as 30 degrees or 60 degrees (see FIG. 18B).

As described above, the depression 139 is formed in the first electrode 120 in the center area of the pixel in the liquid crystal display device according to the fifth embodiment. In this case, the liquid crystal molecules positioned in the vicinity of the depression 139 fall toward the center of the pixel. Accordingly, a predetermined time required for exposure of the liquid crystal layer to a desired electric field to give a pre-tilt to the liquid crystal molecules until stabilization of the orientation of the liquid crystal molecules decreases during manufacture of the liquid crystal display device. In other words, a time required for giving a pre-tilt to the liquid crystal molecules decreases, wherefore reduction of a manufacturing time of the liquid crystal display device is realizable.

Figure 17C:
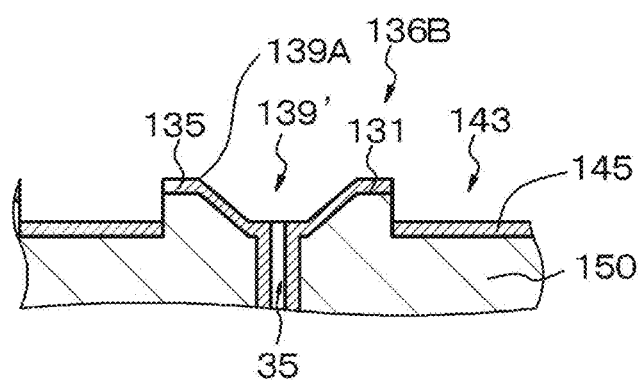

Note that a center of a depression 139' may constitute a part of a contact hole (connection hole 35) as illustrated in FIG. 17C. In this case, the depression 139' also functions as the first power supply portion 136B in the modified example of the liquid crystal display device according to the first embodiment illustrated in FIG. 4. Needless to say, the depressions 139 and 139' provided in the first embodiment and the modified example thereof are applicable to the other embodiments.

Sixth Embodiment

The sixth embodiment is a modification of the first embodiment. FIG. 19 is a schematic plan view of the first electrode of one pixel constituting the liquid crystal display device according to the sixth embodiment, while each of FIGS. 20A, 20B, and 21 is a schematic plan view illustrating an enlarged portion of the first electrode indicated by an elliptic area in the schematic plan view of the first electrode in FIG. 19.

In each of pixels $10_6$ of the liquid crystal display device according to the sixth embodiment, extension directions of side portions 131a of the stem protrusion 131 not connected to the branch protrusions 133 are parallel with neither the X axis nor the Y axis. Accordingly, the extension directions of the side portions 131a of the stem protrusion 131 not connected to the branch protrusions 133 are directions different from the X axis direction, and directions different from the X axis direction. Note that the stem protrusion 131 is linearly symmetric with respect to the X axis, and linearly symmetric with respect to the Y axis. In addition, the stem protrusion 131 is rotationally symmetric (point symmetric) through 180 degrees with respect to a pixel center. This configuration reduces generation of dark lines in areas corresponding to the X axis and the Y axis. Accordingly, the liquid crystal display device provided herein is capable of realizing more uniform and high light transmittance. Furthermore, the liquid crystal display device provided herein has a configuration and a structure capable of reducing a time required for giving a pre-tilt to the liquid crystal molecules 61.

More specifically, the side portions 131a of the stem protrusion 131 not connected to the branch protrusions 133 have linear shapes as illustrated in FIGS. 19 and 20A, or curved shapes as illustrated in FIGS. 20B and 21. In addition, the width of a part 131b of the stem protrusion 131 not connected to the branch protrusions 133 decreases toward the tip of the stem protrusion 131 as illustrated in FIGS. 19, 20A, 20B and 21.

Accordingly, the liquid crystal display device according to the sixth embodiment does not have a portion of the stem protrusion extending in parallel with the X axis, or a portion of the stem protrusion extending in parallel with the Y axis. In this case, the liquid crystal display device provided herein is capable of realizing more uniform and higher light transmittance, and has a configuration and a structure capable of reducing a time required for giving a pre-tilt to the liquid crystal molecules.

Seventh Embodiment

The seventh embodiment is a modification of the liquid crystal display devices described in the first through sixth embodiments. FIG. 22 is a schematic plan view of the first electrode of one pixel constituting the liquid crystal display device according to the seventh embodiment. The example illustrated in FIG. 22 is a modification of the first embodiment, and corresponds to a schematic partial cross-sectional view of the first electrode and the like taken along the arrow A-A in FIG. 3.

The liquid crystal display device according to the seventh embodiment includes a protrusion structure 13 extending from a part 20A of the first substrate positioned between pixels 10₇ to a part 20B of the first substrate 20 corresponding to a pixel peripheral portion. A peripheral portion of the recesses and protrusions 121 are formed on the protrusion structure 13. More specifically, the protrusion structure 13 is formed in correspondence with a black matrix. The black matrix is made of light curable resin to which carbon is added. According to the liquid crystal display device of the seventh embodiment, the peripheral portion of the recesses and protrusions 121 is formed on the protrusion structure 13. In this case, more intense electric field is generated in the peripheral portion of the recesses and protrusions in comparison with a structure of a flat peripheral portion of the recesses and protrusions 121. In this case, an orientation regulation force acting on the liquid crystal molecules in the peripheral portion of the recesses and protrusions 121 increases, wherefore the tilt-state of the liquid crystal molecules in the peripheral portion of the recesses and protrusions 121 is securely controllable. Accordingly, preferable voltage response characteristics are realizable. Accordingly, preferable voltage response characteristics are realizable.

Note that the protrusion structure is not limited to a structure formed on the basis of a black matrix, but may be produced by elements provided on the first substrate 20 or above the first substrate 20 and constituting the liquid crystal display device, such as various types of signal lines, auxiliary capacity electrodes, gate electrodes, source/drain electrodes, and various types of wirings. In this case, the protrusion structure may be formed on the base layer 150 by optimizing the thickness of the base layer 150 under an effect of the thicknesses of the constituent elements of the liquid crystal device.

Eighth Embodiment

The eighth embodiment is also a modification of the liquid crystal display devices in the first and second examples of the first mode. FIG. 23 is a schematic view of one pixel 10₈ on the first substrate 20 constituting the liquid crystal display device according to the eighth embodiment as viewed from above. The liquid crystal display device illustrated in FIG. 23 is a modification of the liquid crystal display device according to the second embodiment. A schematic partial end face view of the liquid crystal display device according to the eighth embodiment is substantially identical to FIG. 1.

According to the liquid crystal display device of the eighth embodiment, the width of each of branch protrusions 833 is set to ($P_Y/2=P_X/2$), while the width of each of the recesses 140 is set to ($P_Y/2=P_X/2$), on the assumption that the formation pitch of the branch protrusions 833 extending along the X axis is set to $P_X$, and that the formation pitch of the branch protrusions 833 extending along the Y axis is set to $P_Y (=P_X)$ According to the liquid crystal display device of the eighth embodiment, on the assumption that a (X, Y) coordinate system is defined by the X axis and the Y axis which are straight lines passing through a pixel center and extending in parallel with a pixel peripheral portion, a plurality of the branch protrusions 833 occupying a first quadrant extend in parallel with a direction where a Y coordinate value increases as an X coordinate value increases, a plurality of the branch protrusions 833 occupying a second quadrant extend in parallel with a direction where a Y coordinate value increases as an X coordinate value decreases, a plurality of the branch protrusions 833 occupying a third quadrant extend in parallel with a direction where a Y coordinate value decreases as an X coordinate value decreases, a plurality of the branch protrusions 833 occupying a fourth quadrant extend in parallel with a direction where a Y coordinate value decreases as an X coordinate value increases, the branch protrusions 833 extending from a stem protrusion 831 in parallel with the X axis and occupying the first quadrant, and the branch protrusions 833 extending from the stem protrusion 831 in parallel with the X axis and occupying the fourth quadrant deviate from each other (preferably deviate from each other by ($P_X/2$)), the branch protrusions 833 extending from the stem protrusion 831 in parallel with the Y axis and occupying the first quadrant, and the branch protrusions 833 extending from the stem protrusion 831 in parallel with the Y axis and occupying the second quadrant deviate from each other (preferably deviate from each other by ($P_Y/2$)), the branch protrusions 833 extending from the stem protrusion 831 in parallel with the X axis and occupying the second quadrant, and the branch protrusions 833 extending from the stem protrusion 831 in parallel with the X axis and occupying the third quadrant deviate from each other (preferably deviate from each other by ($P_X/2$)), and the branch protrusions 833 extending from the stem protrusion 831 in parallel with the Y axis and occupying the third quadrant, and the branch protrusions 833 extending from the stem protrusion 831 in parallel with the Y axis and occupying the fourth quadrant deviate from each other (preferably deviate from each other by ($P_Y/2$)). The branch protrusions 833 are not linearly symmetric with respect to the X axis and the Y axis, but rotationally symmetric (point symmetric) through 180 degrees with respect to the center of the pixel.

In this case, an electric field generated by the first electrode 120 located at the pixel center is distorted in the vicinity of the pixel center as a result of the deviation between the branch protrusions 833 by the half pitch, in which condition the falling directions of the liquid crystal molecules are regulated. Accordingly, an orientation regulation force acting on the liquid crystal molecules in the vicinity of the pixel center increases, wherefore the tilt-state of the liquid crystal molecules in the vicinity of the pixel center is securely controllable. Accordingly, a predetermined time required for exposure of the liquid crystal layer to a desired electric field to give a pre-tilt to the liquid crystal molecules until stabilization of the orientation of the liquid crystal molecules decreases during manufacture of the liquid crystal display device. In other words, a time required for giving a pre-tilt to the liquid crystal molecules decreases, wherefore reduction of a manufacturing time of the liquid crystal display device is realizable.

Note that the first embodiment or the modified example thereof may be applied to the eighth embodiment.

Ninth Embodiment

Described in the ninth embodiment is a method for forming the first electrode separation portion for separation between the first transparent conductive material layer 135 and the second transparent conductive material layer 145. The method for forming the first electrode separation portion in the ninth embodiment is applicable to manufacture of the liquid crystal display device according to the first through ninth embodiments. Note that figures to be referred to in the following description are views illustrating only an upper part of a smoothing film, and not showing a lower part of the smoothing film or the TFT layer 30.

For example, the smoothing film 150A is formed similarly to the manufacturing method of the liquid crystal display device according to the first embodiment. Subsequently, a double layer structure constituted by a first insulation layer 161 (made of $SiO_2$), and a second insulation layer 162 (made of SiN) is formed on the smoothing film 150A from bottom to top. Thereafter, a resist layer 163 is formed on the second insulation layer 162 by a known photolithography technology (see FIG. 26A). Then, a protrusion 151' having the double layer structure constituted by the first insulation layer 161 and the second insulation layer 162 by an etching technology, whereafter the resist layer 163 is removed (see FIG. 26B). Here, in etching the first insulation layer 161 and the second insulation layer 162, the etching speed of the first insulation layer 161 is higher than the etching speed of the second insulation layer 162. In this case, the side of the first insulation layer 161 is etched faster than the side of the second insulation layer 162. Accordingly, the side of the first insulation layer 161 has a deeper recess than the side of the second insulation layer 162. Thereafter, the transparent conductive material layers 135 and 145 made of ITO and having a predetermined thickness are formed on the entire surface by sputtering, for example (see FIG. 26C). As a result, formation of the first electrode separation portion for separation between the first transparent conductive material layer 135 and the second transparent conductive material layer 145 is completed.

Alternatively, as illustrated in FIG. 27A, a resist layer 173 made of a positive resist material is formed by a photolithography technology. The resist layer 173 has an opening 173A. The protrusion 151' is formed on the bottom of the opening 173A. In addition, the side of the opening 173A has a forward tapered shape. A protrusion forming layer 171 made of $SiO_2$ or SiN is then formed by a known method, whereafter the resist layer 173 is removed by a lift-off method to form the protrusion 151'. As a result, a state illustrated in FIG. 27B is produced. The side of the protrusion 151' has a reversely tapered shape. Thereafter, the transparent conductive material layers 135 and 145 made of ITO and having a predetermined thickness are formed on the entire surface by sputtering, for example (see FIG. 27C). As a result, formation of the first electrode separation portion for separation between the first transparent conductive material layer 135 and the second transparent conductive material layer 145 is completed.

Alternatively, as illustrated in FIG. 28A, a resist layer 183 made of a negative resist material is formed by a photolithography technology. The side of the resist layer 183 has a reversely tapered shape. The resist layer 183 constitutes the protrusion 151'. Thereafter, the transparent conductive material layers 135 and 145 made of ITO and having a predetermined thickness are formed on the entire surface by sputtering, for example (see FIG. 28B). As a result, formation of the first electrode separation portion for separation between the first transparent conductive material layer 135 and the second transparent conductive material layer 145 is completed.

Tenth Embodiment

The tenth embodiment relates to a liquid crystal display device in the second mode of the present disclosure. FIG. 33 is a schematic partial cross-sectional view of the liquid crystal display device according to the tenth embodiment. FIG. 34 is a schematic view of one pixel $10_{10}$ on the first substrate 20 as viewed from above. FIG. 35A is a schematic end face view taken along an arrow A-A in FIG. 34, while FIG. 35B is a schematic end face view take along an arrow B-B in FIG. 34.

The liquid crystal display device according to the tenth embodiment, or the eleventh or twelfth embodiment described below includes a plurality of arranged pixels, each pixel including:

the first substrate 20 and the second substrate 50;

a first electrode (pixel electrode) 220 that is provided on the counter face of the first substrate 20, the counter face facing the second substrate 50, and includes a plurality of slits 222;

the second electrode (counter electrode) 52 provided on a counter face of the second substrate 50, the counter face facing the first substrate 20; and the liquid crystal layer 60 that includes the liquid crystal molecules 61, 61A, 61B, and 61C, and is sandwiched between the first substrate 20 and the second substrate 50, the liquid crystal molecules 61 are given a pre-tilt, while a high dielectric material layer 231 is formed on the counter face of the first substrate 20, and the first electrode 220 is provided above or below the high dielectric material layer 231 (more specifically, above the high dielectric material layer 231 in the tenth embodiment). The liquid crystal molecules are given the pre-tilt at least on the first electrode 220 side to obtain negative dielectric anisotropy, similarly to the first embodiment. According to the liquid crystal display device of the tenth embodiment, the plurality of slits 222 are formed in the first electrode 220. Parts other than the plurality of slits 222 of the first electrode 220 are referred to as "electrode parts 221".

In addition, according to the liquid crystal display device of the tenth embodiment, the first electrode 220 is constituted by the plurality of slits 222 and electrode parts 221. The electrode parts 221 are constituted by a stem electrode part 221A which passes through a pixel central portion and extends radially (e.g. in cross shape), and a plurality of branch electrode parts 221B which extend from the stem electrode part 221A toward a pixel peripheral portion. More specifically, the stem electrode part 221A extends in parallel with the X axis and the Y axis, for example. The slits 222 correspond to areas between the branch electrode parts 221B. Note that the electrode parts 221 in the schematic view illustrating one pixel on the first substrate 20 as viewed from above are hatched with fine horizontal lines for clear distinction between the electrode parts 221 and the slits 222. This point is applicable to the following description.

According to the liquid crystal display device of the tenth embodiment, or the eleventh or twelfth embodiment described below, on the assumption that a (X, Y) coordinate system is defined by the X axis and the Y axis corresponding to straight lines passing through the pixel central portion and extending in parallel with the pixel peripheral portion, a plurality of the branch electrode parts 221B occupying a first quadrant extend in parallel with a direction where a Y coordinate value increases as an X coordinate value increases, a plurality of the branch electrode parts 221B occupying a second quadrant extend in parallel with a direction where a Y coordinate value increases as an X coordinate value decreases, a plurality of the branch electrode parts 221B occupying a third quadrant extend in parallel with a direction where a Y coordinate value decreases as an X coordinate value decreases, and a plurality of the branch electrode parts 221B occupying a fourth quadrant extend in parallel with a direction where a Y coordinate value decreases as an X coordinate value increases.

In this case, the X axis and the axial line of each of the plurality of branch electrode parts 221B occupying the first quadrant form 45 degrees. The X axis and the axial line of each of the plurality of branch electrode parts 221B occupying the second quadrant form 135 degrees. The X axis and the axial line of each of the plurality of branch electrode parts 221B occupying the third quadrant form 225 degrees. The X axis and the axial line of each of the plurality of branch electrode parts 221B occupying the fourth quadrant form 315 degrees. However, the respective angles are not limited to these values (angles).

The TFT layer 30 is formed on the first substrate 20 similarly to the first embodiment. An interlayer insulation layer 280, which is made of an organic insulation material, such as photosensitive polyimide resin or acrylic resin, and also functions as a smoothing film, is formed on the TFT layer 30. A high dielectric material layer 231, which is made of titanium oxide (dielectric constant: 100) and has a thickness of 0.1 µm, for example, is formed on the interlayer insulation layer 280. The first electrode 220 is formed on the high dielectric material layer 231. The interlayer insulation layer 280 may be made of an inorganic insulation material such as $SiO_2$, SiN, and SiON. This description is applicable to the eleventh embodiment described below. Note that the high dielectric material layer 231 is exposed through the slits 222.

A manufacturing method of the liquid crystal display device according to the tenth embodiment is hereinafter described.

Note that the first orientation film 21 covering the first electrode 220, and the second orientation film 51 covering the second electrode 52 are further provided in the tenth embodiment. The liquid crystal molecules 61 are given a pre-tilt by reaction of polymerizable monomers (orientation control material) constituting at least the first orientation film 21 under application of a predetermined electric field to the liquid crystal layer 60 in accordance with application of voltage to the first electrode 220. This manufacturing system is called PSA system as described above.

Alternatively, the first orientation film 21 covering the first electrode 220, and the second orientation film 51 covering the second electrode 52 are further provided in the tenth embodiment. The liquid crystal molecules 61 are given a pre-tilt by reaction of a photosensitive group (orientation control material) contained in the liquid crystal layer 60 under application of a predetermined electric field to the liquid crystal layer 60 in accordance with application of voltage to the first electrode 220. This manufacturing system is called FPA system as described above.

For manufacturing the liquid crystal display device according to the tenth embodiment, a TFT is initially formed similarly to the first embodiment. Thereafter, the high dielectric material layer 231 and the first electrode 220 are formed on the interlayer insulation layer 280. The first substrate 20 is constituted by a glass substrate having a thickness of 0.7 mm.

More specifically, the TFT layer 30 is formed on an insulation film 20' provided on the first substrate 20 similarly to the first embodiment. Thereafter, the interlayer insulation layer 280 having a thickness of 2.5 µm is formed on the entire surface. The connection hole 35 is formed in the interlayer insulation layer 280 above the one source/drain electrode 34. The one source/drain electrode 34 is exposed to a bottom of the connection hole 35. Subsequently, the high dielectric material layer 231 is formed on the interlayer insulation layer 280, and patterned to leave the high dielectric material layer 231 on the pixel. An ITO layer (transparent conductive material layer) having a predetermined thickness is subsequently formed on the entire surface by sputtering, and patterned to obtain the first electrode 220 constituted by the plurality of slits 222 and electrode parts 221. The first electrode 220 extends toward the source/drain electrode 34 exposed to the bottom of the connection hole 35. The first electrode 220 is separated into divisions in correspondence with respective pixels. Table 4 presented below shows specifications of the electrode parts 221, the slits 222 and others.

On the other hand, for producing the second substrate 50, a color filter layer (not shown) is formed on the second substrate 50 made of a glass substrate having a thickness of 0.7 mm. Subsequently, the second electrode 52 constituted by a so-called solid electrode is formed on the color filter layer.

TABLE 4

| | |
|---|---|
| width of stem electrode part | 8 µm |
| formation pitch of branch electrode part | 8 µm |
| width of branch electrode part | 4 µm |
| width of slit | 4 µm |
| thickness of first electrode: | 0.2 µm |
| average film thickness of first orientation film | 0.1 µm |
| average film thickness of second orientation film | 0.1 µm |
| $T_2/T_1$ | 1 |

Subsequently, the first orientation film 21 is formed on the first electrode 220 and the high dielectric material layer 231, while the second orientation film 51 is formed on the second electrode 52, similarly to the first embodiment. Thereafter, the first substrate 20 and the second substrate 50 are disposed such that the orientation film 21 and the orientation film 51 face each other. The liquid crystal layer 60 containing the liquid crystal molecules 61 is sealed between the orientation film 21 and the orientation film 51.

Then, manufacture of the liquid crystal display device (liquid crystal display element) illustrated in FIG. 33 and including the pre-tilted liquid crystal molecules 61A on the first substrate 20 and the second substrate 50 side is thus completed by using the PSA system or the FPA system. Finally, a pair of polarizing plates (not shown) is affixed to the outside of the liquid crystal display device such that respective absorption axes cross each other at right angles. Note that the liquid crystal display device according to the eleventh embodiment described below is manufactured by a substantially similar method.

The orientation state of the liquid crystal molecules 61 contained in the liquid crystal layer 60 varies in accordance with a potential difference between the first electrode 220 and the second electrode 52 when driving voltage is applied to the selected pixel 10 in an operation of the liquid crystal display device (liquid crystal display element). More specifically, when driving voltage is applied in a state prior to application of driving voltage as illustrated in FIG. 33, the liquid crystal molecules 61A and 61B positioned in the vicinities of the orientation films 21 and 51 fall in the respective tilt directions while rotating in the liquid crystal layer 60. This operation is also transmitted to the different liquid crystal molecules 61C. As a result, the liquid crystal molecules 61 respond in a posture substantially horizontal (parallel) with respect to the first substrate 20 and the second substrate 50. Accordingly, light entering the liquid crystal display element is emitted as modulated light based on a resultant change of the optical characteristics of the liquid crystal layer 60. An image is displayed with a gradation expression corresponding to the emitted light. Moreover, according to this liquid crystal display device, an image is displayed by application of driving voltage between the first electrode (pixel electrode) 220 and the second electrode (counter electrode) 52 in a manner similar to the manner described in the first embodiment.

A color filter layer may be formed on the first substrate 20 similarly to the first embodiment. In addition, the width of each of the branch electrode parts 221B may be reduced toward the tip similarly to the first embodiment.

Simulation was performed on the basis of parameters shown in following Table 5 to obtain an electric field profile and a light transmittance profile. FIGS. 36, 37, 38, 39, 40, 41, 42, 43, and 44 show results obtained by the simulation. In this case, the results shown in FIGS. 36, 37, and 38 are results of the liquid crystal display device which includes the high dielectric material layer having a dielectric constant of 100, while the results shown in FIGS. 39, 40, and 41 are results of the liquid crystal display device which includes the high dielectric material layer having a dielectric constant of 1000. On the other hand, the results shown in FIGS. 42, 43, and 44 are results of the liquid crystal display device which has a low dielectric material layer having a dielectric constant of 5 in a tenth comparative example. Note that FIGS. 36, 39, and 42 are graphs indicating results obtained by the electric field profile simulation, that FIGS. 37, 40, and 43 are graphs indicating results obtained by the light transmittance profile simulation, and that FIGS. 38, 41, and 44 are graphs indicating results obtained by the light transmittance simulation assuming that one pixel is viewed from above.

TABLE 5

| | |
|---|---|
| cell gap | 3.5 μm |
| formation pitch of branch electrode part | 8.0 μm |
| width of branch electrode part | 4.0 μm |
| width of branch electrode part | 4.0 μm |

On the basis of comparison between FIGS. 37, 38, 40, 41, 43, and 44, it is apparent that the light transmittance is equalized by the high dielectric material layer. In addition, the light transmittance becomes more uniform as the dielectric constant of the material constituting the high dielectric material layer increases. More specifically, on the assumption that the light transmittance exhibited by the tenth comparative example is 100%, the liquid crystal display device according to the tenth embodiment obtains light transmittances of 109% and 114% for the high dielectric material layer having a dielectric constant of 100 and the high dielectric material layer having a dielectric constant of 1000, respectively, under application of 5 volts to the first electrode and 0 volts to the second electrode. Accordingly, considerably improvement of the light transmittance is recognizable. It is further clarified, on the basis of the electric field profile, that an extremely flat electric field has been produced. Accordingly, stable and constant light transmittance characteristics are realizable regardless of the widths and pitches of the branch electrode parts and the slits.

According to the liquid crystal display device of the tenth embodiment described above, the high dielectric material layer is provided. In this case, the electric field profile produced by the first electrode and the second electrode becomes uniform. Accordingly, the light transmittance of the liquid crystal layer becomes uniform in accordance with uniformity of the electric field profile.

Eleventh Embodiment

The eleventh embodiment is a modification of the tenth embodiment. As illustrated in a schematic partial cross-sectional view in FIG. 45, the first electrode 220 is provided below the high dielectric material layer 232 in the eleventh embodiment. More specifically, the first electrode 220 is provided on the interlayer insulation layer 280, while the high dielectric material layer 232 is formed on the first electrode 220, and on the interlayer insulation layer 280 exposed between parts of the first electrode 220. The first orientation film 21 is formed on the high dielectric material layer 232. The liquid crystal display device according to the eleventh embodiment has a configuration and a structure similar to those of the liquid crystal display device of the tenth embodiment except for the foregoing points. Accordingly, detailed description of the liquid crystal display device of the eleventh embodiment is omitted. Note that the high dielectric material layer 232 may function as the first orientation film without forming the first orientation film 21. In this case, the high dielectric material layer 232 is constituted by a mixed layer (dielectric constant of entire mixed layer: 30) made of polyimide resin (dielectric constant: 3), and barium titanate (dielectric constant: 100) having an average particle diameter of 10 nm.

Twelfth Embodiment

The twelfth embodiment is a modification of the tenth and eleventh embodiments. As illustrated in FIG. 46 which is a schematic view of one pixel on the first substrate as viewed from above, according to the liquid crystal display device of the twelfth embodiment, the first electrode 220 is constituted by the plurality of slits 222 and electrode parts 221, and the electrode parts 221 include a stem electrode part 221C formed in a frame shape on a pixel peripheral portion, and a plurality of branch electrode parts 221D extending from the stem electrode part 221C toward a pixel inner portion. In addition, the slits 222 are constituted by a stem slit 222C passing through a pixel central portion and extending radially (e.g. in cross shape), and branch slits 222D extending from the stem slit 222C toward the pixel peripheral portion and positioned between the branch electrodes 221D. The liquid crystal display device according to the twelfth embodiment has a configuration and a structure similar to those of the liquid crystal display devices of the tenth and eleventh embodiments except for the foregoing points. Accordingly, detailed description of the liquid crystal display device of the twelfth embodiment is omitted.

Thirteenth Embodiment

The thirteenth embodiment relates to a liquid crystal display device in the third mode of the present disclosure. As illustrated in a schematic partial cross-sectional view in FIG. 47, the liquid crystal display device according to the thirteenth embodiment or each of the fourteenth through sixteenth embodiments described below includes a plurality of arranged pixels, each of which pixels including:

the first substrate 20 and the second substrate 50;

a first electrode 320 and a second electrode 352 provided on a counter face of the first substrate 20, the counter face facing the second substrate 50, such that the first electrode 320 and the second electrode 352 are disposed away from each other; and a liquid crystal layer 360 sandwiched between the first substrate 20 and the second substrate 50, a high dielectric material layer 331 is formed on the counter face of the first substrate 20, and at least the first electrode 320 is provided above or below of the high dielectric material layer 331 (more specifically, above the high dielectric material layer 331 in the thirteenth embodiment).

More specifically, the liquid crystal display device according to the thirteenth embodiment or the fourteenth embodiment described below is an in plate switching (IPS) mode liquid crystal display device. In this case, the first electrode 320 and the second electrode 352 form a comb teeth structure facing each other and alternately combined. An image of a comb teeth portion of the first electrode 320 projected to the first substrate 20, and an image of a comb teen portion of the second electrode 352 projected to the first substrate 20 do not overlap with each other. In addition, the first electrode 320 and the second electrode 352 are formed in an identical plane. In other words, the high dielectric material layer 331 is formed on an interlayer insulation layer 380, and the first electrode 320 and the second electrode 352 are provided on the high dielectric material layer 331.

More specifically, the TFT layer 30 is formed on the first substrate 20 similarly to the first embodiment. The interlayer insulation layer 380, which is made of an organic insulation material such as photosensitive polyimide resin and acrylic resin, and also functions as a soothing film, is formed on the TFT layer 30. The high dielectric material layer 331 similar to the high dielectric material layer 231 described in the tenth embodiment, for example, is formed on the interlayer insulation layer 380. The first electrode 320 and the second electrode 352 are provided on the high dielectric material layer 331. The interlayer insulation layer 380 may be made of an inorganic insulation material, such as $SiO_2$, SiN, and SiON. This description is applicable to the fourteenth through sixteenth embodiments described below.

A manufacturing method of the liquid crystal display device according to the thirteenth embodiment is hereinafter described.

For manufacturing the liquid crystal display device according to the thirteenth embodiment, the TFT layer 30 and the interlayer insulation layer 380 are initially formed similarly to the first embodiment. The high dielectric material layer 331, the first electrode 320, and the second electrode 352 are further provided on the interlayer insulation layer 380. Note that the high dielectric material layer 331 is patterned for each pixel. Accordingly, the high dielectric material layer 331 is not provided between pixels. This description is applicable to the fourteenth through sixteenth embodiments described below.

More specifically, the TFT layer 30 is formed on an insulation film 20' provided on the first substrate 20 similarly to the first embodiment. The interlayer insulation layer 380 having a thickness of 2.5 μm is subsequently formed on the entire surface, whereafter the connection hole 35 is formed in the interlayer insulation layer 380 above the one source/drain electrode 34. The one source/drain electrode 34 is exposed to a bottom of the connection hole 35. Subsequently, the high dielectric material layer 331 is formed on the interlayer insulation layer 380, and patterned. Thereafter, an ITO layer having a predetermined thickness is formed on the entire surface by sputtering, for example, and then patterned to obtain the first electrode 320 and the second electrode 352. The first electrode 320 reaches the one source/drain electrode 34 exposed to the bottom of the connection hole 35. In addition, the second electrode 352 reaches a common ground wire.

On the other hand, a color filter layer (not shown) is formed on the second substrate 50.

Subsequently, the first orientation film 21 is formed on the first electrode 320, the second electrode 352, and the high dielectric material layer 331, and the second orientation film 51 is formed on the second substrate 50, in a manner similar to the manner of the first embodiment. Thereafter, the first substrate 20 and the second substrate 50 are disposed such that the orientation film 21 and the orientation film 51 face each other. The liquid crystal layer 360 containing the liquid crystal molecule is sealed between the orientation film 21 and the orientation film 51, in a manner similar to the manner of the first embodiment.

Manufacture of the liquid crystal display device (liquid crystal display element) illustrated in FIG. 47 is completed by the foregoing steps. Finally, a pair of polarizing plates (not shown) is affixed to the outside of the liquid crystal display device such that respective absorption axes cross each other at right angles. Note that the liquid crystal display devices according to the fourteenth through sixteenth embodiments described below are manufactured by substantially the same method.

In case of so-called normally black, the direction of the polarization axis of the one polarizing plate and the director are substantially the same in a state of non-application of an electric field to the liquid crystal layer 360. However, this axis and the director form an angle of substantially 45 degrees under a state of application of an electric field to the liquid crystal layer 360. When driving voltage is applied to the selected pixel 10 in an operation of the liquid crystal display device (liquid crystal display element), the director and linearly polarized light having passed through the entrance side polarizing plate form an angle of substantially 45 degrees. In this case, the liquid crystal layer 360 functions as a half-wave plate, and rotates the oscillation direction of the linearly polarized light through 90 degrees. As a result, light having passed through the liquid crystal layer 360 passes through the exit side polarizing plate (white display state). Under a state of non-application of driving voltage, the light having entered the entrance side polarizing plate reaches the exit side polarizing plate with substantially no retardation by the liquid crystal layer 360, and is absorbed into the exit side polarizing plate (black display state). Accordingly, a state substantially equivalent to an ideal crossed-Nichol state without interposition of the liquid crystal layer 360 is realizable as a black display state.

A color filter layer may be formed on the first substrate 20 similarly to the first embodiment.

According to the liquid crystal display device of the thirteenth embodiment, an electric field profile produced by the first electrode and the second electrode becomes uniform by the presence of the high dielectric material layer. Accordingly, the light transmittance of the liquid crystal layer becomes uniform in accordance with uniformity of the electric field profile.

Fourteenth Embodiment

The fourteen embodiment is a modification of the thirteenth embodiment. As illustrated in a schematic partial cross-sectional view in FIG. 48, the first electrodes 320 and the second electrodes 352 are provided in an identical plane, and disposed below the high dielectric material layer 332 according to the fourteenth embodiment. More specifically, the first electrodes 320 and the second electrodes 352 are provided on the interlayer insulation layer 380, while the high dielectric material layer 332 is formed on the first electrodes 320, the second electrodes 352, and the interlayer insulation layer 380 exposed between parts of the first electrode 320. The first orientation film 21 is formed on the high dielectric material layer 332. The liquid crystal display device according to the fourteenth embodiment has a configuration and a structure similar to those of the liquid crystal display device according to the thirteenth embodiment except for the foregoing points. Accordingly, detailed description of the liquid crystal display device of the fourteenth embodiment is omitted. Note that the high dielectric material layer 332 may function as the first orientation film without providing the first orientation film 21. In this case, the high dielectric material layer 332 may be constituted by a mixed layer similar to the high dielectric material layer 232 described in the eleventh embodiment.

Fifteenth Embodiment

The fifteenth embodiment is also a modification of the thirteenth embodiment. As illustrated in a schematic partial cross-sectional view in FIG. 49, the first electrode 320 and the second electrode 352 of the liquid crystal display device according to the fifteenth embodiment are provided in different planes. The first electrode 320 is provided on a high dielectric material layer 333. Accordingly, the liquid crystal display device according to the fifteenth embodiment or the sixteenth embodiment described below is a fringe field switching (FFS) mode liquid crystal display device.

More specifically, the TFT layer 30 is formed on the first substrate 20 similarly to the first embodiment. The interlayer insulation layer 380, which is made of an organic insulation material, such as photosensitive polyimide resin and acrylic resin, and also functions as a smoothing film, is formed on the TFT layer 30. The second electrode 352 is formed on the interlayer insulation layer 380. Spaces between parts of the second electrode 352 are filled with an interlayer insulation layer 381. In addition, the high dielectric material layer 333 similar to the dielectric material layer 231 described in the tenth embodiment is formed on the second electrodes 352 and the interlayer insulation layer 381, for example, while the first electrode 320 is provided on the high dielectric material layer 333. Each of the interlayer insulation layers 380 and 381 may be constituted by an inorganic insulation material, such as $SiO_2$, SiN, SiON.

A manufacturing method of the liquid crystal display device according to the fifteenth embodiment is hereinafter described.

For manufacturing the liquid crystal display device according to the fifteenth embodiment, the TFT layer 30 and the interlayer insulation layer 380 are initially formed similarly to the first embodiment. The second electrodes 352 are further provided on the interlayer insulation layer 380. The spaces between parts of the second electrode 352 are filled with the interlayer insulation layer 381, whereafter the high dielectric material layer 333 is formed on the second electrode 352 and the interlayer insulation layer 381. Subsequently, the first electrode 320 is provided on the high dielectric material layer 333, while the first orientation film 21 is further formed on the first electrode 320 and the high dielectric material layer 333. Thereafter, the second substrate 50 including the second orientation film 51, and the first substrate 20 are disposed such that the orientation film 21 and the orientation film 51 face each other to seal the liquid crystal layer 360 containing liquid crystal molecules between the orientation film 21 and the orientation film 51. Manufacture of the liquid crystal display device (liquid crystal display element) illustrated in FIG. 49 is completed by the foregoing steps. Finally, a pair of polarizing plates (not shown) is affixed to the outside of the liquid crystal display device such that respective absorption axes cross each other at right angles.

Note that the high dielectric material layer may be formed on a second interlayer insulation layer formed on the interlayer insulation layer 381 and the second electrode 352.

Sixteenth Embodiment

The sixteenth embodiment is a modification of the fifteenth embodiment. As illustrated in a schematic partial cross-sectional view in FIG. 50, the first electrode 320 and the second electrode 352 in the sixteenth embodiment are provided in different planes. The first electrode 320 is provided below a high dielectric material layer 334. More specifically, the second electrode 352 is provided on the interlayer insulation layer 380. A second interlayer insulation layer 382 is formed on the interlayer insulation layers 380 and 381 and the second electrode 352. The first electrode 320 is provided on the second interlayer insulation layer 382. The high dielectric material layer 334 is formed on the first electrode 320 and the second interlayer insulation layer 382. The first orientation film 21 is formed on the high dielectric material layer 334. The liquid crystal display device according to the sixteenth embodiment has a configuration and a structure similar to those of the liquid crystal display device according to the fifteenth embodiment except for the foregoing points. Accordingly, detailed description of the liquid crystal display device according to the sixteenth embodiment is omitted. Note that the high dielectric material layer 334 may function as the first orientation film without providing the first orientation film 21. In this case, the high dielectric material layer 334 may be constituted by a mixed layer similar to the high dielectric material layer 232 described in the eleventh embodiment.

The present disclosure is not limited to the preferred embodiments described herein, but may be modified in various ways. Each of the planar shapes of the protrusions, branch protrusions, recesses, branch electrode parts, and slits is not limited to a V shape described in the respective embodiments, but may have various patterns where the protrusions, branch protrusions, and branch electrode parts extend in a plurality of directions, such as a stripe shape and a ladder shape. Each of an end planar shape of the protrusions, branch protrusions, and branch electrode parts may be either a linear shape or a stepped shape as the whole protrusions, branch protrusion, and branch electrode parts are viewed. Furthermore, the end planar shape of the protrusions, branch protrusion, and branch electrode parts may be either a linear shape or a shape constituted by a combination of line segments, or form a curve such as a circular arc.

While the VA mode liquid crystal display device (liquid crystal display element) has been described in each of the first through ninth embodiments, the present disclosure may be applied to modes other than the VA mode, such as ECB mode (horizontal orientation and positive liquid crystal mode; no twist), IPS mode, FFS mode, and optically compensated bend (OCB) mode. Similar advantageous effects are offered in these modes. In addition, while only the transmission type liquid crystal display device (liquid crystal display element) has been described in the embodiments, the liquid crystal display device is not limited to the transmission type, but may be a reflection type, or a transmission/reflection type. In case of the reflection type, the pixel electrode is made of an electrode material having light reflectivity such as aluminum. In case of the transmission/reflection type, the pixel electrode constituting a reflection part is made of an electrode material having light reflectivity such as aluminum.

The liquid crystal display device described in any one of the first through ninth embodiments may be combined with the liquid crystal display device described in any one of the tenth through thirteenth embodiments. More specifically, the high dielectric material layer may be formed on the base layer including the plurality of recesses and protrusions, while the first transparent conductive material layer and the second transparent conductive material layer may be formed on the high dielectric material layer. Alternatively, the first transparent conductive material layer and the second transparent conductive material layer may be formed on the base layer including the plurality of recesses and protrusions, while the high dielectric material layer may be formed on the base layer, the first transparent conductive layer, and the second transparent conductive material layer.

Note that the present disclosure may have following configurations.

[A01]<<Liquid Crystal Display Device: First Mode>>

A liquid crystal display device including a plurality of arranged pixels, each of the pixels including:

a first substrate and a second substrate;

a first electrode provided on a counter face of the first substrate, the counter face facing the second substrate;

a second electrode provided on a counter face of the second substrate, the counter face facing the first substrate; and a liquid crystal layer that contains liquid crystal molecules, and is sandwiched between the first substrate and the second substrate, in which the liquid crystal molecules are given a pre-tilt, the first electrode includes a base layer that contains a plurality of recesses and protrusions, a first transparent conductive material layer, and a second transparent conductive material layer, the first transparent conductive material layer connected to a first power supply portion is formed on protrusion top faces of the base layer, the second transparent conductive material layer connected to a second power supply portion is formed on recess bottom faces of the base layer, and the first transparent conductive material layer and the second transparent conductive material layer are separated from each other.

[A02] The liquid crystal display device according to [A01], in which the first transparent conductive material layer formed on the protrusion top faces of the base layer and the second transparent conductive material layer formed on the recess bottom faces of the base layer are separated from each other via sides of the base layer.

[A03]<<Liquid Crystal Display Device in First Example of First Mode>>

The liquid crystal display device according to [A01] or [A02], in which the protrusions include a stem protrusion that passes through a pixel central portion and radially extends, and a plurality of branch protrusions that extend from the stem protrusion toward a pixel peripheral portion, and the recesses include a stem recess that is provided in the pixel peripheral portion in a frame shape and surrounds the protrusions, and branch recesses that extend from the stem recess and are positioned between the branch protrusions.

[A04]<<Liquid Crystal Display Device in Second Example of First Mode>>

The liquid crystal display device according to [A01] or [A02], in which the protrusions include a stem protrusion that is provided on a pixel peripheral portion in a frame shape, and a plurality of branch protrusions that extend from the stem protrusion toward a pixel inner portion, and the recesses include a stem recess that passes through a pixel central portion and radially extends, and branch recesses that extend from the stem recess toward the pixel peripheral portion, and are positioned between the branch protrusions.

[A05] The liquid crystal display device according to [A03] or [A04], in which, assuming that a (X, Y) coordinate system is defined by an X axis and a Y axis that are straight lines passing through the pixel central portion and extending in parallel with the pixel peripheral portion, the plurality of branch protrusions occupying a first quadrant extend in parallel with a direction where a Y coordinate value increases as an X coordinate value increases, the plurality of branch protrusions occupying a second quadrant extend in parallel with a direction where a Y coordinate value increases as an X coordinate value decreases, the plurality of branch protrusions occupying a third quadrant extend in parallel with a direction where a Y coordinate value decreases as an X coordinate value decreases, and the plurality of branch protrusions occupying a fourth quadrant extend in parallel with a direction where a Y coordinate value decreases as an X coordinate value increases.

[A06] The liquid crystal display device according to [A05], in which, assuming that a formation pitch of the branch protrusions in the X axis is $P_X$, and that a formation pitch of the branch protrusions in the Y axis is $P_Y$, the branch protrusions extending from the stem protrusion in parallel with the X axis and occupying the first quadrant, and the branch protrusions extending from the stem protrusion in parallel with the X axis and occupying the fourth quadrant deviate from each other by $(P_X/2)$, the branch protrusions extending from the stem protrusion in parallel with the Y axis and occupying the first quadrant, and the branch protrusions extending from the stem protrusion in parallel with the Y axis and occupying the second quadrant deviate from each other by $(P_Y/2)$, the branch protrusions extending from the stem protrusion in parallel with the X axis and occupying the second quadrant, and the branch protrusions extending from the stem protrusion in parallel with the X axis and occupying the third quadrant deviate from each other by $(P_X/2)$, and the branch protrusions extending from the stem protrusion in parallel with the Y axis and occupying the third quadrant, and the branch protrusions extending from the stem protrusion in parallel with the Y axis and occupying the fourth quadrant deviate from each other by $(P_Y/2)$.

[A07] The liquid crystal display device according to any one of [A01] through [A06], in which
a black matrix is provided, and
a projected image of a part of the first substrate positioned between the pixels and a projected image of the pixel peripheral portion, and a projected image of the black matrix overlap with each other.

[A08]<<Liquid Crystal Display Device of First Configuration>>
The liquid crystal display device according to any one of [A01] through [A07], in which
the first power supply portion is connected to a first driving circuit, and
the second power supply portion is connected to a second driving circuit.

[A09] The liquid crystal display device according to [A08], further including:
a first orientation film that covers the first electrode, and a second orientation film that covers the second electrode, in which
a pre-tilt is given to the liquid crystal molecules by reaction of a photosensitive group that constitutes at least the first orientation film under application of a predetermined electric field to the liquid crystal layer in accordance with application of voltage from the first power supply portion to the first transparent conductive material layer.

[A10] The liquid crystal display device according to [A08], further including:
a first orientation film that covers the first electrode, and a second orientation film that covers the second electrode, in which
a pre-tilt is given to the liquid crystal molecules by reaction of polymerizable monomers contained in the liquid crystal layer under application of a predetermined electric field to the liquid crystal layer in accordance with application of voltage from the first power supply portion to the first transparent conductive material layer.

[A11] The liquid crystal display device according to [A09] or [A10], in which, assuming that an average film thickness of the first orientation film and an average film thickness of the second orientation film are $T_1$ and $T_2$, respectively, $$0.5 \leq T_2/T_1 \leq 1.5$$

holds.

[A12] The liquid crystal display device according to any one of [A08] through [A11], in which voltages are applied from the first power supply portion to the first transparent conductive material layer, and from the second power supply portion to the second transparent conductive material layer during image display.

[A13]<<Liquid Crystal Display Device of Second Configuration>>
The liquid crystal display device according to any one of [A01] through [A07], in which
the first power supply portion and the second power supply portion are connected to a driving circuit,
the first power supply portion includes a first capacity portion, and
the second power supply portion includes a second capacity portion.

[A14] The liquid crystal display device according to any one of [A01] through [A13], in which
the protrusions have a double layer structure constituted by a lamination of a first insulation layer and a second insulation layer from bottom to top, and
an etching speed of the first insulation layer is higher than an etching speed of the second insulation layer in etching the first insulation layer and the second insulation layer.

[B01] The liquid crystal display device according to any one of [A01] through [A14], in which
the first power supply portion is provided on the pixel central portion, and
the second power supply portion is provided on the pixel peripheral portion.

[B02] The liquid crystal display device according to any one of [A01] through [A14], in which the first power supply portion and the second power supply portion are provided on the pixel peripheral portion.

[C01] The liquid crystal display device according to any one of [A01] through [B02], in which a width of each of the branch protrusions provided on the first electrode decreases toward a tip of the branch protrusion.

[C02] The liquid crystal display device according to any one of [A01] through [B02], in which a width of each of the branch protrusions is the largest at a position of connection with the stem protrusion, and decreases from the position of connection with the stem protrusion toward a tip of the branch protrusion.

[C03] The liquid crystal display device according to [C02], in which the width of each of the branch protrusions linearly decreases from the position of connection with the stem protrusion toward the tip of the branch protrusion.

[D01] The liquid crystal display device according to any one of [A01] through [C03], in which
a protrusion structure is provided on the first substrate from a part positioned between the pixels to a part corresponding to the pixel peripheral portion, and
a peripheral portion of the recesses and protrusions is formed above the protrusion structure.

[E01] The liquid crystal display device according to any one of [A01] through [D01], in which a depression is formed in the first electrode in the center area of the pixel.

[E02] The liquid crystal display device according to [E01], in which the depression narrows toward the first substrate.

[E03] The liquid crystal display device according to [E02], in which a tilt angle of the depression lies in a range from 5 degrees to 60 degrees.

[E04] The liquid crystal display device according to any one of [E01] through [E03], in which an outer edge of the depression is a circular.

[E05] The liquid crystal display device according to any one of [E01] through [E03], in which an outer edge of the depression is rectangular.

[E06] The liquid crystal display device according to [E05], in which the outer edge of the rectangular depression and the direction of extension of the protrusions form an angle of 45 degrees.

[E07] The liquid crystal display device according to any one of [E01] through [E06], in which a center of the depression constitutes a part of a contact hole.

[F01] The liquid crystal display device according to [A03, in which an orientation regulation portion is formed on the second electrode at a part corresponding to the stem protrusion.

[F02] The liquid crystal display device according to any one of [A01] through [F01], in which a first electrode notch structure or a first electrode projection that passes through the pixel central portion and extends in parallel with the pixel peripheral portion is formed in the first electrode.

[G01] The liquid crystal display device according to any one of [A01] through [F02], in which an extension direction of a side portion of the stem protrusion not connected to the branch protrusions is in parallel with neither the X axis nor the Y axis.

[G02] The liquid crystal display device according to [G01], in which the side portion of the stem protrusion not connected to the branch protrusions is linear.

[G03] The liquid crystal display device according to [G01], in which the side portion of the stem protrusion not connected to the branch protrusions is curved.

[G04] The liquid crystal display device according to any one of [G01] through [G03], in which a width of a portion of the stem protrusion not connected to the branch protrusions decreases toward a tip of the stem protrusion.

[H01]<<Liquid Crystal Display Device: Second Mode>>

A liquid crystal display device including a plurality of arranged pixels, each of the pixels including:

a first substrate and a second substrate;

a first electrode that is provided on a counter face of the first substrate, the counter face facing the second substrate, and includes a plurality of slits;

a second electrode that is provided on a counter face of the second substrate, the counter face facing the first substrate; and a liquid crystal layer that contains liquid crystal molecules, and is sandwiched between the first substrate and the second substrate, in which the liquid crystal molecules are given a pre-tilt, a high dielectric material layer is formed on the counter face of the first substrate, and the first electrode is provided above or below the high dielectric material layer.

[H02]<<Liquid Crystal Display Device in First Example of Second Mode>>

The liquid crystal display device according to [H01], in which the first electrode is constituted by a plurality of slits and electrode parts, and the electrode parts are constituted by a stem electrode part that passes through the pixel central portion and radially extends, and a plurality of branch electrode parts that extend from the stem electrode part toward the pixel peripheral portion.

[H03]<<Liquid Crystal Display Device in Second Example of Second Mode>>

The liquid crystal display device according to [H01], in which the first electrode is constituted by a plurality of slits and electrode parts, the electrode parts are constituted by a stem electrode part that is provided on the pixel peripheral portion in a frame shape, and a plurality of branch electrode parts that extend from the stem electrode part toward a pixel inner portion, and the slits are constituted by a stem slit that passes through the pixel central portion and radially extends, and branch slits that extend from the stem slit toward the pixel peripheral portion and are positioned between the branch electrode parts.

[H04] The liquid crystal display device according to [H02] or [H03], in which, assuming that a (X, Y) coordinate system is defined by an X axis and a Y axis that are straight lines passing through the pixel central portion and extending in parallel with the pixel peripheral portion, the plurality of branch electrode parts occupying a first quadrant extend in parallel with a direction where a Y coordinate value increases as an X coordinate value increases, the plurality of branch electrode parts occupying a second quadrant extend in parallel with a direction where a Y coordinate value increases as an X coordinate value decreases, the plurality of branch electrode parts occupying a third quadrant extend in parallel with a direction where a Y coordinate value decreases as an X coordinate value decreases, and the plurality of branch electrode parts occupying a fourth quadrant extend in parallel with a direction where a Y coordinate value decreases as an X coordinate value increases.

[H05] The liquid crystal display device according to [H04], in which, assuming that a formation pitch of the branch electrode parts in the X axis is $P_X$, and that a formation pitch of the branch electrode parts in the Y axis is $P_Y$, the branch electrode parts extending from the stem electrode part in parallel with the X axis and occupying the first quadrant, and the branch electrode parts extending from the stem electrode part in parallel with the X axis and occupying the fourth quadrant deviate from each other by $(P_X/2)$, the branch electrode parts extending from the stem electrode part in parallel with the Y axis and occupying the first quadrant, and the branch electrode parts extending from the stem electrode part in parallel with the Y axis and occupying the second quadrant deviate from each other by $(P_Y/2)$, the branch electrode parts extending from the stem electrode part in parallel with the X axis and occupying the second quadrant, and the branch electrode parts extending from the stem electrode part in parallel with the X axis and occupying the third quadrant deviate from each other by $(P_X/2)$, and the branch electrode parts extending from the stem electrode part in parallel with the Y axis and occupying the third quadrant, and the branch electrode parts extending from the stem electrode part in parallel with the Y axis and occupying the fourth quadrant deviate from each other by $(P_Y/2)$.

[H06] The liquid crystal display device according to any one of [H01] through [H05], in which a black matrix is provided, and a projected image of a part of the first substrate positioned between the pixels and a projected image of the pixel peripheral portion, and a projected image of the black matrix overlap with each other.

[H07] The liquid crystal display device according to any one of [H01] through [H06], further including:

a first orientation film that covers the first electrode, and a second orientation film that covers the second electrode, in which a pre-tilt is given to the liquid crystal molecules by reaction of a photosensitive group that constitutes at least the first orientation film under application of a predetermined electric field to the liquid crystal layer in accordance with application of voltage from the first power supply portion to the first transparent conductive material layer.

[H08] The liquid crystal display device according to any one of [H01] through [H06], further including:

a first orientation film that covers the first electrode, and a second orientation film that covers the second electrode, in which a pre-tilt is given to the liquid crystal molecules by reaction of polymerizable monomers contained in the liquid crystal layer under application of a predetermined electric field to the liquid crystal layer in accordance with application of voltage from the first power supply portion to the first transparent conductive material layer.

[H09] The liquid crystal display device according to [H07] or [H08], in which, assuming that an average film thickness of the first orientation film and an average film thickness of the second orientation film are $T_1$ and $T_2$, respectively, $$0.5 \leq T_2/T_1 \leq 1.5$$

holds.

[H10] The liquid crystal display device according to any one of [H02] through [H09], in which a width of each of the branch electrode parts provided on the first electrode decreases toward a tip of the branch electrode part.

[H11] The liquid crystal display device according to any one of [H02] through [H10], in which a width of each of the branch electrode parts is the largest at a position of connection with the stem electrode part, and decreases from the position of connection with the stem electrode part toward a tip of the branch electrode part.

[H12] The liquid crystal display device according to [H11], in which the width of each of the branch electrode parts linearly decreases from the position of connection with the stem electrode part toward the tip of the branch electrode part.

[H13] The liquid crystal display device according to any one of [H01] through [H12], in which the high dielectric material layer is formed above an interlayer insulation layer, and the first electrode is provided above the high dielectric material layer.

[H14] The liquid crystal display device according to any one of [H01] through [H12], in which the first electrode is provided above an interlayer insulation layer, and the high dielectric material layer is formed on the first electrode, and above the interlayer insulation layer exposed between parts of the first electrode.

[H15] The liquid crystal display device according to [H14], in which the high dielectric material layer also functions as an orientation film.

[J01] The liquid crystal display device according to any one of [H01] through [H15], in which a depression is formed in the first electrode in the center area of the pixel.

[J02] The liquid crystal display device according to [J01], in which the depression narrows toward the first substrate.

[J03] The liquid crystal display device according to [J02], in which a tilt angle of the depression lies in a range from 5 degrees to 60 degrees.

[J04] The liquid crystal display device according to any one of [J01] through [J03], in which an outer edge of the depression is a circular.

[J05] The liquid crystal display device according to any one of [J01] through [J03], in which an outer edge of the depression is rectangular.

[J06] The liquid crystal display device according to [J05], in which the outer edge of the rectangular depression and the extension direction of the electrode parts form an angle of 45 degrees.

[J07] The liquid crystal display device according to any one of [J01] through [J06], in which a center of the depression constitutes a part of a contact hole.

[J08] The liquid crystal display device according to any one of [H02] through [J07], in which an orientation regulation portion is formed on the second electrode at a part corresponding to the stem electrode part.

[J09] The liquid crystal display device according to any one of [H01] through [J08], in which a first electrode notch structure or a first electrode projection that passes through the pixel central portion and extends in parallel with the pixel peripheral portion is formed in the first electrode.

[J10] The liquid crystal display device according to any one of [H02] through [J09], in which an extension direction of a side portion of the stem electrode part not connected to the branch electrode parts is in parallel with neither the X axis nor the Y axis.

[J11] The liquid crystal display device according to [J10], in which the side portion of the stem electrode part not connected to the branch electrode parts is linear.

[J12] The liquid crystal display device according to [J10], in which the side portion of the stem electrode part not connected to the branch electrode parts is curved.

[J13] The liquid crystal display device according to any one of [J10] through [J12], in which a width of a portion of the stem electrode part not connected to the branch electrode parts decreases toward a tip of the stem electrode part.

[K01]<<Liquid Crystal Display Device: Third Mode>>

A liquid crystal display device including a plurality of arranged pixels, each of the pixels including:

a first substrate and a second substrate;

a first electrode and a second electrode that are provided on a counter face of the first substrate, the counter face facing the second substrate, such that the first electrode and the second electrode are disposed away from each other; and a liquid crystal layer that contains liquid crystal molecules, and is sandwiched between the first substrate and the second substrate, in which a high dielectric material layer is formed on the counter face of the first substrate, and at least the first electrode is provided above or below the high dielectric material layer.

[K02] The liquid crystal display device according to [K01], in which the first electrode and the second electrode are provided in an identical plane, and the first electrode and the second electrode are provided above the high dielectric material layer.

[K03] The liquid crystal display device according to [K02], in which a high dielectric material layer is formed above the interlayer insulation layer, and the first electrode and the second electrode are provided above the high dielectric material layer.

[K04] The liquid crystal display device according to [K01], in which the first electrode and the second electrode are provided in an identical plane, and the first electrode and the second electrode are provided below the high dielectric material layer.

[K05] The liquid crystal display device according to [K04], in which the first electrode and the second electrode are provided above the interlayer insulation layer, and the high dielectric material layer is formed above the first electrode, the second electrode, and the interlayer insulation layer exposed between the first electrode and the second electrode.

[K06] The liquid crystal display device according to [K04] or [K05], in which the high dielectric material layer also functions as an orientation film.

[K07] The liquid crystal display device according to [K01], in which the first electrode and the second electrode are provided in different planes, and the first electrode is provided above the high dielectric material layer.

[K08] The liquid crystal display device according to [K07], in which
the second electrode is provided above the interlayer insulation layer,
the high dielectric material layer is formed above the interlayer insulation layer and the second electrode, and
the first electrode is provided above the high dielectric material layer.

[K09] The liquid crystal display device according to [K07], in which
the second electrode is provided above the interlayer insulation layer,
a second interlayer insulation layer and the high dielectric material layer are formed above the interlayer insulation layer and the second electrode, and
the first electrode is provided above the high dielectric material layer.

[K10] The liquid crystal display device according to [K01], in which
the first electrode and the second electrode are provided in different planes, and
the first electrode is provided below the high dielectric material layer.

[K11] The liquid crystal display device according to [K10], in which
the second electrode is provided on the interlayer insulation layer,
the second interlayer insulation layer is formed above the interlayer insulation layer and the second electrode,
the first electrode is provided above the second interlayer insulation layer, and
the high dielectric material layer is formed above the first electrode and the second interlayer insulation layer.

[K12] The liquid crystal display device according to [K10] or [K11], in which the high dielectric material layer also functions as an orientation film.

[K13] The liquid crystal display device according to any one of [K01] through [K12], in which the first electrode and the second electrode form a comb teeth structure facing each other and alternately combined.

[K14] The liquid crystal display device according to any one of [K01] through [K13], in which
a black matrix is provided, and
a projected image of a part of the first substrate positioned between the pixels and a projected image of the pixel peripheral portion, and a projected image of the black matrix overlap with each other.

REFERENCE SIGNS LIST $10_1$, $10_2$, $10_4$, $10_6$, $10_7$, $10_8$, $10_{10}$ Pixel
13 Protrusion structure
20 First substrate
20A First substrate part positioned between pixels
20B First substrate part corresponding to pixel peripheral portion
20' Insulation film
21 First orientation film
22 Color filter layer
30 TFT layer
31 Gate electrode
32 Gate insulation layer
33 Semiconductor layer (channel forming area)
34 Source/drain electrode
35 Connection hole (contact hole)
50 Second substrate
51 Second orientation film
52 Second electrode (counter electrode)
53 Orientation regulation portion
54 Second electrode notch structure
55 Second electrode projection (rib)
60, 360 Liquid crystal layer
61, 61A, 61B, 61C Liquid crystal molecule
80 Display area
81 Source driver
82 Gate driver
83 Timing controller
84 Power supply circuit
91 Source line
92 Gate line
93 TFT
94 Capacitor
120 First electrode (pixel electrode)
121 Recesses and protrusions
130, 230 Protrusion
131, 231, 831 Stem protrusion (main protrusion)
131a Stem protrusion side part
131b Stem protrusion part not connected to branch protrusion
133, 233, 833 Branch protrusion (sub protrusion)
135 First transparent conductive material layer
135A Edge of first transparent conductive material layer
136A, 136B, 146A, 146B Power supply portion
139, 139' Depression
139A Outer edge of depression
140, 240 Recess
141, 241 Stem recess (main recess)
143, 243 Branch recess (sub recess)
145 Second transparent conductive material layer
150 Base layer
150A Smoothing film
151 Protrusion top face of base layer
151' Protrusion
152 Recess bottom face of base layer
153 Side of base layer
161 First insulation layer
162 Second insulation layer
163, 173, 183 Resist layer
173A Opening of resist layer
171 Protrusion forming layer
220 First electrode (pixel electrode)
221 Electrode part
221A, 221C Stem electrode part
221B, 221D Branch electrode part
222 Slit
222C Stem slit
222D Branch slit
231, 232, 331, 332, 333, 334 High dielectric material layer
280, 380, 381 Interlayer insulation layer
382 Second interlayer insulation layer
320 First electrode
352 Second electrode

The invention claimed is:
1. A liquid crystal display device, comprising:
a plurality of pixels, wherein each of the plurality of pixels includes:
a first substrate and a second substrate;
a first electrode provided on a counter face of the first substrate, the counter face facing the second substrate;
a second electrode provided on a counter face of the second substrate, the counter face facing the first substrate; and a liquid crystal layer that contains liquid crystal molecules, wherein the liquid crystal layer is sandwiched between the first substrate and the second substrate, wherein the liquid crystal molecules are given a pre-tilt, the first electrode includes a base layer that contains a plurality of recesses and a plurality of protrusions, a first transparent conductive material layer, and a second transparent conductive material layer, the first transparent conductive material layer connected to a first power supply portion is formed on protrusion top faces of the base layer, the second transparent conductive material layer connected to a second power supply portion is formed on recess bottom faces of the base layer, and the first transparent conductive material layer and the second transparent conductive material layer are separated from each other.

2. The liquid crystal display device according to claim 1, wherein the first transparent conductive material layer formed on the protrusion top faces of the base layer and the second transparent conductive material layer formed on the recess bottom faces of the base layer are separated from each other via sides of the base layer.

3. The liquid crystal display device according to claim 1, wherein the plurality of protrusions includes a stem protrusion that passes through a pixel central portion and radially extends, and a plurality of branch protrusions that extends from the stem protrusion toward a pixel peripheral portion, and wherein the plurality of recesses includes a stem recess that is provided in the pixel peripheral portion in a frame shape and surrounds the plurality of protrusions, and branch recesses that extend from the stem recess and are positioned between the plurality of branch protrusions.

4. The liquid crystal display device according to claim 1, wherein the plurality of protrusions includes a stem protrusion that is provided on a pixel peripheral portion in a frame shape, and a plurality of branch protrusions that extends from the stem protrusion toward a pixel inner portion, and wherein the plurality of recesses includes a stem recess that passes through a pixel central portion and radially extends, and branch recesses that extend from the stem recess toward the pixel peripheral portion, and are positioned between the plurality of branch protrusions.

5. The liquid crystal display device according to claim 3, wherein a (X, Y) coordinate system is defined by an X axis and a Y axis that are straight lines passing through the pixel central portion and extending in parallel with the pixel peripheral portion, the plurality of branch protrusions occupying a first quadrant extend in parallel with a direction where a Y coordinate value increases as an X coordinate value increases, the plurality of branch protrusions occupying a second quadrant extend in parallel with a direction where a Y coordinate value increases as an X coordinate value decreases, the plurality of branch protrusions occupying a third quadrant extend in parallel with a direction where a Y coordinate value decreases as an X coordinate value decreases, and the plurality of branch protrusions occupying a fourth quadrant extend in parallel with a direction where a Y coordinate value decreases as an X coordinate value increases.

6. The liquid crystal display device according to claim 1, wherein a black matrix is provided, and a projected image of a part of the first substrate positioned between the plurality of pixels and a projected image of the pixel peripheral portion, and a projected image of the black matrix overlap with each other.

7. The liquid crystal display device according to claim 1, wherein the first power supply portion is connected to a first driving circuit, and the second power supply portion is connected to a second driving circuit.

8. The liquid crystal display device according to claim 7, further comprising:

a first orientation film that covers the first electrode, and a second orientation film that covers the second electrode, wherein a pre-tilt is given to the liquid crystal molecules by reaction of a photosensitive group that constitutes at least the first orientation film under application of a determined electric field to the liquid crystal layer in accordance with application of voltage from the first power supply portion to the first transparent conductive material layer.

9. The liquid crystal display device according to claim 7, further comprising:

a first orientation film that covers the first electrode, and a second orientation film that covers the second electrode, wherein a pre-tilt is given to the liquid crystal molecules by reaction of polymerizable monomers contained in the liquid crystal layer under application of a determined electric field to the liquid crystal layer in accordance with application of voltage from the first power supply portion to the first transparent conductive material layer.

10. The liquid crystal display device according to claim 7, wherein voltages are applied from the first power supply portion to the first transparent conductive material layer, and from the second power supply portion to the second transparent conductive material layer during image display.

11. The liquid crystal display device according to claim 1, wherein the first power supply portion and the second power supply portion are connected to a driving circuit, the first power supply portion includes a first capacity portion, and the second power supply portion includes a second capacity portion.

12. The liquid crystal display device according to claim 1, wherein the plurality of protrusions has a double layer structure constituted by a lamination of a first insulation layer and a second insulation layer from bottom to top, and an etching speed of the first insulation layer is higher than an etching speed of the second insulation layer in etching the first insulation layer and the second insulation layer.

13. A liquid crystal display device, comprising:

a plurality of pixels, wherein each of the plurality of pixels includes:

a first substrate and a second substrate;

a first electrode that is provided on a counter face of the first substrate, the counter face facing the second substrate, and includes a plurality of slits;

a second electrode that is provided on a counter face of the second substrate, the counter face facing the first substrate; and a liquid crystal layer that contains liquid crystal molecules, wherein the liquid crystal layer is sandwiched between the first substrate and the second substrate, wherein the liquid crystal molecules are given a pre-tilt, a high dielectric material layer is formed on the counter face of the first substrate, and the first electrode is provided above or below the high dielectric material layer.

14. A liquid crystal display device, comprising:

a plurality of pixels, wherein each of the plurality of pixels includes:

a first substrate and a second substrate;

a first electrode and a second electrode that are provided on a counter face of the first substrate, the counter face facing the second substrate, such that the first electrode and the second electrode are disposed away from each other; and a liquid crystal layer that contains liquid crystal molecules, wherein the liquid crystal layer is sandwiched between the first substrate and the second substrate, wherein a high dielectric material layer is formed on the counter face of the first substrate, and at least the first electrode is provided above or below the high dielectric material layer.

* * * * *